(12) United States Patent
El-Kady et al.

(10) Patent No.: US 11,791,453 B2
(45) Date of Patent: Oct. 17, 2023

(54) DEVICES COMPRISING CARBON-BASED MATERIAL AND FABRICATION THEREOF

(71) Applicant: The Regents of the University of California, Oakland, CA (US)

(72) Inventors: Maher F. El-Kady, Los Angeles, CA (US); Richard B. Kaner, Pacific Palisades, CA (US); Matthew Kowal, Los Angeles, CA (US)

(73) Assignee: The Regents of the University of California, Oakland, CA (US)

(*) Notice: Subject to any disclaimer, the term of this patent is extended or adjusted under 35 U.S.C. 154(b) by 94 days.

(21) Appl. No.: 17/112,384

(22) Filed: Dec. 4, 2020

(65) Prior Publication Data
US 2021/0111392 A1 Apr. 15, 2021

Related U.S. Application Data

(62) Division of application No. 15/688,342, filed on Aug. 28, 2017, now Pat. No. 10,938,021.
(Continued)

(51) Int. Cl.
*H01M 4/133* (2010.01)
*H01M 10/0525* (2010.01)
(Continued)

(52) U.S. Cl.
CPC .......... *H01M 4/133* (2013.01); *H01G 11/36* (2013.01); *H01G 11/38* (2013.01); *H01G 11/86* (2013.01); *H01M 4/0409* (2013.01); *H01M 4/0435* (2013.01); *H01M 4/1391* (2013.01); *H01M 4/1393* (2013.01); *H01M 4/364* (2013.01); *H01M 4/583* (2013.01); *H01M 4/587* (2013.01); *H01M 4/623* (2013.01); *H01M 4/625* (2013.01);
(Continued)

(58) Field of Classification Search
None
See application file for complete search history.

(56) References Cited

U.S. PATENT DOCUMENTS 2,800,616 A 7/1957 Becker
3,223,639 A 12/1965 Powers et al.
(Continued)

FOREIGN PATENT DOCUMENTS

CN 1092208 A 9/1994
CN 1253390 A 5/2000
(Continued)

OTHER PUBLICATIONS

Acerce, Muharrem et al., "Metallic 1T phase $MoS_2$ nanosheets as supercapacitor electrode materials," Nature Nanotechnology, vol. 10, Mar. 23, 2015, Macmillan Publishers Limited, pp. 1-6.
(Continued)

*Primary Examiner* — Jonathan Crepeau
(74) *Attorney, Agent, or Firm* — Withrow & Terranova, P.L.L.C.

(57) ABSTRACT

Energy storage devices are disclosed. In some embodiments, the energy storage devices comprise a positive electrode comprising a carbon-based material comprising porous carbon sheet(s). Fabrication processes for manufacturing the energy storage devices are disclosed.

20 Claims, 28 Drawing Sheets

Related U.S. Application Data

(60) Provisional application No. 62/381,859, filed on Aug. 31, 2016.

(51) Int. Cl.

| | | |
|---|---|---|
| *H01M 4/62* | (2006.01) | |
| *H01M 4/583* | (2010.01) | |
| *H01M 4/587* | (2010.01) | |
| *H01M 10/052* | (2010.01) | |
| *H01M 4/36* | (2006.01) | |
| *H01M 4/04* | (2006.01) | |
| *H01M 4/1393* | (2010.01) | |
| *H01M 4/1391* | (2010.01) | |
| *C01B 32/19* | (2017.01) | |
| *H01G 11/36* | (2013.01) | |
| *H01G 11/38* | (2013.01) | |
| *H01G 11/86* | (2013.01) | |
| *H01G 11/06* | (2013.01) | |

(52) U.S. Cl.
CPC ..... *H01M 10/052* (2013.01); *H01M 10/0525* (2013.01); *C01B 32/19* (2017.08); *H01G 11/06* (2013.01); *H01M 2220/20* (2013.01); *H01M 2220/30* (2013.01); *Y02T 10/70* (2013.01)

(56) References Cited

U.S. PATENT DOCUMENTS

| | | |
|---|---|---|
| 3,288,641 A | 11/1966 | Rightmire |
| 3,536,963 A | 10/1970 | Boos |
| 3,652,902 A | 3/1972 | Hart et al. |
| 3,749,608 A | 7/1973 | Sarbacher |
| 4,327,157 A | 4/1982 | Himy et al. |
| 4,645,713 A | 2/1987 | Shioya et al. |
| 5,143,709 A | 9/1992 | Labes |
| 5,225,296 A | 7/1993 | Ohsawa et al. |
| 5,442,197 A | 8/1995 | Andrieu et al. |
| 5,744,258 A | 4/1998 | Bai et al. |
| 6,043,630 A | 3/2000 | Koenck et al. |
| 6,117,585 A | 9/2000 | Anani et al. |
| 6,252,762 B1 | 6/2001 | Amatucci |
| 6,356,433 B1 | 3/2002 | Shi et al. |
| 6,451,074 B2 | 9/2002 | Bluvstein et al. |
| 6,510,043 B1 | 1/2003 | Shiue et al. |
| 6,522,522 B2 | 2/2003 | Yu et al. |
| 6,982,517 B2 | 1/2006 | Reineke et al. |
| 7,623,340 B1 | 11/2009 | Song et al. |
| 7,833,663 B2 | 11/2010 | Phillips et al. |
| 7,875,219 B2 | 1/2011 | Zhamu et al. |
| 8,315,039 B2 | 11/2012 | Zhamu et al. |
| 8,503,161 B1 | 8/2013 | Chang et al. |
| 8,593,714 B2 | 11/2013 | Agrawal et al. |
| 8,753,772 B2 | 6/2014 | Liu et al. |
| 8,771,630 B2 | 7/2014 | Wu et al. |
| 8,828,608 B2 | 9/2014 | Sun et al. |
| 8,906,495 B2 | 12/2014 | Chen |
| 8,951,675 B2 | 2/2015 | Bhardwaj et al. |
| 9,118,078 B2 | 8/2015 | Huang et al. |
| 9,295,537 B2 | 3/2016 | Cao |
| 9,437,372 B1 | 9/2016 | Zhamu et al. |
| 9,779,884 B2 | 10/2017 | El-Kady et al. |
| 2002/0136881 A1 | 9/2002 | Yanagisawa et al. |
| 2002/0160257 A1 | 10/2002 | Lee et al. |
| 2003/0013012 A1 | 1/2003 | Ahn et al. |
| 2003/0169560 A1 | 9/2003 | Welsch et al. |
| 2004/0090736 A1 | 5/2004 | Bendale et al. |
| 2004/0099641 A1 | 5/2004 | Mathieu et al. |
| 2004/0131889 A1 | 7/2004 | Leddy et al. |
| 2004/0146786 A1 | 7/2004 | Sato et al. |
| 2004/0241532 A1 | 12/2004 | Kim |
| 2005/0153130 A1 | 7/2005 | Long et al. |
| 2006/0121342 A1 | 6/2006 | Sano et al. |
| 2006/0201801 A1 | 9/2006 | Bartlett et al. |
| 2006/0207878 A1 | 9/2006 | Myung et al. |
| 2006/0269834 A1 | 11/2006 | West et al. |
| 2007/0172739 A1 | 7/2007 | Visco et al. |
| 2007/0204447 A1 | 9/2007 | Bernstein et al. |
| 2008/0090141 A1 | 4/2008 | Meitav et al. |
| 2008/0158778 A1 | 7/2008 | Lipka et al. |
| 2008/0180883 A1 | 7/2008 | Palusinski et al. |
| 2008/0199737 A1 | 8/2008 | Kazaryan et al. |
| 2008/0220293 A1 | 9/2008 | Marmaropoulos et al. |
| 2008/0265219 A1 | 10/2008 | Whitehead et al. |
| 2008/0316678 A1 | 12/2008 | Ehrenberg et al. |
| 2009/0021890 A1 | 1/2009 | Bourcier et al. |
| 2009/0059474 A1 | 3/2009 | Zhamu et al. |
| 2009/0061312 A1 | 3/2009 | Zhamu et al. |
| 2009/0117467 A1 | 5/2009 | Zhamu et al. |
| 2009/0289328 A1 | 11/2009 | Tanioku |
| 2009/0290287 A1 | 11/2009 | Lipka et al. |
| 2010/0002362 A1 | 1/2010 | Clelland et al. |
| 2010/0003598 A1 | 1/2010 | Nakamura |
| 2010/0159346 A1 | 6/2010 | Hinago et al. |
| 2010/0159366 A1 | 6/2010 | Shao-Horn et al. |
| 2010/0195269 A1 | 8/2010 | Kim et al. |
| 2010/0203362 A1 | 8/2010 | Lam et al. |
| 2010/0221508 A1 | 9/2010 | Huang et al. |
| 2010/0226066 A1 | 9/2010 | Sweeney et al. |
| 2010/0237296 A1 | 9/2010 | Gilje |
| 2010/0266964 A1 | 10/2010 | Gilje |
| 2010/0273051 A1 | 10/2010 | Choi et al. |
| 2010/0317790 A1 | 12/2010 | Jang et al. |
| 2011/0002085 A1 | 1/2011 | Bae et al. |
| 2011/0026189 A1 | 2/2011 | Wei et al. |
| 2011/0075323 A1 | 3/2011 | Kawakami et al. |
| 2011/0079748 A1 | 4/2011 | Ruoff et al. |
| 2011/0111283 A1 | 5/2011 | Rust, III et al. |
| 2011/0111299 A1 | 5/2011 | Liu et al. |
| 2011/0143101 A1 | 6/2011 | Sandhu |
| 2011/0157774 A1 | 6/2011 | Aitchison et al. |
| 2011/0159372 A1 | 6/2011 | Zhamu et al. |
| 2011/0163274 A1 | 7/2011 | Plee et al. |
| 2011/0163699 A1 | 7/2011 | Elder et al. |
| 2011/0183180 A1 | 7/2011 | Yu et al. |
| 2011/0227000 A1 | 9/2011 | Ruoff et al. |
| 2011/0229777 A1 | 9/2011 | Mak et al. |
| 2011/0242730 A1 | 10/2011 | Zhou et al. |
| 2011/0256454 A1 | 10/2011 | Nicolas et al. |
| 2011/0280787 A1 | 11/2011 | Chen et al. |
| 2011/0318257 A1 | 12/2011 | Sokolov et al. |
| 2012/0111730 A1 | 5/2012 | Choi et al. |
| 2012/0129736 A1 | 5/2012 | Tour et al. |
| 2012/0134072 A1 | 5/2012 | Bae et al. |
| 2012/0145234 A1 | 6/2012 | Roy-Mayhew et al. |
| 2012/0187906 A1 | 7/2012 | Martienssen et al. |
| 2012/0300364 A1 | 11/2012 | Cai et al. |
| 2012/0313591 A1 | 12/2012 | Brambilla et al. |
| 2013/0026409 A1 | 1/2013 | Baker et al. |
| 2013/0034803 A1 | 2/2013 | Adzic et al. |
| 2013/0048949 A1 | 2/2013 | Xia et al. |
| 2013/0056346 A1 | 3/2013 | Sundara et al. |
| 2013/0056703 A1 | 3/2013 | Elian et al. |
| 2013/0077206 A1 | 3/2013 | Gadkaree et al. |
| 2013/0100581 A1 | 4/2013 | Jung et al. |
| 2013/0148265 A1 | 6/2013 | Okuno et al. |
| 2013/0155578 A1 | 6/2013 | Tsai et al. |
| 2013/0161570 A1 | 6/2013 | Hwang et al. |
| 2013/0168611 A1 | 7/2013 | Zhou et al. |
| 2013/0171502 A1 | 7/2013 | Chen et al. |
| 2013/0180912 A1 | 7/2013 | Li |
| 2013/0182373 A1 | 7/2013 | Yu et al. |
| 2013/0189602 A1 | 7/2013 | Lahiri et al. |
| 2013/0217289 A1 | 8/2013 | Nayfeh et al. |
| 2013/0230747 A1 | 9/2013 | Patolsky et al. |
| 2013/0260246 A1 | 10/2013 | Chen et al. |
| 2013/0264041 A1 | 10/2013 | Zhamu et al. |
| 2013/0266858 A1 | 10/2013 | Inoue et al. |
| 2013/0280601 A1 | 10/2013 | Geramita et al. |
| 2013/0314844 A1 | 11/2013 | Chen et al. |
| 2013/0315816 A1 | 11/2013 | Watson et al. |
| 2013/0323159 A1 | 12/2013 | Lee et al. |
| 2013/0330617 A1 | 12/2013 | Yoshimura et al. |

(56) References Cited

U.S. PATENT DOCUMENTS

| | | |
|---|---|---|
| 2014/0029161 A1 | 1/2014 | Beidaghi et al. |
| 2014/0030590 A1 | 1/2014 | Wang et al. |
| 2014/0045058 A1 | 2/2014 | Zhao et al. |
| 2014/0050947 A1 | 2/2014 | Donnelly |
| 2014/0065447 A1 | 3/2014 | Liu et al. |
| 2014/0099558 A1 | 4/2014 | Itakura et al. |
| 2014/0118883 A1 | 5/2014 | Xie |
| 2014/0120453 A1 | 5/2014 | Ajayan et al. |
| 2014/0134503 A1 | 5/2014 | Lockett et al. |
| 2014/0146439 A1 | 5/2014 | Choi et al. |
| 2014/0154164 A1 | 6/2014 | Chen et al. |
| 2014/0170476 A1 | 6/2014 | Tan et al. |
| 2014/0178763 A1 | 6/2014 | Mettan |
| 2014/0205841 A1 | 7/2014 | Qiu et al. |
| 2014/0255776 A1 | 9/2014 | Song et al. |
| 2014/0255785 A1 | 9/2014 | Do et al. |
| 2014/0287308 A1 | 9/2014 | Okada et al. |
| 2014/0306858 A1 | 10/2014 | Tsai et al. |
| 2014/0313636 A1 | 10/2014 | Tour et al. |
| 2014/0323596 A1 | 10/2014 | Jeong et al. |
| 2014/0335428 A1 | 11/2014 | Wakizaka et al. |
| 2014/0370383 A1* | 12/2014 | Lim .................... H01M 4/525 525/194 |
| 2015/0044560 A1 | 2/2015 | Ogino |
| 2015/0050554 A1 | 2/2015 | Fukumine et al. |
| 2015/0098167 A1 | 4/2015 | El-Kady et al. |
| 2015/0103469 A1 | 4/2015 | Lee et al. |
| 2015/0111449 A1 | 4/2015 | Cruz-Silva et al. |
| 2015/0218002 A1 | 8/2015 | Plomb et al. |
| 2015/0218003 A1 | 8/2015 | Zhamu et al. |
| 2015/0235776 A1 | 8/2015 | Miller |
| 2015/0259212 A1 | 9/2015 | Li et al. |
| 2015/0287544 A1 | 10/2015 | Irazoqui et al. |
| 2015/0298977 A1 | 10/2015 | Yoon |
| 2015/0311504 A1 | 10/2015 | Hong et al. |
| 2015/0332868 A1 | 11/2015 | Jung et al. |
| 2015/0340171 A1 | 11/2015 | Li et al. |
| 2015/0364738 A1 | 12/2015 | Pope et al. |
| 2015/0364755 A1 | 12/2015 | Liu et al. |
| 2016/0035498 A1 | 2/2016 | Honma et al. |
| 2016/0043384 A1 | 2/2016 | Zhamu et al. |
| 2016/0055983 A1 | 2/2016 | Kurungot et al. |
| 2016/0077074 A1 | 3/2016 | Strong et al. |
| 2016/0099116 A1 | 4/2016 | Yang |
| 2016/0102187 A1 | 4/2016 | Leventis et al. |
| 2016/0118198 A1 | 4/2016 | Okuno et al. |
| 2016/0133396 A1 | 5/2016 | Hsieh |
| 2016/0148759 A1 | 5/2016 | El-Kady et al. |
| 2017/0033371 A1 | 2/2017 | Cordova |
| 2017/0062821 A1 | 3/2017 | Tour et al. |
| 2017/0149107 A1 | 5/2017 | El-Kady et al. |
| 2017/0178824 A1 | 6/2017 | Kaner et al. |
| 2017/0194105 A1 | 7/2017 | Zhamu et al. |
| 2017/0213657 A1 | 7/2017 | Kaner et al. |
| 2017/0240424 A1 | 8/2017 | Roberts et al. |
| 2017/0271093 A1 | 9/2017 | El-Kady et al. |
| 2017/0278643 A1 | 9/2017 | El-Kady et al. |
| 2017/0287650 A1 | 10/2017 | Kaner et al. |
| 2017/0299563 A1 | 10/2017 | Strong et al. |
| 2017/0338472 A1 | 11/2017 | Zhamu et al. |
| 2017/0369323 A1 | 12/2017 | Kowal et al. |
| 2018/0062159 A1 | 3/2018 | El-Kady et al. |
| 2018/0323016 A1 | 11/2018 | El-Kady et al. |
| 2018/0366280 A1 | 12/2018 | Hwang et al. |
| 2019/0006675 A1 | 1/2019 | Cheng et al. |
| 2019/0019630 A1 | 1/2019 | Strauss et al. |
| 2019/0088420 A1 | 3/2019 | Tour et al. |
| 2019/0123409 A1 | 4/2019 | El-Kady et al. |
| 2019/0237752 A1 | 8/2019 | El-Kady et al. |
| 2019/0284403 A1 | 9/2019 | Kaner et al. |
| 2020/0090880 A1 | 3/2020 | Kaner et al. |

FOREIGN PATENT DOCUMENTS

| | | |
|---|---|---|
| CN | 100372035 C | 2/2008 |
| CN | 101723310 A | 6/2010 |
| CN | 101894679 A | 11/2010 |
| CN | 102187413 A | 9/2011 |
| CN | 102275896 A | 12/2011 |
| CN | 102491318 A | 6/2012 |
| CN | 102509632 A | 6/2012 |
| CN | 102543483 A | 7/2012 |
| CN | 102923698 A | 2/2013 |
| CN | 103208373 A | 7/2013 |
| CN | 103508450 A | 1/2014 |
| CN | 103715393 A | 4/2014 |
| CN | 103723715 A | 4/2014 |
| CN | 103787328 A | 5/2014 |
| CN | 203631326 U | 6/2014 |
| CN | 203839212 U | 9/2014 |
| CN | 104143630 A | 11/2014 |
| CN | 104201438 A | 12/2014 |
| CN | 104229777 A | 12/2014 |
| CN | 104299794 A | 1/2015 |
| CN | 104355306 A | 2/2015 |
| CN | 104617300 A | 5/2015 |
| CN | 104637694 A | 5/2015 |
| CN | 104892935 A | 9/2015 |
| CN | 105062074 A | 11/2015 |
| CN | 105217621 A | 1/2016 |
| CN | 105585003 A | 5/2016 |
| CN | 106158426 A | 11/2016 |
| EP | 1137081 A1 | 9/2001 |
| EP | 1262579 A2 | 12/2002 |
| EP | 1843362 A1 | 10/2007 |
| EP | 2088637 A2 | 8/2009 |
| EP | 2933229 A1 | 10/2015 |
| EP | 2958122 A1 | 12/2015 |
| EP | 2980891 A1 | 2/2016 |
| EP | 3367479 A1 | 8/2018 |
| JP | S61010855 A | 1/1986 |
| JP | S62287568 A | 12/1987 |
| JP | 2002063894 A | 2/2002 |
| JP | 2003217575 A | 7/2003 |
| JP | 2004039491 A | 2/2004 |
| JP | 2004055541 A | 2/2004 |
| JP | 2004063297 A | 2/2004 |
| JP | 3503438 B2 | 3/2004 |
| JP | 2004519841 A | 7/2004 |
| JP | 2005138204 A | 6/2005 |
| JP | 2005199267 A | 7/2005 |
| JP | 2005294020 A | 10/2005 |
| JP | 2005317902 A | 11/2005 |
| JP | 2006252902 A | 11/2005 |
| JP | 2007160151 A | 6/2007 |
| JP | 2008300467 A | 12/2008 |
| JP | 2009525247 A | 7/2009 |
| JP | 2010222245 A | 10/2010 |
| JP | 2011026153 A | 2/2011 |
| JP | 2011165680 A | 8/2011 |
| JP | 2012169576 A | 9/2012 |
| JP | 2012188484 A | 10/2012 |
| JP | 2013534686 A | 9/2013 |
| JP | 2014053209 A | 3/2014 |
| JP | 2014201492 A | 10/2014 |
| JP | 2015218085 A | 12/2015 |
| KR | 1020040079226 A | 9/2004 |
| KR | 20070083691 A | 8/2007 |
| KR | 20080064967 A | 7/2008 |
| KR | 10-2009-0107498 A | 10/2009 |
| KR | 20140012464 A | 2/2014 |
| KR | 1020100114827 A | 4/2017 |
| WO | 9632618 A1 | 10/1996 |
| WO | 2007109907 A1 | 10/2007 |
| WO | 2011019431 A1 | 2/2011 |
| WO | 2011021982 A1 | 2/2011 |
| WO | 2011072213 A2 | 6/2011 |
| WO | 2012006657 A1 | 1/2012 |
| WO | 2012087698 A1 | 6/2012 |
| WO | 2012138302 A1 | 10/2012 |
| WO | 2013024727 A1 | 2/2013 |

(56) References Cited

FOREIGN PATENT DOCUMENTS

| WO | 2013040636 A1 | 3/2013 |
|---|---|---|
| WO | 2013066474 A2 | 5/2013 |
| WO | 2013070989 A1 | 5/2013 |
| WO | 2013128082 A1 | 9/2013 |
| WO | 2013155276 A1 | 10/2013 |
| WO | 2013162649 A2 | 10/2013 |
| WO | 2014011722 A2 | 1/2014 |
| WO | 2014028978 A1 | 2/2014 |
| WO | 2014062133 A1 | 4/2014 |
| WO | 2014072877 A2 | 5/2014 |
| WO | 2014134663 A1 | 9/2014 |
| WO | 2014138721 A1 | 9/2014 |
| WO | 2014181763 A1 | 11/2014 |
| WO | 2015023974 A1 | 2/2015 |
| WO | 2015069332 A | 5/2015 |
| WO | 2015153895 A1 | 10/2015 |
| WO | 2015195700 A1 | 12/2015 |
| WO | 2016053956 A1 | 4/2016 |
| WO | 2016094551 A1 | 6/2016 |
| WO | 2016133571 A2 | 8/2016 |
| WO | 2016190225 A1 | 12/2016 |
| WO | 2017035462 A1 | 3/2017 |

OTHER PUBLICATIONS

Allen, Matthew J. et al., "Honeycomb Carbon: A Review of Graphene," Chemical Reviews, vol. 110, Issue 1, Jul. 17, 2009, American Chemical Society, pp. 132-145.

Augustyn, Veronica et al., "High-rate electrochemical energy storage through Li+ intercalation pseudocapacitance," Nature Materials, vol. 12, Jun. 2013, www.nature.com/naturematerials, Macmillan Publishers Limited, pp. 518-522.

Author Unknown, "125 Volt Transportation Module," Maxwell Technologies, retrieved Apr. 13, 2016, website last modified Mar. 14, 2013, www.maxwell.com/products/ultracapacitors/125v-tranmodules, Maxwell Technologies, Inc., 2 pages.

Author Unknown, "Elton: Super Capactiors," www.elton-cap.com/, Retrieved Apr. 15, 2016, Elton, 1 page.

Author Unknown, "Elton: Products and Technology," https://web.archive.org/web/20160306044847/http:/www.elton-cap.com/products/, dated Mar. 6, 2016, retrieved Mar. 15, 2017, Elton, 2 pages.

Author Unknown, "Monthly battery sales statistics," Battery Association of Japan (BAJ), retrieved Apr. 13, 2016, website last modified Dec. 2010, web.archive.org/web/20110311224259/http://www.baj.or.jp/e/statistics/02.php, Battery Association of Japan, 1 page.

Author Unknown, "Turnigy Graphene Batteries," Batteries & Accessories, https://hobbyking.com/en_us/batteries-accessories/turnigy-graphene-2.html, retrieved Apr. 3, 2017, HobbyKing, 39 pages.

Arthur, Timothy, S. et al., "Three-dimensional electrodes and battery architectures," MRS Bulletin, vol. 36, Jul. 2011, Materials Research Society, pp. 523-531.

Bai, Ming-Hua et al., "Electrodeposition of vanadium oxide-polyaniline composite nanowire electrodes for high energy density supercapacitors," Journal of Materials Chemistry A, vol. 2, Issue 28, Jan. 29, 2014, The Royal Society of Chemistry, pp. 10882-10888.

Beidaghi, Majid, et al., "Capacitive energy storage in micro-scale devices: recent advances in design and fabrication of micro-supercapacitors," Energy and Environmental Science, vol. 7, Issue 3, Jan. 2, 2014, Royal Society of Chemistry, pp. 867-884.

Beidaghi, Majid et al., "Micro-Supercapacitors Based on Interdigital Electrodes of Reduced Graphene Oxide and Carbon Nanotube Composites with Ultra high Power Handling Performance," Advanced Functional Materials, vol. 22, Issue 21, Nov. 2, 2012, Wiley-VCH Verlag GmbH & Co. KGaA, Weinheim, pp. 4501-4510.

Beidaghi, Majid et al.,"Micro-supercapacitors based on three dimensional interdigital polypyrrole/C-MEMS electrodes," Electrochimica Acta, vol. 56, Issue 25, Oct. 30, 2011, Elsevier Ltd., pp. 9508-9514.

Bélanger, Daniel et al., "Manganese Oxides: Battery Materials Make the Leap to Electrochemical Capacitors," Electrochemical Society Interface, vol. 17, Issue 1, Spring 2008, The Electrochemical Society, pp. 49-52.

Bian, Li-Jun et al., "Self-doped polyaniline on functionalized carbon cloth as electroactive materials for supercapacitor," Electrochimica Acta, vol. 64, Dec. 29, 2011, Elsevier Ltd., pp. 17-22.

Bouville, Florian et al., "Strong, tough and stiff bioinspired ceramics from brittle constituents," Nature Materials, vol. 13, Issue 5, Mar. 23, 2014, Macmillan Publishers Limited, pp. 1-7.

Brain, Marshall et al., "How Batteries Work," Battery Arrangement and Power—HowStuffWorks, http://electronics.howstuffworks.com/everyday-tech/battery6.htm/printable, accessed Dec. 14, 2015, HowStuffWorks, 4 pages.

Brodie, B.C., "Ueber das Atomgewicht des Graphits," Justus Liebigs Annalen der Chemie, vol. 114, Issue 1, 1860, Wiley-VCH Verlag GmbH & Co. KGaA, Weinheim, pp. 6-24.

Burke, Andrew, "R&D considerations for the performance and application of electrochemical capacitors," Electrochimica Acta, vol. 53, Jan. 26, 2007, Elsevier Ltd., pp. 1083-1091.

Cao, Liujun et al., "Direct Laser-Patterned Micro-Supercapacitors from Paintable $MoS_2$ Films," Small, vol. 9, Issue 17, Apr. 16, 2013, Wiley-VCH Verlag GmbH & Co. KGaA, Weinheim, pp. 2905-2910.

Chan, Candace K. et al., "High-performance lithium battery anodes using silicon nanowires," Nature Nanotechnology, vol. 3, Issue 1, Jan. 2008, Nature Publishing Group, pp. 31-35.

Chen, Cheng-Meng et al., "Macroporous 'bubble' graphene film via template-directed ordered-assembly for high rate supercapacitors," Chemical Communications, vol. 48, Issue 57, May 15, 2012, The Royal Society of Chemistry, pp. 1-3.

Chen, Ji et al., "High-yield preparation of graphene oxide from small graphite flakes via an improved Hummers method with a simple purification process," Carbon, vol. 81, Jan. 2015, Elsevier Ltd., pp. 1-9.

Chen, L. Y. et al., "Toward the Theoretical Capacitance of $RuO_2$ Reinforced by Highly Conductive Nanoporous Gold," Advanced Energy Materials, vol. 3, Issue 7, Jul. 2014, Wiley-VCH Verlag GmbH & Co. KGaA, Weinheim, pp. 851-856.

Chen, Wei et al., "High-Performance Nanostructured Supercapacitors on a Sponge," Nano Letters, vol. 11, Issue 12, Sep. 16, 2011, American Chemical Society, 22 pages.

Chen, Zongping et al, "Three-dimensional flexible and conductive interconnected graphene networks grown by chemical vapour deposition," Nature Materials, vol. 10, Issue 6, Jun. 2011, Macmillan Publishers Limited, pp. 424-428.

Cheng, Yingwen et al., "Synergistic Effects from Graphene and Carbon Nanotubes EnableFlexible and Robust Electrodes for High-PerformanceSupercapacitors," Nano Letters, vol. 12, Issue 8, Jul. 23, 2012, American Chemical Society, pp. 4206-4211.

Chi, Kai et al., "Freestanding Graphene Paper Supported Three-Dimensional Porous Graphene-Polyaniline Nanocomposite Synthesized by Inkjet Printing and in Flexible All-Solid-State Supercapacitor," ACS Applied Materials & Interfaces, vol. 6, Issue 18, Sep. 10, 2014, American Chemical Society, 8 pages.

Chmiola, John et al., "Monolithic Carbide-Derived Carbon Films for Micro-Supercapacitors," Science, vol. 328, Issue 5977, Apr. 2010, American Association for the Advancement of Science, 4 pages.

Choi, Bong Gill et al., "3D Macroporous Graphene Frameworks for Supercapacitors with High Energy and Power Densities," ACS Nano, vol. 6, Issue 5, Apr. 23, 2012, American Chemical Society, pp. 4020-4028.

Cooper, A. et al., "The UltraBattery—A new battery design for a new beginning in hybrid electric vehicle energy storage," Journal of Power Sources, vol. 188, Issue 2, Dec. 6, 2008, Elsevier B.V. pp. 642-649.

Deville, Sylvain, "Freeze-Casting of Porous Ceramics: A Review of Current Achievements and Issues," Advanced Engineering Materials, vol. 10, Issue 3, Mar. 20, 2008, Wiley-VCH Verlag GmbH & Co., pp. 155-169.

Deville, Sylvain, "Metastable and unstable cellular solidification of colloidal suspensions," Nature Materials, vol. 8, Dec. 2009, Macmillan Publishers Limited, pp. 966-972.

(56) References Cited

OTHER PUBLICATIONS

De Volder, Michaël et al., "Corrugated Carbon Nanotube Microstructures with Geometrically Tunable Compliance," ACS Nano, vol. 5, Issue 9, Aug. 1, 2011, pp. 7310-7317.
Dunn, Bruce et al., "Electrical Energy Storage for the Grid: A Battery of Choices," Science, vol. 334, Issue 928, Nov. 18, 2011, American Association for the Advancement of Science, pp. 928-935.
Eda, Goki et al., "Chemically Derived Graphene Oxide: Towards Large-Area Thin-Film Electronics and Optoelectronics," Advanced Materials, vol. 22, Issue 22, Apr. 28, 2010, Wiley-VCH Verlag GmbH & Co., pp. 2392-2415.
El-Kady, Maher F. et al., "Engineering Three-Dimensional Hybrid Supercapacitors and Micro-Supercapacitors for High-Performance Integrated Energy Storage," Proceedings of the National Academy of Sciences of the United States of America, vol. 112, Issue 14, Apr. 7, 2015, National Academy of Sciences, pp. 4233-4238.
El-Kady, Maher F. et al., "Laser Scribing of High-Performance and Flexible Graphene-Based Electrochemical Capacitors," Science Magazine, Mar. 16, 2012, vol. 335, No. 6074, 6 pages.
El-Kady, Maher F. et al., "Laser Scribing of High-Performance and Flexibile Graphene-Based Electrochemical Capacitors," Science, vol. 335, Issue 6074, Mar. 16, 2012, www.sciencemag.org/cgi/content/full/335/6074/1326/DC1, American Association for the Advancement of Science, 25 pages.
El-Kady, Maher F. et al., "Scalable Fabrication of High-Power Graphene Micro-Supercapacitors for Flexible and On-Chip Energy Storage," Nature Communications, vol. 4, Issue 1475, Feb. 12, 2013, Macmillan Publishers Limited, pp. 1-9.
El-Kady, Maher F. et al., "Supplementary Information: Scalable Fabrication of High-Power Graphene Micro-Supercapacitors for Flexible and On-Chip Energy Storage", Nature Communications, Submitted for Publication: Oct. 1, 2012, 23 pages.
Fan, Zhuangjun et al., "Asymmetric Supercapacitors Based on Graphene/$MnO_2$ and Activated Carbon Nanofiber Electrodes with High Power and Energy Density," Advanced Functional Materials, vol. 21, Issue 12, Jun. 21, 2011, Wiley-VCH Verlag GmbH & Co. KGaA, Weinheim, pp. 2366-2375.
Feng, Jun et al., "Metallic Few-Layered $VS_2$ Ultrathin Nanosheets: High Two-Dimensional Conductivity for In-Plane Supercapacitors," Journal of the American Chemical Society, vol. 133, Issue 44, Sep. 27, 2011, American Chemical Society, pp. 17832-17838.
Fischer, Anne E. et al., "Incorporation of Homogeneous, Nanoscale $MnO_2$ within Ultraporous Carbon Structures via Self-Limiting Electroless Deposition: Implications for Electrochemical Capacitors," Nano Letters, vol. 7, Issue 2, Jan. 13, 2007, American Chemical Society, pp. 281-286.
Foo, Ce Yao et al., "Flexible and Highly Scalable $V_2O_5$-rGO Electrodes in an Organic Electrolyte for Supercapacitor Devices," Advanced Energy Materials, vol. 4, Issue 12, Aug. 26, 2014, Wiley-VCH Verlag GmbH & Co. KGaA, Weinheim, pp. 1-7.
Gan, Shiyu et al., "Spontaneous and Fast Growth of Large-Area Graphene Nanofilms Facilitated by Oil/Water Interfaces," Advanced Materials, vol. 24, Issue 29, Jun. 12, 2012, Wiley-VCH Verlag GmbH & Co, pp. 3958-3964.
Gao, Wei et al., "Direct laser writing of micro-supercapacitors on hydrated graphite oxide films," Nature Nanotechnology, vol. 6, Issue 8, Jul. 2011, Macmillan Publishers Limited, pp. 496-500.
Gao, Wei et al., "Direct laser writing of micro-supercapacitors on hydrated graphite oxide films," Supplementary Information, Nature Nanotechnology, vol. 6, Issue 8, Jul. 2011, Macmillan Publishers Limited, 15 pages.
Gao, Hongcai et al., "Flexible All-Solid-State Asymmetric Supercapacitors Based on Free-Standing Carbon Nanotube/Graphene and $Mn_3O_4$ Nanoparticle/Graphene Paper Electrodes," Applied Materials & Interfaces, vol. 4, Issue 12, Nov. 20, 2012, American Chemical Society, pp. 7020-7026.
Gao, Hongcai et al., "High-Performance Asymmetric Supercapacitor Based on Graphene Hydrogel and Nanostructured $MnO_2$," ACS Applied Materials and Interfaces, vol. 4, Issue 5, Apr. 30, 2012, American Chemical Society, pp. 2801-2810.
Gao, Yu et al., "High power supercapcitor electrodes based on flexible TiC-CDC nano-felts," Journal of Power Sources, vol. 201, Issue 1, Mar. 2012, Elsevier B.V., pp. 368-375.
Gao, Lijun et al., "Power Enhancement of an Actively Controlled Battery/Ultracapacitor Hybrid," IEEE Transactions on Power Electronics, vol. 20, Issue 1, Jan. 2005, IEEE, pp. 236-243.
Ghasemi, S. et al., "Enhancement of electron transfer kinetics on a polyaniline-modified electrode in the presence of anionic dopants," Journal of Solid State Electrochemistry, vol. 12, Issue 3, Jul. 28, 2007, Springer-Verlag, pp. 259-268.
Ghidiu, Michael et al., "Conductive two-dimensional titanium carbide 'clay' with high volumetric capacitance," Nature, vol. 516, Dec. 4, 2014, Macmillan Publishers Limited, pp. 78-81.
Gilje, Scott et al., "A Chemical Route to Graphene for Device Applications," Nano Letters, vol. 7, Issue 11, Oct. 18, 2007, American Chemical Society, pp. 3394-3398.
Gilje, Scott et al., "Photothermal Deoxygenation of Graphene Oxide for Patterning and Distributed Ignition Applications," Advanced Materials, vol. 22, Issue 3, Oct. 26, 2009, Wiley-VCH Verlag GmbH & Co. KGaA, Weinheim, Germany, pp. 419-423.
Glavin, M.E. et al., "A Stand-alone Photovoltaic Supercapacitor Battery Hybrid Energy Storage System," Proceedings of the 13th International Power Electronics and Motion Control Conference (EPE-PEMC), Sep. 1-3, 2008, Poznań, Poland, IEEE, pp. 1688-1695.
Gogotsi, Y. et al., "True Performance Metrics in Electrochemical Energy Storage," Science Magazine, vol. 334, Issue 6058, Nov. 18, 2011, 4 pages.
Gracia, J. et al., "Corrugated layered heptazine-based carbon nitride: the lowest energy modifications of $C_3N_4$ ground state," Journal of Materials Chemistry, vol. 19, 2009, pp. 3013-3019.
Griffiths, Katie et al., "Laser-scribed graphene presents an opportunity to print a new generation of disposable electrochemical sensors," Nanoscale, vol. 6, Sep. 22, 2014, The Royal Society of Chemistry, pp. 13613-13622.
Guardia, L. et al., "UV light exposure of aqueous graphene oxide suspensions to promote their direct reduction, formation of graphene-metal nanoparticle hybrids and dye degradation," Carbon, vol. 50, Issue 3, Oct. 12, 2011, Elsevier Ltd., pp. 1014-1024.
Guerrero-Contreras, Jesus et al., "Graphene oxide powders with different oxidation degree, prepared by synthesis variations of the Hummers method," Materials Chemistry and Physics, vol. 153, Mar. 1, 2015, Elsevier B.V., pp. 1-12.
Günes, Fethullah et al., "Layer-by-Layer Doping of Few-Layer Graphene Film," ACS Nano, vol. 4, Issue 8, Jul. 27, 2010, American Chemical Society, pp. 4595-4600.
He, Xinping et al., "A new nanocomposite: Carbon cloth based polyaniline for an electrochemical supercapacitor," Electrochimica Acta, vol. 111, Aug. 17, 2013, Elsevier Ltd., pp. 210-215.
Hu, Liangbing et al., "Symmetrical $MnO_2$-Carbon Nanotube-Textile Nanostructures for Wearable Pseudocapacitors with High Mass Loading," ACS Nano, vol. 5, Issue 11, Sep. 16, 2011, American Chemical Society, pp. 8904-8913.
Huang, Yi et al., "An Overview of the Applications of Graphene-Based Materials in Supercapacitors," Small, vol. 8, Issue 12, Jun. 25, 2012, Wiley-VCH Verlag GmbH & Co. KGaA, Weinheim, pp. 1-30.
Huang, Ming et al., "Self-Assembly of Mesoporous Nanotubes Assembled from Interwoven Ultrathin Birnessite-type $MnO_2$ Nanosheets for Asymmetric Supercapacitors," Scientific Reports, vol. 4, Issue 3878, Jan. 27, 2014, ww.nature.com/scientificreports, pp. 1-8.
Hwang, Jee Y. et al., "Direct preparation and processing of graphene/RuO2 nanocomposite electrodes for high-performance capacitive energy storage," Nano Energy, vol. 18, Sep. 25, 2015, Elsevier B.V., pp. 57-70.
Jana, Milan et al., "Non-covalent functionalization of reduced graphene oxide using sulfanilic acid azocromotrop and its application as a supercapacitor electrode material," Journal of Materials Chemistry A, vol. 3, Issue 14, Feb. 24, 2015, The Royal Society of Chemistry, pp. 7323-7331.

(56) References Cited

OTHER PUBLICATIONS

Ji, Junyi et al., "Nanoporous Ni(OH)$_2$ Thin Film on 3D Ultrathin-Graphite Foam for Asymmetric Supercapacitor," ACS Nano, vol. 7, Issue 7, Jun. 11, 2013, American Chemical Society, pp. 6237-6243.
Jimbo, "Transistors," Sparkfun, https://learn.sparkfun.com/tutorials/transistors/extending-the-water-analogy, accessed Dec. 14, 2015, SparkFun Electronics, 3 pages.
Jin, H. Y. et al., "Controllable functionalized carbon fabric for high-performance all-carbon-based supercapacitors," RSC Advances, vol. 4, Issue 62, Jul. 15, 2014, The Royal Society of Chemistry, pp. 33022-33028.
Kang, Yu Jin et al., "All-solid-state flexible supercapacitors based on papers coated with carbon nanotubes and ionic-liquid-based gel electrolytes," Nanotechnology, vol. 23, Issue 6, Jan. 17, 2012, IOP Publishing Ltd, pp. 1-6.
Khaligh, Alireza et al., "Battery, Ultracapacitor, Fuel Cell, and Hybrid Energy Storage Systems for Electric, Hybrid Electric, Fuel Cell, and Plug-In Hybrid Electric Vehicles: State of the Art," IEEE Transactions on Vehicular Technology, vol. 59, Issue 6, Jul. 2010, IEEE, pp. 2806-2814.
Khomenko, V. et al., "Optimisation of an asymmetric manganese oxide/activated carbon capacitor working at 2 V in aqueous medium," Journal of Power Sources, vol. 153, Issue 1, Mar. 14, 2005, Elsevier B.V., pp. 183-190.
Kiani, Mohammad Ali et al., "Fabrication of High Power LiNi0.5Mn1.5O4 Battery Cathodes by Nanostructuring of Electrode Materials," RSC Advances, vol. 5, Issue 62, May 26, 2015, The Royal Society of Chemistry, pp. 1-6.
Kiani, M.A. et al., "Size effect investigation on battery performance: Comparison between micro- and nano-particles of 3-Ni(OH)$_2$ as nickel battery cathode material," Journal of Power Sources, vol. 195, Issue 17, Apr. 2, 2010, Elsevier B.V., pp. 5794-5800.
Kiani, M.A. et al., "Synthesis of Nano- and Micro-Particles of LiMn$_2$O$_4$: Electrochemical Investigation and Assessment as a Cathode in Li Battery," International Journal of Electrochemical Science, vol. 6, Issue 7, Jul. 1, 2011, ESG, pp. 2581-2595.
Kovtyukhova, Nina, I. et al., "Layer-by-Layer Assembly of Ultrathin Composite Films from Micron-Sized Graphite Oxide Sheets and Polycations," Kovtyukhova, et al, Chemistry of Materials, vol. 11, Issue 3, Jan. 28, 1999, American Chemical Society, pp. 771-778.
Lam, L.T. et al., "Development of ultra-battery for hybrid-electric vehicle applications," Journal of Power Sources, vol. 158, Issue 2, May 2, 2006, Elsevier B.V., pp. 1140-1148.
Lang, Xingyou et al., "Nanoporous metal/oxide hybrid electrodes for electrochemical supercapacitors," Nature Nanotechnology, vol. 6, Apr. 2011, Macmillan Publishers Limited, pp. 232-236.
Lee, Kyu Hyung et al., "Large scale production of highly conductive reduced graphene oxide sheets by a solvent-free low temperature reduction," Carbon, vol. 69, Dec. 16, 2013, Elsevier Ltd., pp. 327-335.
Lee, Kyoung, G. et al, "Sonochemical-assisted synthesis of 3D graphene/nanoparticle foams and their application in supercapacitor," Ultrasonics Sonochemistry, vol. 22, May 2, 2014, Elsevier B.V., pp. 422-428.
Lee, Seung Woo et al., "Carbon Nanotube/Manganese Oxide Ultrathin Film Electrodes for Electrochemical Capacitors," ACS Nano, vol. 4, Issue 7, Jun. 16, 2010, American Chemical Society, pp. 3889-3896.
Lei, Zhibin et al., "Platelet CMK-5 as an Excellent Mesoporous Carbon to Enhance the Pseudocapacitance of Polyaniline," ACS Applied Materials & Interfaces, vol. 5, Issue 15, Jul. 12, 2013, American Chemical Society, pp. 7501-7508.
Li, Dan et al., "Processable aqueous dispersions of graphene nanosheets," Nature Nanotechnology, vol. 3, Feb. 2008, Nature Publishing Group, pp. 101-105.
Li, Lei et al., "Nanocomposite of Polyaniline Nanorods Grown on Graphene Nanoribbons for Highly Capacitive Pseudocapacitors," ACS Applied Materials and Interfaces, vol. 5, Issue 14, Jun. 21, 2013, American Chemical Society, 6 pages.
Li, Peixu et al., "Core-Double-Shell, Carbon Nanotube@Polypyrrole@MnO$_2$ Sponge as Freestanding, Compressible Supercapacitor Electrode," ACS Applied Materials and Interfaces, vol. 6, Issue 7, Mar. 12, 2014, American Chemical Society, pp. 5228-5234.
Li, Qi et al., "Design and Synthesis of MnO$_{2/Mn/MnO2}$ Sandwich-Structured Nanotube Arrays with High Supercapacitive Performance for Electrochemical Energy Storage," Nano Letters, vol. 12, Issue 7, Jun. 25, 2012, American Chemical Society, pp. 3803-3807.
Li, Yingzhi et al., "Oriented Arrays of Polyaniline Nanorods Grown on Graphite Nanosheets for an Electrochemical Supercapacitor," Langmuir, vol. 29, Issue 1, Dec. 3, 2012, American Chemical Society, 8 pages.
Li, Zhe-Fei et al., "Fabrication of high-surface-area graphene/polyaniline nanocomposites and their application in supercapacitors," ACS Applied Materials & Interfaces, vol. 5, Issue 7, Mar. 12, 2013, American Chemical Society, pp. 1-25.
Lin, Jian et al., "3-Dimensional Graphene Carbon Nanotube Carpet-Based Microsupercapacitors with High Electrochemical Performance," Nano Letters, vol. 13, Issue 1, Dec. 13, 2012, American Chemical Society, pp. 72-78.
Linden, David et al., "Handbook of Batteries," McGraw-Hill Handbooks, Third Edition, 2010, New York, The McGraw-Hill Companies, Inc., 1,454 pages.
Liu, Wenwen et al., "Novel and high-performance asymmetric micro-supercapacitors based on graphene quantum dots and polyaniline nanofibers," Nanoscale, vol. 5, Apr. 24, 2013, The Royal Society of Chemistry, pp. 6053-6062.
Liu, Wen-Wen et al., "Superior Micro-Supercapacitors Based on Graphene Quantum Dots," Advanced Functional Materials, vol. 23, Issue 33, Mar. 26, 2013, Wiley-VCH Verlag GmbH & Co. KGaA, Weinheim, pp. 4111-4122.
Liu, Yongfeng et al., "Advanced hydrogen storage alloys for Ni/MH rechargeable batteries," Journal of Materials Chemistry, vol. 21, Issue 11, Dec. 15, 2010, The Royal Society of Chemistry, pp. 4743-4755.
Long, Jeffrey W. et al., "Asymmetric electrochemical capacitors—Stretching the limits of aqueous electrolytes," MRS Bulletin, vol. 36, Jul. 2011, Materials Research Society, pp. 513-522.
Lu, Xihong et al., "Stabilized TiN Nanowire Arrays for High-Performance and Flexible Supercapacitors," Nano Letters, vol. 12, Issue 10, Sep. 4, 2012, American Chemical Society, 6 pages.
Lukatskaya, Maria R. et al., "Cation Intercalation and High Volumetric Capacitance of Two-Dimensional Titanium Carbide," Science, vol. 341, Issue 6153, Sep. 27, 2013, American Association for the Advancement of Science, pp. 1502-1505.
Lukic, Srdjam, M. et al., "Power Management of an Ultracapacitor/Battery Hybrid Energy Storage System in an HEV," IEEE Vehicle Power and Propulsion Conference (VPPC), Sep. 6-8, 2006, IEEE, 6 pages.
Non-Final Office Action for U.S. Appl. No. 17/568,214, dated Sep. 15, 2022, 15 pages.
Office Action for Canadian Patent Application No. 2952233, dated Aug. 3, 2022, 4 pages.
Notice of Allowance for Canadian Patent Application No. 2968139, dated Jun. 6, 2022, 4 pages.
Technical Examination Report for Brazilian Patent Application No. 112017010257-9, dated Aug. 9, 2022, 7 pages.
Non-Final Office Action for U.S. Appl. No. 17/388,082, dated Oct. 4, 2022, 13 pages.
Notice of Allowance for Israeli Patent Application No. 261928, dated Sep. 19, 2022, 3 pages.
Notice of Preliminary Rejection for Korean Patent Application No. 10-2019-7008481, dated Aug. 1, 2022, 11 pages.
Second Office Action for Chinese Patent Application No. 2017800441862, dated Aug. 3, 2022, 12 pages.
Decision to Grant for Japanese Patent Application No. 2018-567030, dated Aug. 25, 2022, 5 pages.
Notice of Allowance for Israeli Patent Application No. 261620, dated Aug. 9, 2022, 3 pages.
Examination Report for Taiwanese Patent Application No. 107124318, dated Aug. 5, 2022, 6 pages.
Notice of Acceptance for Australian Patent Application No. 2015277264, dated Jul. 31, 2019, 3 pages.

(56) References Cited

OTHER PUBLICATIONS

Cannarella et al., "Mechanical Properties of a Battery Separator under Compression and Tension," Journal of the Electrochemical Society, vol. 161, No. 11, Sep. 26, 2014, pp. F3117-F3122.
Fernandez-Merino, M.J. et al., "Vitamin C Is an Ideal Substitute for Hydrazine in the Reduction of Graphene Oxide Suspensions," The Journal of Physical Chemistry C, vol. 114, No. 14, Mar. 4, 2010, American Chemical Society, pp. 6426-6432.
Gao, C. et al., "Superior Cycling Performance of SiOx/C Composite with Arrayed Mesoporous Architecture as Anode Material for Lithium-Ion Batteries," Journal of The Electrochemical Society, vol. 161, No. 14, 2014, The Electrochemical Society, pp. A2216-A2221.
Lu, J. et al., "Advanced applications of ionic liquids in polymer science," Progress in Polymer Science, vol. 34, 2009, Elsevier Ltd., pp. 431-448.
Vranes, M. et al., "Physicochemical Characterization of 1-Butyl-3-methylimidazolium and 1-Butyl-1-methylpyrrolidinium Bis{trifluoromethylsulfonyl)imide," Journal of Chemical & Engineering Data, vol. 57, Mar. 7, 2012, American Chemical Society, pp. 1072-1077.
Yan, Jun et al., "High-performance supercapacitor electrodes based on highly corrugated graphene sheets," Carbon, vol. 50, 2012, Elsevier Ltd., pp. 2179-2188.
Non-Final Office Action for U.S. Appl. No. 15/427,210, dated Sep. 3, 2019, 16 pages.
Notice of Allowance for U.S. Appl. No. 15/427,210, dated Dec. 18, 2019, 9 pages.
Office Action for Canadian Patent Application No. 2,862,806, dated Sep. 30, 2019, 3 pages.
Grant of Patent for Korean Patent Application No. 10-2014-7020353, dated Oct. 29, 2019, 3 pages.
Final Office Action for U.S. Appl. No. 15/612,405, dated Dec. 27, 2019, 17 pages.
Final Office Action for U.S. Appl. No. 16/029,930, dated Nov. 15, 2019, 16 pages.
Office Action for Canadian Patent Application No. 2,866,250, dated Dec. 17, 2019, 3 pages.
Examination Report for European Patent Application No. 13757195.6, dated Jan. 29, 2020, 4 pages.
Notice of Preliminary Rejection for Korean Patent Application No. 10-2014-7028084, dated Aug. 22, 2019, 30 pages.
Office Action for Brazilian Patent Application No. 112016029468, dated Jan. 21, 2020, 6 pages.
Third Office Action for Chinese Patent Application No. 201580043429.1, dated Jan. 3, 2020, 20 pages.
Examination Report for European Patent Application No. 15809519.0, dated Dec. 9, 2019, 7 pages.
Office Action for Israeli Patent Application No. 249506, dated Dec. 3, 2019, 8 pages.
Decision of Rejection for Japanese Patent Application No. 2016-573846, dated Oct. 29, 2019, 9 pages.
Non-Final Office Action for U.S. Appl. No. 14/945,232, dated Sep. 3, 2019, 8 pages.
Notice of Allowance for U.S. Appl. No. 14/945,232, dated Dec. 20, 2019, 9 pages.
Supplemental Notice of Allowability for U.S. Appl. No. 14/945,232, dated Feb. 12, 2020, 5 pages.
Office Action for Brazilian Patent Application No. 112017010257, dated Jan. 28, 2020, 7 pages.
Official Action for Eurasian Patent Application No. 201791078, dated Nov. 6, 2019, 4 pages.
Notification of Reasons for Rejection for Japanese Patent Application No. 2017-526533, dated Aug. 20, 2019, 4 pages.
Non-Final Office Action for U.S. Appl. No. 15/382,871, dated Sep. 16, 2019, 9 pages.
Applicant-Initiated Interview Summary for U.S. Appl. No. 15/382,871, dated Dec. 31, 2019, 5 pages.
Non-Final Office Action for U.S. Appl. No. 16/428,409, dated Sep. 16, 2019, 12 pages.
First Office Action for Chinese Patent Application No. 2016800753323, dated Aug. 27, 2019, 15 pages.
Notice of Allowance and Examiner-Initiated Interview Summary for U.S. Appl. No. 15/410,404, dated Oct. 25, 2019, 11 pages.
Corrected Notice of Allowability for U.S. Appl. No. 15/410,404, dated Dec. 3, 2019, 6 pages.
International Preliminary Report on Patentability for International Patent Application No. PCT/US2018/041728, dated Jan. 23, 2020, 7 pages.
First Office Action for Chinese Patent Application No. 2017800076125, dated Nov. 28, 2019, 20 pages.
Extended European Search Report for European Patent Application No. 17741923.1, dated Nov. 15, 2019, 18 pages.
Notice of Allowance for U.S. Appl. No. 15/472,409, dated Dec. 11, 2019, 11 pages.
Official Action for Eurasian Patent Application No. 201892199, dated Nov. 28, 2019, 6 pages.
Extended European Search Report for European Patent Application No. 17776536.9, dated Oct. 30, 2019, 8 pages.
Final Office Action for U.S. Appl. No. 15/688,342, dated Oct. 17, 2019, 11 pages.
Non-Final Office Action for U.S. Appl. No. 15/630,758, dated Oct. 11, 2019, 11 pages.
Extended European Search Report for European Paetnt Application No. 17816292.1, dated Jan. 7, 2020, 9 pages.
Examination Report for Indian Patent Application No. 201817044642, dated Nov. 26, 2019, 7 pages.
Applicant-Initiated Interview Summary for U.S. Appl. No. 15/466,425, dated Oct. 22, 2019, 3 pages.
Final Office Action for U.S. Appl. No. 15/466,425, dated Jan. 28, 2020, 8 pages.
Official Action for Eurasian Patent Application No. 201892118, dated Nov. 28, 2019, 4 pages.
Extended European Search Report for European Patent Application No. 17771081.1, dated Oct. 22, 2019, 6 pages.
Notice of Reexamination for Chinese Patent Application No. 201280070343.4, dated Feb. 3, 2020, 7 pages.
Notice of Preliminary Rejection for Korean Patent Application No. 10-2014-7028084, dated Feb. 17, 2020, 5 pages.
Examination Report for Indian Patent Application No. 201617042976, dated Mar. 13, 2020, 7 pages.
Office Action for Eurasion Patent Application No. 201990068, dated Aug. 30, 2021, 7 pages.
Notice of Preliminary Rejection for Korean Patent Application No. 10-2017-7000924, dated Aug. 25, 2021, 11 pages.
Office Action for Israeli Patent Application No. 260398, dated Jul. 20, 2021, 7 pages.
Examination Report for Australian Patent Application No. 2017321294, dated Aug. 24, 2021, 2 pages.
Notification of Reasons for Rejection for Japanese Patent Application No. 2019511650, dated Aug. 19, 2021, 13 pages.
Examination Report for Australian Patent Application No. 185870, dated Aug. 20, 2021, 2 pages.
Non-Final Office Action for U.S. Appl. No. 16/0004,818, dated Sep. 17, 2021, 20 pages.
Examination Report for Indian Patent Application No. 202017002602, dated Sep. 9, 2021, 6 pages.
Applicant-Initiated Interview Summary for U.S. Appl. No. 16/791,517, dated Aug. 27, 2021, 2 pages.
Office Action for Mexican Patent Application No. MX/a/2016/016239, dated Feb. 26, 2020, 5 pages.
Supplemental Notice of Allowability for U.S. Appl. No. 14/945,232, dated Feb. 26, 2020, 5 pages.
Notification of Reasons for Rejection for Japanese Patent Application No. 2017-526533, dated Mar. 16, 2020, 7 pages.
Second Office Action for Chinese Patent Application No. 2016800753323, dated Mar. 5, 2020, 15 pages.
Non-Final Office Action for U.S. Appl. No. 16/692,123, dated Dec. 27, 2019, 11 pages.
Non-Final Office Action for U.S. Appl. No. 15/688,342, dated Apr. 9, 2020, 10 pages.
Office Action for Eurasian Patent Application No. 201990587/31, dated Mar. 26, 2020, 4 pages.

(56) References Cited

OTHER PUBLICATIONS

Partial Supplemental European Search Report for European Patent Application No. 17847303.9, dated Apr. 3, 2020, 10 pages.
First Office Action for Chinese Patent Application No. 2017800249783, dated Jan. 6, 2020, 15 pages.
Final Office Action for U.S. Appl. No. 15/630,758, dated Apr. 15, 2020, 13 pages.
Author Unknown, "Sulfuric Acid—Density," The Engineering Toolbox, accessed Apr. 10, 2020 at https://www.engineeringtoolbox.com/indsulfuric-acid-density-d_2163.html, 6 pages.
Kang, J.H et al., "Hidden Second Oxidation Step of Hummers Method," Chemistry of Materials, vol. 28, 2016, American Chemical Society, pp. 756-764.
Dubal, D. P., et al., "Hybrid energy storage: the merging of battery and supercapacitor chemistries," Chemical Society Review, vol. 44, No. 7, 2015, pp. 1777-1790.
Garg, R. et al., "Nanowire Mesh Templated Growth of Out-of-Plane Three-Dimensional Fuzzy Graphene," ACS Nano, vol. 11, 2017, American Chemical Society, pp. 6301-6311.
Gong, M., et al., "Ultrafast high-capacity NiZn battery with NiAlCo-layered double hydroxide," Energy & Environmental Science, vol. 7, No. 6, 2014, pp. 2025-2032.
Humble, P. H., et al., "Microscopic nickel-zinc batteries for use in autonomous microsystems," Journal of the Electrochemical Society, vol. 148, No. 12, 2001, pp. A1357-A1361.
Li, Qintao et al., "Carbon nanotubes coated by carbon nanoparticles of turbostratic stacked graphenes," Carbon, vol. 46, 2008, Elsevier Ltd., pp. 434-439.
Mishra, G., et al., "Layered double hydroxides: A brief review from fundamentals to application as evolving biomaterials," Applied Clay Science, vol. 153, 2018, Elsevier B.V., pp. 172-186.
Parker, J. F., et al. "Rechargeable nickel-3D zinc batteries: An energy-dense, safer alternative to lithium-ion," Science, vol. 356, No. 6336, 2017, American Association for the Advancement of Science, pp. 415-418.
Examination Report No. 1 for Australian Patent Application No. 2019250120, dated Apr. 24, 2020, 4 pages.
Non-Final Office Action for U.S. Appl. No. 16/033,266, dated Apr. 29, 2020, 12 pages.
Office Action for Eurasian Patent Application No. 201790003, dated Feb. 26, 2020, 6 pages.
First Office Action and Search Report for Chinese Patent Application No. 201811438766.2, dated Mar. 31, 2020, 32 pages.
Advisory Action for U.S. Appl. No. 15/612,405, dated Jun. 24, 2020, 3 pages.
Notice of Allowance for U.S. Appl. No. 15/612,405, dated Sep. 8, 2020, 7 pages.
Non-Final Office Action for U.S. Appl. No. 16/029,930, dated Jun. 24, 2020, 16 pages.
Notice of Allowance for U.S. Appl. No. 16/223,869, dated Jul. 9, 2020, 9 pages.
Office Action for Vietnamese Patent Application No. 1-2016-05086, dated May 29, 2020, 2 pages.
Decision of Rejection for Chinese Patent Application No. 201580072540.3, dated Apr. 22, 2020, 8 pages.
Official Action for Eurasian Patent Application No. 201791078, dated Jun. 23, 2020, 4 pages.
Examination Report for Indian Patent Application No. 201717016755, dated Jul. 2, 2020, 6 pages.
Final Office Action for U.S. Appl. No. 16/428,409, dated Jun. 23, 2020, 16 pages.
Examination Report for Indian Patent Application No. 201817020826, dated Jul. 13, 2020, 7 pages.
Notice of Allowance for U.S. Appl. No. 16/692,123, dated Jul. 15, 2020, 9 pages.
Examination Report for Indian Patent Application No. 201817023184, dated Aug. 13, 2020, 6 pages.
First Office Action and Search Report for Chinese Patent Application No. 2017800273161, dated Jun. 5, 2020, 15 pages.
Examination Report for Indian Patent Application No. 201817034180, dated Aug. 13, 2020, 6 pages.
Extended European Search Report for European Patent Application No. 17847303.9, dated Jul. 13, 2020, 9 pages.
Official Notification for Eurasian Patent Application No. 201990068, dated Jun. 23, 2020, 5 pages.
Examination Report for European Patent Application No. 17816292.1, dated Aug. 24, 2020, 4 pages.
Advisory Action for U.S. Appl. No. 15/466,425, dated Jul. 7, 2020, 3 pages.
Non-Final Office Action for U.S. Appl. No. 15/466,425, dated Jul. 28, 2020, 8 pages.
Examination Report for Indian Patent Application No. 201817033309, dated Aug. 28, 2020, 6 pages.
Yang, Wanlu, et al., "Solvothermal One-Step Synthesis of Ni—Al Layered Double Hydroxide/Carbon Nanotube/Reduced Graphene Oxide Sheet Ternary Nanocomposite with Ultrahigh Capacitance for Supercapacitors," Applied Materials and Interfaces, vol. 5, 2013, American Chemical Society, pp. 5443-5454.
Decision of Reexamination for Chinese Patent Application No. 201580072540.3, dated Feb. 2, 2021, 18 pages.
Notification of Reasons for Rejection for Japanese Patent Application No. 2018-532233, dated Dec. 15, 2020, 8 pages.
Examination Report for Australian Patent Application No. 185870, dated Jan. 28, 2021, 5 pages.
Official Notification for Eurasian Patent Application No. 201990068, dated Jan. 14, 2021, 6 pages.
Notice of Preliminary Rejection for Korean Patent Application No. 10-2018-7029515, dated Jan. 21, 2021, 9 pages.
International Search Report and Written Opinion for International Patent Application No. PCT/US2020/052618, dated Feb. 17, 2021, 19 pages.
Chen, Da, et al., "Graphene-based materials in electrochemistry," Chemical Society Reviews, vol. 39, Issue 8, Jun. 2010, 24 pages.
Paik, Pradip, et al., "Polyaniline nanotubes with rectangular-hollow-core- and its self-assembled surface decoration: high conductivity and dielectric properties," RSC Advances, vol. 4, Issue 24, 2014, pp. 12342-12352.
Summons to Attend Oral Proceedings for European Patent Application No. 13757195.6, mailed Oct. 13, 2021, 6 pages.
Examination Report for European Patent Application No. 15809519.0, dated Oct. 12, 2021, 5 pages.
Examination Report for Canadian Patent Application No. 2968139, dated Oct. 6, 2021, 5 pages.
Office Action for Vietnamese Patent Application No. 1-2017-01911, dated Oct. 7, 2021, 3 pages.
Notification of Reasons for Rejection for Japanese Patent Application No. 2018-532233, dated Oct. 26, 2021, 6 pages.
Examination Report for European Patent Application No. 17741923.1, dated Oct. 22, 2021, 5 pages.
Examination Report for Australian Patent Application No. 2017245151, dated Nov. 2, 2021, 5 pages.
Office Action for Israeli Patent Application No. 261928, dated Oct. 12, 2021, 6 pages.
First Office Action for Chinese Patent Application No. 201780063416.X, dated Sep. 1, 2021, 14 pages.
Notice of Acceptance for Australian Patent Application No. 2017281543, dated Nov. 9, 2021, 3 pages.
Office Action for Israeli Patent Application No. 263442, dated Sep. 30, 2021, 8 pages.
Office Action for Korean Patent Application No. 10-2019-7001932, dated Oct. 25, 2021, 5 pages.
Office Action for Israeli Patent Application No. 261620, dated Aug. 31, 2021, 6 pages.
Examination Report for European Patent Application No. 15809519.0, dated May 17, 2022, 6 pages.
Non-Final Office Action for U.S. Appl. No. 16/791,517, dated Apr. 27, 2022, 12 pages.
Office Action for Brazilian Patent Application No. 112017010257, dated Apr. 12, 2022, 7 pages.
Notice of Allowance for Israeli Patent Application No. 259749, dated Apr. 28, 2022, 3 pages.

(56) References Cited

OTHER PUBLICATIONS

Notification to Grant for Chinese Patent Application No. 201780027316.1, dated Apr. 15, 2022, 4 pages.
Notice of Reasons for Refusal for Japanese Patent Application No. 2019511650, dated Mar. 28, 2022, 5 pages.
Examination Report for Taiwanese Patent Application No. 106129539, dated Mar. 9, 2022, 4 pages.
Grant of Patent for Korean Patent Application No. 10-2019-7001932, dated Apr. 18, 2022, 5 pages.
Examination Report for Indian Patent Application No. 201917053095, dated Mar. 28, 2022, 5 pages.
Notification of Reasons for Rejection for Japanese Patent Application No. 2021-041173, dated Mar. 11, 2022, 6 pages.
Notification of Reasons for Rejection for Japanese Patent Application No. 2018-532233, dated Apr. 1, 2022, 6 pages.
Notice of Allowance for U.S. Appl. No. 15/319,286, dated Oct. 1, 2018, 8 pages.
Corrected Notice of Allowability for U.S. Appl. No. 15/319,286, dated Oct. 29, 2018, 5 pages.
Corrected Notice of Allowability for U.S. Appl. No. 15/319,286, dated Nov. 30, 2018, 5 pages.
Corrected Notice of Allowability for U.S. Appl. No. 15/319,286, dated Jan. 18, 2019, 5 pages.
Notification of the First Office Action for Chinese Patent Application No. 201580043429.1, dated Oct. 29, 2018, 19 pages.
Advisory Action for U.S. Appl. No. 14/945,232, dated Oct. 15, 2018, 3 pages.
Non-Final Office Action for U.S. Appl. No. 14/945,232, dated Jan. 9, 2019, 7 pages.
Extended European Search Report for European Patent Application No. 15861794.4, dated Oct. 2, 2018, 13 pages.
Final Office Action for U.S. Appl. No. 15/382,871, dated Jan. 25, 2019, 16 pages.
Non-Final Office Action for U.S. Appl. No. 15/410,404, dated Sep. 27, 2018, 9 pages.
Final Office Action for U.S. Appl. No. 15/472,409, dated Jan. 18, 2019, 12 pages.
International Preliminary Report on Patentability for International Patent Application No. PCT/US2017/024716, dated Oct. 11, 2018, 10 pages.
International Preliminary Report on Patentability for International Patent Application No. PCT/US2017/038992, dated Jan. 3, 2019, 10 pages.
International Preliminary Report on Patentability for International Patent Application No. PCT/US2017/023632, dated Oct. 4, 2018, 8 pages.
Invitation to Pay Additional Fees for International Patent Application No. PCT/US2018/041728, dated Sep. 12, 2018, 2 pages.
International Search Report and Written Opinion for International Patent Application No. PCT/US2018/041728, dated Nov. 9, 2018, 10 pages.
Huang, L. et al., "Pulsed laser assisted reduction of graphene oxide," Carbon, vol. 49, 2011, Elsevier, pp. 2431-2436.
Kumar, P. et al., "Graphene produced by radiation-induced reduction of graphene oxide," Sep. 26, 2010, DOI: DOI:10.1142/S0219581X11008824, 23 pages.
Park, S. et al., "Colloidal Suspensions of Highly Reduced Graphene Oxide in a Wide Variety of Organic Solvents," Nano Letters, vol. 9, No. 4, 2009, American Chemical Society, pp. 1593-1597.
Non-Final Office Action for U.S. Appl. No. 15/427,210, dated Feb. 28, 2019, 17 pages.
Applicant-Initiated Interview Summary for U.S. Appl. No. 15/427,210, dated May 29, 2019, 3 pages.
Notice of Reexamination for Chinese Patent Application No. 201280070343.4, dated Jun. 27, 2019, 14 pages.
Examination Report for European Patent Application No. 12874989.2, dated Mar. 5, 2019, 5 pages.
Notice of Preliminary Rejection for Korean Patent Application No. 10-2014-7020353, dated Apr. 15, 2019, 11 pages.
Non-Final Office Action for U.S. Appl. No. 15/612,405, dated Jun. 18, 2019, 12 pages.
Non-Final Office Action for U.S. Appl. No. 16/029,930, dated Apr. 3, 2019, 13 pages.
Examination Report No. 1 for Australian Patent Application No. 2015277264, dated Mar. 7, 2019, 4 pages.
Notification of the Second Office Action for Chinese Patent Application No. 201580043429.1, dated Jun. 20, 2019, 9 pages.
Notice of Reasons for Rejection for Japanese Patent Application No. 2016-573846, dated Feb. 26, 2019, 8 pages.
Search Report for Japanese Patent Application No. 2016-573846, dated Feb. 28, 2019, 44 pages.
Interview Summary for U.S. Appl. No. 14/945,232, dated Apr. 11, 2019, 3 pages.
Final Office Action for U.S. Appl. No. 14/945,232, dated Jul. 17, 2019, 8 pages.
Examination Report No. 1 for Australian Patent Application No. 2015349949, dated Mar. 8, 2019, 4 pages.
Notice of Acceptance for Australian Patent Application No. 2015349949, dated Jul. 12, 2019, 3 pages.
Notification of the Second Office Action for Chinese Patent Application No. 201580072540.3, dated Mar. 7, 2019, 12 pages.
Official Action for Eurasian Patent Application No. 201791078, dated Mar. 27, 2019, 5 pages.
Interview Summary for U.S. Appl. No. 15/382,871, dated Apr. 1, 2019, 10 pages.
Advisory Action for U.S. Appl. No. 15/382,871, dated Apr. 24, 2019, 3 pages.
Notice of Allowance for U.S. Appl. No. 15/382,871, dated May 17, 2019, 10 pages.
Extended European Search Report for European Patent Application No. 16879927.8, dated Jul. 9, 2019, 14 pages.
Final Office Action for U.S. Appl. No. 15/410,404, dated Feb. 21, 2019, 9 pages.
Non-Final Office Action for U.S. Appl. No. 15/410,404, dated May 24, 2019, 9 pages.
Applicant-Initiated Interview Summary for U.S. Appl. No. 16/029,930, dated Jul. 29, 2019, 4 pages.
Partial Supplementary European Search Report for European Patent Application No. 17741923.1, dated Jul. 23, 2019, 13 pages.
Non-Final Office Action for U.S. Appl. No. 15/472,409, dated May 31, 2019, 12 pages.
Non-Final Office Action for U.S. Appl. No. 15/688,342, dated Mar. 26, 2019, 9 pages.
International Preliminary Report on Patentability for International Patent Application No. PCT/US2017/048883, dated Mar. 14, 2019, 7 pages.
Non-Final Office Action for U.S. Appl. No. 15/466,425, dated Jul. 10, 2019, 8 pages.
Notification of the Third Office Action for Chinese Patent Application No. 201580072540.3, dated Jul. 17, 2019, 9 pages.
Luo, Zhi-Jia et al., "A timesaving, low-cost, high-yield method for the synthesis of ultrasmall uniform graphene oxide nanosheets and their application in surfactants," Nanotechnology, vol. 27, Issue 5, Dec. 16, 2015, IOP Publishing Ltd, pp. 1-8.
Maiti, Sandipan et al., "Interconnected Network of $MnO_2$ Nanowires with a "Cocoonlike" Morphology: Redox Couple-Mediated Performance Enhancement in Symmetric Aqueous Supercapacitor," ACS Applied Materials & Interfaces, vol. 6, Issue 13, Jun. 16, 2014, American Chemical Society, pp. 10754-10762.
Maiti, Uday Narayan et al., "Three-Dimensional Shape Engineered, Interfacial Gelation of Reduced Graphene Oxide for High Rate, Large Capacity Supercapacitors," vol. 26, Issue 4, Jan. 29, 2014, Wiley-VCH Verlag GmbH & Co., pp. 615-619.
Mao, Lu et al., "Surfactant-stabilized graphene/polyaniline nanofiber composites for high performance supercapacitor electrode," Journal of Materials Chemistry, vol. 22, Issue 1, Oct. 12, 2011, The Royal Society of Chemistry, pp. 80-85.
Marcano, Daniela C. et al., "Improved Synthesis of Graphene Oxide," ACS Nano, vol. 4, Issue 8, Jul. 22, 2010, American Chemical Society, pp. 4806-4814.

(56) References Cited

OTHER PUBLICATIONS

Miller, John R. et al., "Electrochemical Capacitors for Energy Management," Materials Science, vol. 321, Aug. 1, 2008, AAAS, pp. 651-652.

Moosavifard, Seyyed E. et al., "Designing 3D highly ordered nanoporous CuO electrodes for high-performance asymmetric supercapacitors," ACS Applied Materials & Interfaces, vol. 7, Issue 8, American Chemical Society, 13 pages.

Moussa, Mahmoud et al., "Free-Standing Composite Hydrogel Film for Superior Volumetric Capacitance," Journal of Materials Chemistry A, vol. 3, Issue 30, Jun. 19, 2015, The Royal Society of Chemistry, pp. 1-8.

Naoi, Katsuhiko et al., "Second generation 'nanohybrid supercapacitor': Evolution of capacitive energy storage devices," Energy & Environmental Science, vol. 5, Issue 11, Sep. 14, 2012, The Royal Society of Chemistry, pp. 9363-9373.

Nathan, Arokia et al., "Flexible Electronics: The Next Ubiquitous Platform," Proceedings of the IEEE, vol. 100, Special Centennial Issue, May 13, 2012, IEEE, pp. 1486-1517.

Niu, Zhiqiang et al., "A Leavening Strategy to Prepare Reduced Graphene Oxide Foams," Advanced Materials, vol. 24, Issue 30, Aug. 8, 2012, Wiley-VCH Verlag GmbH & Co., pp. 1-7.

Oudenhoven, Jos F. M. et al., "All-Solid-State Lithium-Ion Microbatteries: A Review of Various Three-Dimensional Concepts," Advanced Energy Matterials, vol. Issue 1, Wiley-VCH Verlag GmbH & Co. KGaA, Weinheim, pp. 10-33.

Paravannoor, Anjali et al., "High voltage supercapacitors based on carbon-grafted NiO nanowires interfaced with an aprotic ionic liquid," Chemical Communications, vol. 51, Issue 28, Feb. 26, 2015, The Royal Society of Chemistry, pp. 1-4.

Patel, Mehul N. et al., "Hybrid $MnO_2$-disordered mesoporous carbon nanocomposites: synthesis and characterization as electrochemical pseudocapacitor electrodes," Journal of Materials Chemistry, vol. 20, Issue 2, Nov. 11, 2009, The Royal Society of Chemistry, pp. 390-398.

Pech, David et al, "Ultrahigh-power micrometre-sized supercapacitors based on onion-like carbon," Nature Nanotechnology, vol. 5, Sep. 2010, Macmillan Publishers Limited, 10 pages.

Pendashteh, Afshin et al., "Fabrication of anchored copper oxide nanoparticles on graphene oxide nanosheets via an electrostatic coprecipitation and its application as supercapacitor," Electrochimica Acta, vol. 88, Oct. 29, 2012, Elsevier Ltd., pp. 347-357.

Pendashteh, Afshin et al., "Facile synthesis of nanostructured $CuCo_2O_4$ as a novel electrode material for high-rate supercapacitors," vol. 50, Issue 16, Dec. 17, 2013, The Royal Society of Chemistry, 4 pages.

Pendashteh, Afshin et al., "Highly Ordered Mesoporous $CuCo_2O_4$ Nanowires, a Promising Solution for High-Performance Supercapacitors," Chemistry of Materials, vol. 27, Issue 11, Apr. 20, 2015, American Chemical Society, pp. 1-11.

Qing, Xutang et al., "P/N/O co-doped carbonaceous materials based supercapacitor with voltage up to 1.9 V in the aqueous electrolyte," RSC Advances, vol. 4, Issue 99, Oct. 21, 2014, Royal Society of Chemistry, pp. 1-22.

Qiu, Ling et al., "Controllable Corrugation of Chemically Converted Graphene Sheets in Water and Potential Application for Nanofiltration," Chemical Communications, vol. 47, 2011, pp. 5810-5812.

Qu, Qunting et al., "Core-Shell Structure of Polypyrrole Grown on $V_2O_5$ Nanoribbon as High Performance Anode Material for Supercapacitors," Advanced Energy Materials, vol. 2, Issue 8, 2012, Wiley-VCH Verlag GmbH & Co., pp. 1-6.

Raccichini, Rinaldo et al., "The role of graphene for electrochemical energy storage," Nature Materials, vol. 14, Issue 3, Dec. 22, 2014, Macmillan Publishers Limited, pp. 1-9.

Samitsu, Sadaki et al., "Flash freezing route to mesoporous polymer nanofibre networks," Nature Communications, vol. 4, Issue 2653, Oct. 22, 2013, Macmillan Publishers Limited, pp. 1-7.

Shao, Yuanlong et al., "Fabrication of large-area and high-crystallinity photoreduced graphene oxide films via reconstructed two-dimensional multilayer structures," NPG Asia Materials, vol. 6, Issue 8, e119, Aug. 15, 2014, Nature Publishing Group, pp. 1-9.

Shao, Yuanlong et al., "Graphene-based materials for flexible supercapacitors," Chemical Society Review, vol. 44, Issue 11, Apr. 22, 2015, The Royal Society of Chemistry, 27 pages.

Shao, Yuanlong et al., "High-performance flexible asymmetric supercapacitors based on 3D porous graphene/$MnO_2$ nanorod and graphene/Ag hybrid thin-film electrodes," Journal of Materials Chemistry C, vol. 1, Dec. 5, 2012, The Royal Society of Chemistry, pp. 1245-1251.

Sheats, James R., "Manufacturing and commercialization issues in organic electronics," Journal of Materials Research, vol. 19, Issue 7, Jul. 2004, Materials Research Society, pp. 1974-1989.

Shen, Caiwei et al., "A high-energy-density micro supercapacitor of asymmetric $MnO_2$-carbon configuration by using micro-fabrication technologies," Journal of Power Sources, vol. 234, Feb. 9, 2013, Elsevier B.V., pp. 302-309.

Shen, Jiali et al., "High-Performance Asymmetric Supercapacitor Based on Nano-architectured Polyaniline/Graphene/Carbon Nanotube and Activated Graphene Electrodes," ACS Applied Materials & Interfaces, vol. 5, Issue 17, Aug. 9, 2013, American Chemical Society, 36 pages.

Shown, Indrajit et al., "Conducting polymer-based flexible supercapacitor," Energy Science & Engineering, vol. 3, Issue 1, Nov. 19, 2014, Society of Chemical Industry and John Wiley & Sons Ltd., pp. 1-25.

Simon, P. et al., "Capacitive Energy Storage in Nanostructured Carbon-Electrolyte Systems," Accounts of Chemical Research, vol. 46, Issue 5, Jun. 6, 2012, American Chemical Society, 10 pages.

Simon, Patrice et al., "Materials for electrochemical capacitors," Nature Materials, vol. 7, Issue 11, Nov. 2008, Macmillan Publishers Limited, pp. 845-854.

Simon, Patrice et al., "Where Do Batteries End and Supercapacitors Begin?" Science, vol. 343, Issue 6176, Mar. 14, 2014, American Association for the Advancement of Science, 3 pages.

Snook, Graeme A. et al., "Conducting-polymer-based supercapacitor devices and electrodes," Journal of Power Sources, vol. 196, Jul. 15, 2010, Elsevier B.V., pp. 1-12.

Stoller, Meryl D. et al., "Graphene-Based Ultracapacitors," Nano Letters, vol. 8, Issue 10, Sep. 13, 2008, American Chemical Society, pp. 3498-3502.

Strong, Veronica et al., "Patterning and Electronic Tuning of Laser Scribed Graphene for Flexible All-Carbon Devices," ACS Nano, vol. 6, Issue 2, Jan. 13, 2012, American Chemical Society, pp. 1395-1403.

Su, Zijin et al., "Scalable fabrication of $MnO_2$ nanostructure deposited on free-standing Ni nanocone arrays for ultrathin, flexible, high-performance micro-supercapacitor," Energy and Environmental Science, vol. 7, May 28, 2014, The Royal Society of Chemistry, pp. 2652-2659.

Sumboja, Afriyanti et al., "Large Areal Mass, Flexible and Free-Standing Reduced Graphene Oxide/Manganese Dioxide Paper for Asymmetric Supercapacitor Device," Advanced Materials, vol. 25, Issue 20, May 28, 2013, Wiley-VCH Verlag GmbH & Co. KGaA, Weinheim, pp. 2809-2815.

Tian, Yuyu et al., "Synergy of $W_{18}O_{49}$ and Polyaniline for Smart Supercapacitor Electrode Integrated with Energy Level Indicating Functionality," Nano Letters, vol. 14, Issue 4, Mar. 4, 2014, American Chemical Society, pp. 2150-2156.

Toupin, Mathieu et al., "Charge Storage Mechanism of $MnO_2$ Electrode Used in Aqueous Electrochemical Capacitor," Chemistry of Materials, vol. 16, Issue 16, Jul. 16, 2004, American Chemical Society, pp. 3184-3190.

Tran, Henry D. et al., "The oxidation of aniline to produce "polyaniline": a process yielding many different nanoscale structures," Journal of Materials Chemistry, vol. 21, Issue 11, Nov. 25, 2010, The Royal Society of Chemistry, pp. 3534-3550.

Viculis, Lisa M. et al., "A Chemical Route to Carbon Nanoscrolls," Science, vol. 299, Issue 5611, Feb. 28, 2003, American Association for the Advancement of Science, 2 pages.

Vonlanthen, David et al., "A Stable Polyaniline-Benzoquinone-Hydroquinone Supercapacitor," Advanced Materials, vol. 26, Issue 30, Jun. 13, 2014, Wiley-VCH Verlag GmbH & Co., pp. 1-6.

(56) References Cited

OTHER PUBLICATIONS

Wallace, Gordon G. et al., "Processable aqueous dispersions of graphene nanosheets," Nature Nanotechnology, vol. 3, Issue 2, 2008, Nature Publishing Group, pp. 101-105.
Wang, Gongkai et al., "Flexible Pillared Graphene-Paper Electrodes for High-Performance Electrochemical Supercapacitors," Small, vol. 8, Issue 3, Dec. 8, 2011, pp. 452-459.
Wang, Guoping et al., "A review of electrode materials for electrochemical supercapacitors," Chemical Society Reviews, vol. 41, Jul. 21, 2011, The Royal Society of Chemistry, pp. 797-828.
Wang, Guoxiu et al., "Graphene nanosheets for enhanced lithium storage in lithium ion batteries," Carbon, vol. 47, Issue 8, Apr. 1, 2009, Elsevier Ltd., pp. 2049-2053.
Wang, Hailiang et al., "$Mn_3O_4$-Graphene Hybrid as a High-Capacity Anode Material for Lithium Ion Batteries," Journal of the American Chemical Society, vol. 132, Issue 40, Oct. 13, 2010, American Chemical Society, pp. 13978-13980.
Wang, Huanlei et al., "Graphene-Nickel Cobaltite Nanocomposite Asymmetrical Supercapacitor with Commercial Level Mass Loading," Nano Research, vol. 5, Issue 9, Sep. 2012, Tsinghua University Press and Springer-Verlag Berlin Heidelberg, pp. 605-617.
Wang, Kai et al., "Flexible supercapacitors based on cloth-supported electrodes of conducting polymer nanowire array/SWCNT composites," Journal of Materials Chemistry, vol. 21, Issue 41, Sep. 20, 2011, The Royal Society of Chemistry, pp. 16373-16378.
Shao, et al., "3D Freeze-Casting of Cellular Graphene Films for Ultrahigh-Power-Density Supercapacitors," Advanced Materials, vol. 28, 2016, 8 pages.
Notice of Allowance for U.S. Appl. No. 16/428,409, dated May 14, 2021, 10 pages.
Notice of Allowance for U.S. Appl. No. 15/630,758, dated May 14, 2021, 11 pages.
Examination Report for European Patent Application No. 15861794.4, dated Apr. 14, 2021, 4 pages.
Examination Report for Australian Patent Application No. 2017245151, dated Mar. 25, 2021, 5 pages.
Second Office Action for Chinese Patent Application No. 2017800273161, dated Apr. 6, 2021, 8 pages.
Notification of Reasons for Rejection for Japanese Patent Application No. 2018-567030, dated Apr. 5, 2021, 8 pages.
Examination Report for Australian Patent Application No. 2017238201, dated Mar. 17, 2021, 4 pages.
Final Office Action for U.S. Appl. No. 16/791,504, dated May 27, 2021, 16 pages.
Advisory Action for U.S. Appl. No. 16/791,517, dated Mar. 23, 2022, 3 pages.
Decision to Grant for European Patent Application No. 16879927.8, dated Mar. 24, 2022, 2 pages.
Examination Report for Taiwanese Patent Application No. 106102134, dated Jan. 26, 2022, 44 pages.
Notice of Acceptance for Australian Patent Application No. 2017245151, dated Mar. 4, 2022, 3 pages.
Notification of Reasons for Rejection for Japanese Patent Application No. 2018-567030, dated Feb. 24, 2022, 4 pages.
Decision of Rejection for Chinese Patent Application No. 2017800249783, dated Jan. 18, 2022, 7 pages.
Office Action for Israeli Patent Application No. 264868, dated Dec. 22, 2021, 8 pages.
Notice of Allowance for U.S. Appl. No. 16/791,504, dated Mar. 16, 2022, 9 pages.
Intention to Grant for European Patent Application No. 13757195.6, dated Jun. 1, 2022, 7 pages.
Technical Report for Brazilian Patent Application No. 112016029468, dated Apr. 29, 2022, 16 pages.
Notification of the First Office Action for Chinese Patent Application No. 202110481254X, dated Apr. 2, 2022, 23 pages.
Intention to Grant for European Patent Application No. 15861794.4, dated May 25, 2022, 7 pages.
Notice of Allowance for Israeli Patent Application No. 260398, dated May 22, 2022, 3 pages.
Office Action for Canadian Patent Application No. 2,952,233, dated Jun. 29, 2021, 4 pages.
Office Action for Eurasian Patent Application No. 201790003, dated May 20, 2021, 7 pages.
Written Opinion for Brazilian Patent Application No. 112019004128, dated Jun. 25, 2021, 6 pages.
Notice of Acceptance for Australian Patent Application No. 2016378400, dated Jul. 30, 2021, 3 pages.
Wang, Xu et al., "Manganese Oxide Micro-Supercapacitors with Ultra-high Areal Capacitance," Electronic Supplementary Material (ESI) for Nanoscale, vol. 5, Mar. 21, 2013, The Royal Society of Chemistry, 6 pages.
Wang, Xuebin et al., "Three-dimensional strutted graphene grown by substrate-free sugar blowing for high-power-density supercapacitors," Nature Communications, vol. 4, Issue 2905, Dec. 16, 2013, Macmillan Publishers Limited, pp. 1-8.
Wassei, Jonathan K. et al., "Oh the Places You'll Go with Graphene", Accounts of Chemical Research, Dec. 20, 2012, Vers. 9, 11 pages.
Weng, Zhe et al., "Graphene-Cellulose Paper Flexible Supercapacitors," Advanced Energy Materials, vol. 1, Issue 5, Aug. 10, 2011, Wiley-VCH Verlag GmbH & Co., pp. 917-922.
Wu, Zhong-Shuai et al., "Graphene Anchored with $Co_3O_4$ Nanoparticles as Anode of Lithium Ion Batteries with Enhanced Reversible Capacity and Cyclic Performance," ACS Nano, vol. 4, Issue 6, May 10, 2010, American Chemical Society, pp. 3187-3194.
Xie, Guoxin, "Direct Electrochemical Synthesis of Reduced Graphene Oxide (rGO)/Copper Composite Films and Their Electrical/Electroactive Properties," Applied Materials & Interfaces, vol. 6, Issue 10, May 1, 2014, American Chemical Society, pp. 7444-7455.
Xu, Bin et al., "Sustainable nitrogen-doped porous carbon with high surface areas prepared from gelatin for supercapacitors," Journal of Materials Chemistry, vol. 22, Issue 36, Jul. 25, 2012, The Royal Society of Chemistry, pp. 19088-19093.
Xu, Jing et al., "Flexible Asymmetric Supercapacitors Based upon $Co_9S_8$ Nanorod//$Co_3O_4$@$RuO_2$ Nanosheet Arrays an Carbon Cloth," ACS Nano, vol. 7, Issue 6, May 6, 2013, American Chemical Society, pp. 5453-5462.
Xu, Yuxi et al., "Flexible Solid-State Supercapacitors Based on Three-Dimensional Graphene Hydrogel Films," ACS Nano, vol. 7, Issue 5, Apr. 4, 2013, American Chemical Society, 8 pages.
Xu, Zhanwei et al., "Electrochemical Supercapacitor Electrodes from Sponge-like Graphene Nanoarchitectures with Ultrahigh Power Density," The Journal of Physical Chemistry Letters, vol. 3, Issue 20, Sep. 25, 2012, American Chemical Society, pp. 2928-2933.
Yan, Jun et al., "Fast and reversible surface redox reaction of graphene-MnO2composites as supercapacitor electrodes," Carbon, vol. 48, Issue 13, Jun. 25, 2010, Elsevier Ltd., pp. 3825-3833.
Yan, Jun et al., "Recent Advances in Design and Fabrication of Electrochemical Supercapacitors with High Energy Densities," Advanced Energy Materials, vol. 4, Issue 4, 1300816, Dec. 23, 2013, Wiley-VCH Verlag GmbH & Co., pp. 1-43.
Yang, Xiaowei et al., "Bioinspired Effective Prevention of Restacking in Multilayered Graphene Films: Towards the Next Generation of High-Performance Supercapacitors," Advanced Materials, vol. 23, Issue 25, May 10, 2011, Wiley-VCH Verlag GmbH & Co., pp. 2833-2838.
Yang, Peihua et al., "Low-Cost High-Performance Solid-State Asymmetric Supercapacitors Based on $MnO_2$ Nanowires and $Fe_2O_3$ Nanotubes," Nano Letters, vol. 14, Issue 2, Jan. 1, 2014, American Chemical Society, pp. 731-736.
Yang, Xiaowei et al, "Liquid-Mediated Dense Integration of Graphene Materials for Compact Capacitive Energy Storage," Science, vol. 341, Issue 6145, Aug. 2, 2013, American Association for the Advancement of Science, 5 pages.
Yoo, Eunjoo et al., "Large Reversible Li Storage of Graphene Nanosheet Families for Use in Rechargeable Lithium Ion Batteries," Nano Letters, vol. 8, Issue 8, Jul. 24, 2008, American Chemical Society, pp. 2277-2282.
Yoo, Jung Joon et al., "Ultrathin Planar Graphene Supercapacitors," Nano Letters, vol. 11, Issue 4, Mar. 7, 2011, American Chemical Society, pp. 1423-1427.

(56) References Cited

OTHER PUBLICATIONS

Yu, Dingshan et al., "Scalable synthesis of hierarchically structured carbon nanotube-graphene fibres for capacitive energy storage," Nature Nanotechnology, vol. 9, Issue 7, May 11, 2014, Macmillan Publishers Limited, pp. 1-8.
Yu, Guihua et al., "Solution-Processed Graphene/$MnO_2$ Nanostructured Textiles for High-Performance Electrochemical Capacitors," Nano Letters, vol. 11, Issue 7, Jun. 13, 2011, American Chemical Society, pp. 2905-2911.
Yu, Pingping et al., "Graphene-Wrapped Polyaniline Nanowire Arrays on Nitrogen-Doped Carbon Fabric as Novel Flexible Hybrid Electrode Materials for High-Performance Supercapacitor," Langmuir, vol. 30, Issue 18, Apr. 24, 2014, American Chemical Society, pp. 5306-5313.
Yu, Pingping et al., "Polyaniline Nanowire Arrays Aligned on Nitrogen-Doped Carbon Fabric for High-Performance Flexible Supercapacitors," Langmuir, vol. 29, Issue 38, Aug. 28, 2013, American Chemical Society, 8 pages.
Yu, Zenan et al., "Supercapacitor electrode materials: nanostructures from 0 to 3 dimensions," Energy & Environmental Science, vol. 8, Issue 3, Dec. 3, 2014, The Royal Society of Chemistry, pp. 702-730.
Zhang, Jintao et al., "A high-performance asymmetric supercapacitor fabricated with graphene-based electrodes," Energy & Environmental Science, vol. 4, Issue 10, Aug. 2, 2011, The Royal Society of Chemistry, pp. 4009-4015.
Zhang, Li et al., "High Voltage Super-capacitors for Energy Storage Devices Applications," 14th Symposium on Electromagnetic Launch Technology, Jun. 10-13, 2008, IEEE, pp. 1-4.
Zhang, Long et al., "Porous 3D graphene-based bulk materials with exceptional high surface area and excellent conductivity for supercapacitors," Scientific Reports, vol. 3, Issue 1408, Mar. 11, 2013, Nature Publishing Group, pp. 1-9.
Zhang, Yonglai et al., "Direct imprinting of microcircuits on graphene oxides film by femtosecond laser reduction," Nano Today, vol. 5, Issue 1, Jan. 19, 2010, Elsevier Ltd., pp. 15-20.
Zhang, Zheye et al., "Facile Synthesis of 3D $MnO_2$-Graphene and Carbon Nanotube-Graphene Composite Networks for High-Performance, Flexible, All-Solid-State Asymmetric Supercapacitors," Advanced Energy Materials, vol. 4, Issue 10, Jul. 15, 2014, Wiley-VCH Verlag GmbH & Co. KGaA, Weinheim, pp. 1-9.
Zhang, Zhongshen et al., "A New-Type Ordered Mesoporous Carbon/Polyaniline Composites Prepared by a Two-step Nanocasting Method for High Performance Supercapacitor Applications," Journal of Materials Chemistry A, vol. 2, Issue 39, Aug. 13, 2014, Royal Society of Chemistry, pp. 1-25.
Zhao, Xin et al., "Incorporation of Manganese Dioxide within Ultraporous Activated Graphene for High-Performance Electrochemical Capacitors," ACS Nano, vol. 6, Issue 6, May 3, 2012, American Chemical Society, pp. 5404-5412.
Zhi, Mingjia et al, "Nanostructured carbon-metal oxide composite electrodes for supercapacitors: a review," Nanoscale, vol. 5, Issue 1, Oct. 23, 2012, The Royal Society of Chemistry, pp. 72-88.
Zhou, Chuanqiang et al., "Synthesis of Polyaniline Hierarchical Structures in a Dilute SDS/HCI Solution: Nanostructure-Covered Rectangular Tubes," Macromolecules, vol. 42, Issue 4, Jan. 27, 2009, American Chemical Society, pp. 1252-1257.
Zhou, Guangmin et al., "Graphene-Wrapped $Fe_3O_4$ Anode Material with Improved Reversible Capacity and Cyclic Stability for Lithium Ion Batteries," Chemistry of Materials, vol. 22, Issue 18, Aug. 26, 2010, American Chemical Society, pp. 5306-5313.
Zhu, Xianjun et al., "Nanostructured Reduced Graphene Oxide/$Fe_2O_3$ Composite As a High-Performance Anode Material for Lithium Ion Batteries," ACS Nano, vol. 5, Issue 4, Mar. 28, 2011, American Chemical Society, pp. 3333-3338.
Zhu, Yanwu et al., "Carbon-Based Supercapacitors Produced by Activation of Graphene," Science, vol. 332, May 12, 2011, www.sciencemag.org, pp. 1537-1541.
Zoski, Cynthia G., "Handbook of Electrochemistry," First Edition, 2007, Las Cruces, New Mexico, USA, Elsevier B. V., 935 pages.
Non-Final Office Action for U.S. Appl. No. 13/725,073, dated Apr. 15, 2016, 32 pages.
Final Office Action for U.S. Appl. No. 13/725,073, dated Oct. 4, 2016, 38 pages.
First Examination Report for Australian Patent Application No. 2012378149, dated Jul. 28, 2016, 3 pages.
First Office Action for Chinese Patent Application No. 201280070343.4, dated Jul. 23, 2015, 29 pages.
Second Office Action for Chinese Patent Application No. 201280070343.4, dated Apr. 6, 2016, 8 pages.
Third Office Action for Chinese Patent Application No. 201280070343.4, dated Sep. 7, 2016, 25 pages.
Extended European Search Report for European Patent Application No. 12874989.2, dated Jun. 17, 2015, 6 pages.
Notice of Reason for Rejection for Japanese Patent Application No. 2014-548972, dated Feb. 7, 2017, 5 pages.
International Search Report and Written Opinion for PCT/US2012/071407, dated Nov. 12, 2013, 9 pages.
International Preliminary Report on Patentability for PCT/US2012/071407 dated Jul. 3, 2014, 6 pages.
Non-Final Office Action for U.S. Appl. No. 14/382,463, dated Jan. 6, 2017, 23 pages.
Notice of Allowance for U.S. Appl. No. 14/382,463, dated Apr. 6, 2017, 7 pages.
First Examination Report for Australian Patent Application No. 2013230195, dated May 27, 2016, 4 pages.
First Office Action and Search Report for Chinese Patent Application No. 201380023699.7, dated Nov. 21, 2016, 21 pages.
Extended European Search Report for European Patent Application No. 13757195.6, dated Jul. 1, 2015, 9 pages.
Office Action for Eurasian Patent Application No. 201790003, dated Dec. 9, 2021, 5 pages.
Decision to Grant for Japanese Patent Application No. 2020-034093, dated Feb. 8, 2022, 5 pages.
Notice of Allowance for Korean Patent Application No. 10-2018-7030385, dated Jan. 27, 2022, 5 pages.
Examination Report for European Patent Application No. 17847303.9, dated Jan. 26, 2022, 6 pages.
Hearing Notice for Indian Patent Application No. 201817044642, dated Feb. 18, 2022, 2 pages.
Notice of Acceptance for Australian Patent Application No. 2017238201, dated Jan. 14, 2022, 3 pages.
Final Office Action for U.S. Appl. No. 16/004,818, dated Feb. 2, 2022, 21 pages.
Author Unknown, "Sulfuric Acid—Density," The Engineering ToolBox, www.engineeringtoolbox.com/indsulfuric-acid-density-d_2163.html, accessed Oct. 2, 2020, 3 pages.
Wikipedia, "Ferromagnetism," Feb. 13, 2017, Retrieved Aug. 7, 2018 from https://en.wikipedia.org/w/index.php?title=Ferromagnetism&oldid=765289868, 1 page.
Grosu, Yaroslav et al., "Natural Magnetite for thermal energy storage: Excellent thermophysical properties, reversible latent heat transition and controlled thermal conductivity," Solar Energy Materials & Solar Cells, vol. 161, Available online Dec. 6, 2016, Elsevier B.V., pp. 170-176.
Hwang, J. Y., et al., "Boosting the Capacitance and Voltage of Aqueous Supercapacitors via Redox Charge Contribution from both Electrode and Electrolyte," Nano Today, vol. 15, Available online Jul. 22, 2017, pp. 15-25.
Karami, Hassan et al., "Sodium Sulfate Effects on the Electrochemical Behaviors of Nanostructured Lead Dioxide and Commercial Positive Plates of Lead-Acid Batteries," International Journal of Electrochemical Science, vol. 5, 2010, ESG, pp. 1046-1059.
Lee, Juhan, et al., "High Performance Hybrid Energy Storage with Potassium Ferricyanide Redox Electrolyte," Applications of Materials and Interfaces, vol. 8, Aug. 2016, ACS, pp. 23676-23687.
Zhang, Luojiang, et al., "3D porous layered double hydroxides grown on graphene as advanced electrochemical pseudocapacitor materials," Journal of Materials Chemistry A, vol. 1, 2013, pp. 9046-9053.
Non-Final Office Action for U.S. Appl. No. 16/791,504, dated Nov. 18, 2020, 16 pages.

(56) References Cited

OTHER PUBLICATIONS

Reexamination Decision for Chinese Patent Application No. 201280070343.4, dated Aug. 31, 2020, 19 pages.
Notice of Allowance for U.S. Appl. No. 15/612,405, dated Dec. 17, 2020, 8 pages.
Non-Final Office Action for U.S. Appl. No. 16/029,930, dated Jan. 6, 2021, 15 pages.
Second Office Action for Chinese Patent Application No. 201811438766.2, dated Oct. 28, 2020, 10 pages.
Notice of Allowability for U.S. Appl. No. 16/223,869, dated Sep. 15, 2020, 5 pages.
Notice of Acceptance for Australian Patent Application No. 2019250120, dated Nov. 11, 2020, 3 pages.
Notification of Reexamination for Chinese Patent Application No. 2015800725403, dated Oct. 12, 2020, 9 pages.
Office Action for Israeli Patent Application No. 252320, dated Sep. 17, 2020, 11 pages.
Notification of Decision of Rejection for Japanese Patent Application No. 2017-526533, dated Nov. 17, 2020, 6 pages.
Non-Final Office Action for U.S. Appl. No. 16/428,409, dated Oct. 1, 2020, 14 pages.
Examination Report for Australian Patent Application No. 2016378400, dated Sep. 22, 2020, 5 pages.
Examination Report for Taiwanese Patent Application No. 105142233, dated Sep. 25, 2020, 19 pages.
Applicant-Initiated Interview Summary for U.S. Appl. No. 15/410,404, dated Aug. 2, 2019, 3 pages.
Notice of Allowance for U.S. Appl. No. 16/692,123, dated Oct. 21, 2020, 8 pages.
Examination Report for Australian Patent Application No. 2017209117, dated Oct. 5, 2020, 5 pages.
Official Notification for Eurasion Application No. 20182199, dated Dec. 11, 2020, 6 pages.
Examination Report for Taiwanese Patent Application No. 106111115, dated Aug. 25, 2020, 17 pages.
Non-Final Office Action for U.S. Appl. No. 15/630,758, dated Oct. 1, 2020, 14 pages.
Notification of the Second Office Action for Chinese Patent Application No. 2017800249783, dated Dec. 2, 2020, 9 pages.
Official Action for Eurasion Patent Application No. 201892118, dated Dec. 11, 2020, 6 pages.
Examination Report for Taiwanese Patent Application No. 106109733, dated Oct. 20, 2020, 11 pages.
Invitation To Pay Additional Fees for International Patent Application No. PCT/US2018/036846, dated Aug. 24, 2018, 2 pages.
International Search Report and Written Opinion for International Patent Application No. PCT/US2018/036846, dated Nov. 9, 2018, 14 pages.
International Preliminary Report on Patentability for International Patent Application No. PCT/US2018/036846, dated Dec. 26, 2019, 10 pages.
Non-Final Office Action for U.S. Appl. No. 16/0004,818, dated Jun. 24, 2020, 18 pages.
Final Office Action for U.S. Appl. No. 16/033,266, dated Jan. 6, 2021, 10 pages.
Notice of Allowance and Examiner-Initiated Interview Summary for U.S. Appl. No. 16/784,578, dated Oct. 15, 2020, 9 pages.
Invitation to Pay Additional Fees and Partial Search for International Patent Application No. PCT/US2020/052618, dated Nov. 30, 2020, 2 pages.
Notice of Allowance for U.S. Appl. No. 17/080,352, dated Aug. 17, 2022, 8 pages.
Written Decision on Registration for Korean Patent Application No. 10-2017-7000924, dated Jun. 21, 2022, 9 pages.
Office Action for Israeli Patent Application No. 252320, dated Jun. 13, 2022, 15 pages.
Office Action for Mexican Patent Application No. MX/a/2017/006315, dated Jun. 3, 2022, 5 pages.
Office Action for Brazilian Patent Application No. 112018068945, dated Jun. 23, 2022, 6 pages.
Decision to Grant for Japanese Patent Application No. 2019-511650, dated Jun. 24, 2022, 6 pages.
Office Action for Brazilian Patent Application No. 112018069339, dated Jun. 23, 2022, 6 pages.
Notification of Reasons for Rejection for Japanese Patent Application No. 2019-568633, dated May 31, 2022, 6 pages.
Notice of Preliminary Rejection for Korean Patent Application No. 10-2020-7000725, dated Jun. 3, 2022, 14 pages.
Second Office Action for Chinese Patent Application No. 2018800459108, dated Jun. 27, 2022, 7 pages.
Notification of Reasons for Rejection for Japanese Patent Application No. 2020-500741, dated Jun. 23, 2022, 12 pages.
Notice of Preliminary Rejection for Korean Patent Application No. 10-2020-7001506, dated Jul. 27, 2022, 11 pages.
Lin, Jian, et al., "Laser-induced porous graphene films from commercial polymers," Nature Communications, Dec. 2014, 8 pages.
Notice of Reasons for Refusal for Japanese Patent Application No. 2020-034093, dated Jun. 1, 2021, 10 pages.
Intention to Grant for European Patent Application No. 16879927.8, dated Jun. 9, 2021, 5 pages.
Official Notification for Eurasion Patent Application No. 20182199, dated Jun. 4, 2021, 12 pages.
Intention to Grant for European Patent Application No. 17776536.9, dated Jul. 2, 2021, 7 pages.
Request for additional materials for Eurasian Patent Application No. 201990587, dated May 21, 2021, 6 pages.
Written Opinion for Brazilian Patent Application No. 112018076559, dated Jun. 8, 2021, 6 pages.
Notification of the Third Office Action for Chinese Patent Application No. 2017800249783, dated May 21, 2021, 8 pages.
Official Notification for Eurasian Patent Application No. 201892118, dated Jun. 18, 2021, 8 pages.
Examination Report for European Patent Application No. 17771081.1, dated Jun. 17, 2021, 4 pages.
Extended European Search Report for European Patent Application No. 18832324.0, dated Jun. 24, 2021, 15 pages.
An, et al., "Fabrication of graphene/polypyrrole nanotube/MnO2 nanotube composite and its supercapacitor application," European Physical Journal, Applied Physics, vol. 58, 2012, 9 pages.
Gu, et al., "Synthesis of polyaniline nanotubes with controlled rectangular or square pore shape," Materials Letters, vol. 121, 2014, pp. 12-14.
Liu, Jianhua, et al., "Synthesis of a Graphene-Polypyrrole Nanotube Composite and Its Application in Supercapacitor Electrode," Journal of The Electrochemical Society, vol. 159, Issue 6, Apr. 2012, 6 pages.
Wang, et al., "Polyaniline nanotube arrays as high-performance flexible electrodes for electrochemical energy storage devices," Journal of Materials Chemistry, vol. 22, 2012, pp. 2401-2404.
Non-Final Office Action for U.S. Appl. No. 16/751,314, dated Jul. 13, 2021, 13 pages.
Notice of Allowance for U.S. Appl. No. 16/033,266, dated Jun. 3, 2021, 9 pages.
Corrected Notice of Allowability for U.S. Appl. No. 16/033,266, dated Jun. 4, 2021, 7 pages.
Notice of Preliminary Rejection for Korean Patent Application No. 10-2017-7015753, dated Nov. 17, 2021, 9 pages.
Notification of Reasons for Rejection for Japanese Patent Application No. 2018-538110, dated Oct. 29, 2021, 12 pages.
Third Office Action for Chinese Patent Application No. 2017800273161, dated Nov. 2, 2021, 17 pages.
Notice of Acceptance for Australian Patent Application No. 2017321294, dated Nov. 30, 2021, 3 pages.
Office Action for Eurasian Patent Application No. 201990587, dated Dec. 10, 2021, 4 pages.
First Office Action for Chinese Patent Application No. 2017800441862, dated Dec. 10, 2021, 17 pages.
Hearing Notice for Indian Patent Application No. 201817044642, dated Jan. 18, 2022, 2 pages.
Grant of Patent for Korean Patent Application No. 10-2018-7029515, dated Nov. 25, 2021, 4 pages.

(56) References Cited

OTHER PUBLICATIONS

Patil, Dipali, et al., "Investigations on silver/polyaniline electrodes for electrochemical supercapacitors," Physical Chemistry Chemical Physics, vol. 14, 2012, pp. 11886-11895.
Shao, et al., "Fabrication of polyaniline nanowire/TiO2 nanotube array electrode for supercapacitors," Energy, vol. 87, 2015, Elsevier Ltd., pp. 578-585.
Non-Final Office Action for U.S. Appl. No. 16/791,504, dated Dec. 7, 2021, 14 pages.
Final Office Action for U.S. Appl. No. 16/751,314, dated Jan. 19, 2022, 19 pages.
Office Action for Canadian Patent Application No. 2952233, dated Jan. 6, 2022, 4 pages.
Hearing Notice for Indian Patent Application No. 201817044642, dated Dec. 27, 2021, 2 pages.
First Office Action for Chinese Patent Application No. 2018800459108, dated Oct. 29, 2021, 18 pages.
Notice of Reasons for Rejection for Japanese Patent Application No. 2014-561017, dated Mar. 21, 2017, 10 pages.
International Search Report and Written Opinion for PCT/US2013/029022, dated Jun. 26, 2013, 13 pages.
International Preliminary Report on Patentability for PCT/US2013/029022 dated Sep. 18, 2014, 9 pages.
International Search Report and Written Opinion for International Patent Application No. PCT/US2015/036082, dated Aug. 27, 2015, 15 pages.
International Preliminary Report on Patentability for International Patent Application No. PCT/US2015/036082, dated Dec. 29, 2016, 12 pages.
International Search Report and Written Opinion for International Patent Application No. PCT/US2015/061400, dated Mar. 29, 2016, 20 pages.
Invitation to Pay Additional Fees for International Patent Application No. PCT/US2016/067468, dated Feb. 13, 2017, 2 pages.
Conway, B. E., "Chapter 2: Similarities and Differences between Supercapacitors and Batteries for Storing Electrical Energy," Electrochemical Supercapacitors: Scientific Fundamentals and Technological Applications (book), 1999, New York, Springer Science + Business Media, pp. 11-12.
Conway, B. E., "Chapter 3: Energetics and Elements of the Kinetics of Electrode Processes," Electrochemical Supercapacitors: Scientific Fundamentals and Technological Applications (book), 1999, New York, Springer Science + Business Media, pp. 33-34.
Ozawa, Kazunori, "Lithium-Cell System—Nonaqueous Electrolyte System," Lithium Ion Rechargeable Batteries (book), Chapter 1: General Concepts, Section 1.1.2, 2009, Wiley-VCH Verlag GmbH & Co. KGaA, 5 pages.
Root, Michael, "Electric Vehicles," The TAB™ Battery Book: An In-Depth Guide to Construction, Design, and Use (book), Chapter 2: The Many Uses of Batteries, 2011, The McGraw-Hill Companies, 4 pages.
Kaewsongpol, Tanon et al., "High-performance supercapacitor of electrodeposited porous 3Dpolyaniline nanorods on functionalized carbon fiber paper: Effects of hydrophobic and hydrophilic surfaces of conductive carbon paper substrates," Materials Today Communications, vol. 4, Aug. 19, 2015, Elsevier Ltd., pp. 176-185.
Yan, Jun et al., "Preparation of graphene nanosheet/carbon nanotube/polyaniline composite as electrode material for supercapacitors," Journal of Power Sources, vol. 195, Issue 9, Nov. 11, 2009, Elsevier B.V., pp. 3041-3045.
Non-Final Office Action for U.S. Appl. No. 13/725,073, dated Aug. 28, 2017, 41 pages.
Fourth Office Action for Chinese Patent Application No. 201280070343.4, dated Apr. 26, 2017, 22 pages.
Examination Report for European Patent Application No. 12874989.2, dated Jul. 24, 2017, 5 pages.
Notice of Reason for Rejection for Japanese Patent Application No. 2014-548972, dated May 23, 2017, 4 pages.
Second Office Action for Chinese Patent Application No. 201380023699.7, dated Aug. 9, 2017, 8 pages.
Communication pursuant to Article 94(3) EPC for European Patent Application No. 13757195.6, dated Jul. 6, 2017, 3 pages.
International Preliminary Report on Patentability for International Patent Application No. PCT/US2015/061400, dated Jun. 1, 2017, 16 pages.
International Search Report and Written Opinion for International Patent Application No. PCT/US2016/067468, dated Apr. 21, 2017, 10 pages.
International Search Report and Written Opinion for International Patent Application No. PCT/US2017/014126, dated Apr. 20, 2017, 13 pages.
International Search Report and Written Opinion for International Patent Application No. PCT/US2017/024716, dated Jun. 20, 2017, 13 pages.
International Search Report and Written Opinion for International Patent Application No. PCT/US2017/023632, dated May 31, 2017, 11 pages.
International Search Report and Written Opinion for International Patent Application No. PCT/US2017/038992, dated Sep. 21, 2017, 12 pages.
Invitation to Pay Additional Fees for International Patent Application No. PCT/US2017/048883, dated Sep. 29, 2017, 2 pages.
International Search Report and Written Opinion for International Patent Application No. PCT/US2017/048883, dated Dec. 26, 2017, 10 pages.
Non-Final Office Action for U.S. Appl. No. 14/945,232, dated Jan. 29, 2018, 9 pages.
Extended European Search Report for European Patent Application No. 15809519.0, dated Feb. 5, 2018, 10 pages.
Decision on Rejection for Chinese Patent Application No. 201280070343.4, dated Jan. 5, 2018, 18 pages.
Non-Final Office Action for U.S. Appl. No. 15/612,405, dated Feb. 9, 2018, 9 pages.
Decision to Grant a Patent for Japanese Patent Application No. 2014-561017, dated Mar. 13, 2018, 4 pages.
Final Office Action for U.S. Appl. No. 13/725,073, dated Apr. 6, 2018, 37 pages.
Notice of Allowance for U.S. Appl. No. 15/612,405, dated May 16, 2018, 8 pages.
Third Office Action and Search Report for Chinese Patent Application No. 201380023699.7, dated Mar. 9, 2018, 16 pages.
Examination Report for European Patent Application No. 13757195.6, dated Jun. 13, 2018, 7 pages.
Non-Final Office Action for U.S. Appl. No. 15/319,286, dated Jun. 27, 2018, 9 pages.
Final Office Action for U.S. Appl. No. 14/945,232, dated Aug. 10, 2018, 7 pages.
Notification of the First Office Action for Chinese Patent Application No. 201580072540.3, dated Jun. 25, 2018, 14 pages.
Partial Supplementary European Search Report for European Patent Application No. 15861794.4, dated Jun. 28, 2018, 16 pages.
Non-Final Office Action for U.S. Appl. No. 15/382,871, dated Jun. 27, 2018, 11 pages.
International Preliminary Report on Patentability for International Patent Application No. PCT/US2016/067468, dated Jul. 5, 2018, 7 pages.
International Preliminary Report on Patentability for International Patent Application No. PCT/US2017/014126, dated Aug. 2, 2018, 10 pages.
Non-Final Office Action for U.S. Appl. No. 15/472,409, dated Jun. 29, 2018, 11 pages.
Decision on Rejection for Chinese Patent Application No. 201380023699.7, dated Aug. 16, 2018, 11 pages.
Braz, Elton P., et al., "Effects of Gamma Irradiation in Graphene/Poly(ethylene Oxide) Nanocomposites," 2013 International Nuclear Atlantic Conference—INAC 2013, Nov. 24-29, 2013, Recife, PE, Brazil, 7 pages.
Hu, Liangbing, et al., "Lithium-Ion Textile Batteries with Large Areal Mass Loading," Advanced Energy Materials, vol. 1, Issue 6, Oct. 6, 2011, pp. 1012-1017.
First Office Action for Canadian Patent Application No. 2,862,806, dated Nov. 22, 2018, 5 pages.

(56) References Cited

OTHER PUBLICATIONS

Non-Final Office Action for U.S. Appl. No. 16/029,930, dated Jan. 14, 2019, 8 pages.
Office Action for Canadian Patent Application No. 2,866,250, dated Jan. 11, 2019, 3 pages.
Notice of Allowance for U.S. Appl. No. 16/029,930, dated Oct. 20, 2021, 7 pages.
Final Office Action for U.S. Appl. No. 16/791,517, dated Oct. 18, 2021, 11 pages.
Office Action for Israeli Patent Application No. 259749, dated Jun. 27, 2021, 6 pages.
Notice of Acceptance for Australian Patent Application No. 2017209117, dated Oct. 6, 2021, 3 pages.
Notification of Decision of Rejection for Japanese Patent Application No. 2018-550836, dated Sep. 10, 2021, 6 pages.
Examination Report for Taiwanese Patent Application No. 106129539, dated Sep. 3, 2021, 10 pages.
Notice of Preliminary Rejection for Korean Patent Application No. 10-2018-7030385, dated Mar. 13, 2021, 10 pages.
Notice of Reasons for Rejection for Japanese Patent Application No. 2018-549538, dated Feb. 15, 2021, 6 pages.
Non-Final Office Action for U.S. Appl. No. 16/791,517, dated Apr. 1, 2021, 16 pages.
Applicant-Initiated Interview Summary for U.S. Appl. No. 16/428,409, dated Mar. 19, 2021, 2 pages.
Applicant-Initiated Interview Summary for U.S. Appl. No. 16/033,266, dated Apr. 8, 2021, 3 pages.
Partial Supplementary European Search Report for European Patent Application No. 18832324.0, dated Mar. 12, 2021, 15 pages.
Notification of Reasons for Rejection for Japanese Patent Application No. 2018-538110, dated Jan. 20, 2021, 9 pages.
Notification of Reasons for Rejection for Japanese Patent Application No. 2018-550836, dated Feb. 12, 2021, 6 pages.
Examination Report for Taiwanese Patent Application No. 106121056, dated Feb. 3, 2021, 10 pages.
Notice of Allowance for U.S. Appl. No. 15/466,425, dated Mar. 10, 2021, 9 pages.
Final Office Action for U.S. Appl. No. 16/004,818, dated Feb. 25, 2021, 24 pages.
Notification of Decision of Rejection for Japanese Patent Application No. 2021-041173, dated Jan. 5, 2023, 6 pages.
First Office Action for Chinese Patent Application No. 2018800466506, dated Dec. 19, 2022, 17 pages.
Office Action for Israeli Patent Application No. 264868, dated Sep. 29, 2022, 6 pages.
Written Decision on Registration for Korean Patent Application No. 10-2017-7015753, dated Sep. 19, 2022, 7 pages.
Decision to Grant for Japanese Patent Application No. 2018-532233, dated Oct. 4, 2022, 6 pages.
Notice of Allowance for Taiwanese Patent Application No. 106102134, dated Oct. 14, 2022, 3 pages.
Office Action for Canadian Patent Application No. 3018568, dated Sep. 22, 2022, 4 pages.
Non-Final Office Action for U.S. Appl. No. 17/332,008, dated Apr. 20, 2023, 8 pages.
Decision to Grant for Japanese Patent Application No. 2020-500741, dated Apr. 5, 2023, 5 pages.
Intention to Grant for European Patent Application No. 18818264.6, dated Mar. 10, 2023, 9 pages.
Non-Final Office Action for U.S. Appl. No. 16/004,818, dated Mar. 14, 2023, 22 pages.
Notice of Allowability for U.S. Appl. No. 17/080,352, dated Nov. 18, 2022, 4 pages.
Notice of Allowability for U.S. Appl. No. 17/080,352, dated Dec. 7, 2022, 4 pages.
Reasons for the Rejection for Taiwanese Patent Application No. 106129539, dated Oct. 6, 2022, 7 pages.
Technical Report for Brazilian Patent Application No. 112016029468, dated Nov. 16, 2022, 8 pages.
Final Office Action for U.S. Appl. No. 16/791,517, dated Feb. 13, 2023, 12 pages.
Office Action for Canadian Patent Application No. 3006997, dated Dec. 16, 2022, 6 pages.
Non-Final Office Action for U.S. Appl. No. 17/110,397, dated Jan. 24, 2023, 9 pages.
Notice Before Allowance for Israeli Patent Application No. 263442, dated Jan. 10, 2023, 3 pages.
Final Office Action for U.S. Appl. No. 17/388,082, dated Apr. 27, 2023, 8 pages.
Office Action for Canadian Patent Application No. 3009208, dated Feb. 13, 2023, 5 pages.
Notice of Preliminary Rejection for Korean Patent Application No. 10-2018-7022104, dated Mar. 2, 2023, 11 pages.
Office Action for Brazilian Patent Application No. 112018068945, dated Apr. 4, 2023, 4 pages.
Examination Report for Canadian Patent Application No. 3017238, dated Mar. 31, 2023, 4 pages.
Notification of Reasons for Rejection for Japanese Patent Application No. 2022-001425, dated Mar. 10, 2023, 6 pages.
Technical Examination Report for Brazilian Patent Application No. 112019004128, dated Mar. 17, 2023, 7 pages.
Final Office Action for U.S. Appl. No. 17/568,214, dated Jun. 30, 2023, 16 pages.
Notice of Allowance for U.S. Appl. No. 16/791,517, dated Jun. 22, 2023, 7 pages.
Office Action for Brazilian Patent Application No. 112018076559-7, dated Apr. 18, 2023, 6 pages.
Notice of Last Preliminary Rejection for Korean Patent Application No. 10-2020-7000725, dated Apr. 25, 2023, 13 pages.
Kumar, et al., "Cobaltite oxide nanosheets anchored graphene nanocomposite as an efficient oxygen reduction reaction (ORR) catalyst for the application of lithium-air batteries," Journal of Power Sources, vol. 288, Apr. 2015, Elsevier B.V., pp. 451-460.
Examination Report for European Patent Application No. 17847303.9, dated May 3, 2023, 7 pages.
Examination Report for European Patent Application No. 17771081.1, dated Apr. 28, 2023, 4 pages.
Shetzline, et al., "Quantifying Electronic and Ionic Conductivity Contributions in Carbon/Polyelectrolyte Composite Thin Films," Journal of the Electrochemical Society, vol. 161, Issue 14, Oct. 10, 2014, pp. H917-H923.
Notice of Allowance for U.S. Appl. No. 17/110,397, dated Jul. 31, 2023, 8 pages.
Office Action for Canadian Patent Application No. 3025940, dated May 23, 2023, 6 pages.
Office Action for Brazilian Patent Application No. 112018069339, dated May 30, 2023, 6 pages.
Office Action for Canadian Patent Application No. 3018568, dated Jul. 13, 2023, 4 pages.
Notice of Allowance for Taiwanese Patent Application No. 107124318, dated Aug. 10, 2023, 3 pages.
Written Decision on Registration for Korean Patent Application No. 10-2020-7001506, dated Jun. 15, 2023, 8 pages.
Office Action for Canadian Patent Application No. 3033140, dated Jul. 25, 2023, 3 pages.

* cited by examiner

DEVICES COMPRISING CARBON-BASED MATERIAL AND FABRICATION THEREOF

CROSS-REFERENCE

This application is a divisional of U.S. patent application Ser. No. 15/688,342, filed Aug. 28, 2017, now U.S. Pat. No. 10,938,021, which claims the benefit of U.S. Provisional Application No. 62/381,859, filed Aug. 31, 2016, which applications are incorporated herein by reference in their entireties.

BACKGROUND

As a result of the rapidly growing energy needs of modern life, the development of high-performance energy storage devices has gained significant attention.

Lithium-ion batteries (LIBs) are very popular in portable electronics because of their high energy density and small memory effect. They play an important role in the progress of electric vehicles, power tools, and military and aerospace applications. LIBs in some cases dominate the market for energy storage. However, like any other any storage system, LIBs still suffer from many shortcomings. While normal electronic devices have seen very rapid progress following Moore's law, batteries have advanced only slightly, mainly because of the lack of new materials with high charge storage capacity.

SUMMARY

Recognized herein is the need for higher performance energy storage devices (also "devices" herein). Provided herein are carbon-based materials, fabrication processes, and devices with improved performance.

In some embodiments, the present disclosure provides batteries (e.g., rechargeable batteries) that may avoid shortcomings of current battery technology. Provided herein are materials and fabrication processes of such batteries. In some embodiments, carbon-based lithium-ion batteries (LIBs) that may avoid shortcomings of current LIB technology are disclosed. Prototype carbon-based batteries disclosed herein may provide improved performance compared with commercial LIB s. In certain embodiments, the batteries described herein may hold twice as much charge compared with commercial LIBs. The batteries described herein may have double the capacity of commercial cells, provide twice the power of commercial cells, have a cycle life and be used for twice as long, or any combination thereof. In certain embodiments, the batteries described herein not only may have double the capacity of commercial cells but also may provide twice the power and be used for twice as long.

The batteries described herein may play an important role in one or more applications or areas, for example, portable electronics (e.g., cellphones, computers, and cameras), medical devices (e.g., life-sustaining and life-enhancing medical devices, including pacemakers, defibrillators, hearing aids, pain management devices, and drug pumps), electric vehicles (e.g., batteries with long lifetime are needed to improve the electric vehicles industry), space (e.g., the batteries may be used in space to power space systems including rovers, landers, spacesuits, and electronic equipment), military batteries (e.g., the military uses special batteries for powering a large number of electronics and equipment; the reduced mass and volume of the batteries described herein are highly preferred), electric aircraft (e.g., an aircraft that runs on electric motors rather than internal combustion engines, with electricity coming from solar cells or batteries), grid scale energy storage (e.g., batteries may be used to store electrical energy during times when production, from power plants, exceeds consumption and the stored energy may be used at times when consumption exceeds production), renewable energy (e.g., since the sun does not shine at night and the wind does not blow at all times, batteries in off-the-grid power systems may store excess electricity from renewable energy sources for use during hours after sunset and when the wind is not blowing; high power batteries may harvest energy from solar cells with higher efficiency than current state-of-the-art batteries), power tools (e.g., the batteries described herein may enable fast-charging cordless power tools such as drills, screwdrivers, saws, wrenches, and grinders; current batteries have a long recharging time), or any combination thereof.

Other goals and advantages of the device of the present disclosure will be further appreciated and understood when considered in conjunction with the following description and accompanying drawings. While the following description may contain specific details describing particular embodiments of the device of the present disclosure, this should not be construed as limitations to the scope of the device of the present disclosure but rather as an exemplification of preferable embodiments. For each aspect of the device of the present disclosure, many variations are possible as suggested herein that are known to those of ordinary skill in the art. A variety of changes and modifications may be made within the scope of the present disclosure without departing from the spirit thereof.

BRIEF DESCRIPTION OF DRAWINGS

The features of the device of the present disclosure are set forth with particularity in the appended claims. A better understanding of the features and advantages of the device of the present disclosure will be obtained by reference to the following detailed description that sets forth illustrative embodiments, in which the principles of the device of the present disclosure are utilized, and the accompanying drawings or figures (also "FIG." and "FIGS." herein), of which:

DETAILED DESCRIPTION

Provided herein are carbon-based materials, fabrication processes, and devices with improved performance. In some embodiments, the present disclosure provides batteries (e.g., lithium-ion batteries (LIBs)) comprising carbon-based material and their fabrication processes. Such batteries may avoid the shortcomings of current battery (e.g., LIB) technology. A battery of the present disclosure may comprise one or more battery cells. A battery cell may comprise a positive electrode and a negative electrode separated by a separator comprising an electrolyte. The positive electrode may be a cathode during discharge. The negative electrode may be an anode during discharge.

In some embodiments, a plurality of battery cells may be arranged (e.g., interconnected) in a battery pack. A large battery pack (e.g., lithium-ion battery pack) may store the charge from rooftop solar panels to provide power for home appliances. The large battery pack may help stabilize the power grid. The large battery pack may lead to stand-alone power systems that may work completely off the grid.

Carbon-Based Material

Figure 8:
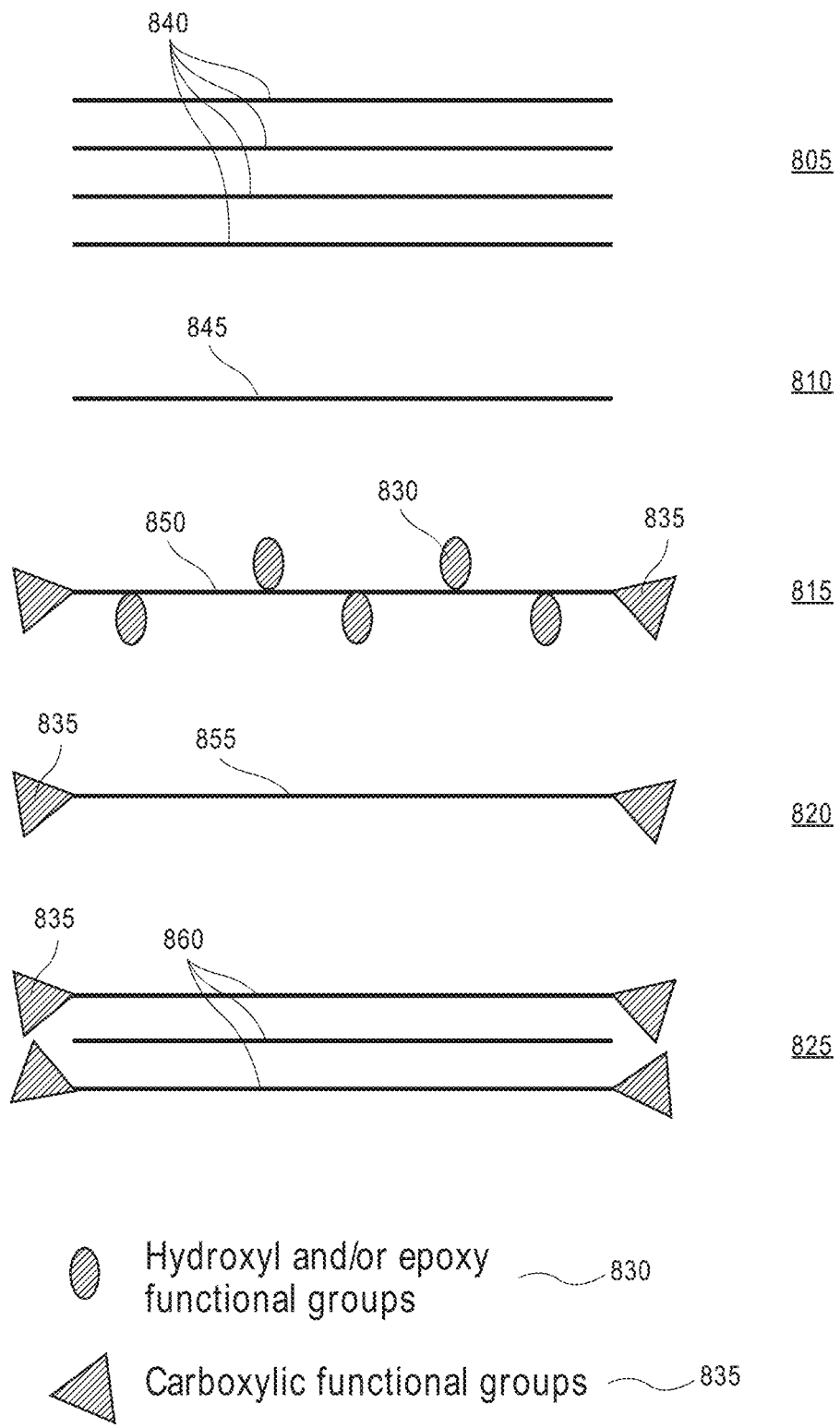
FIG. 8 schematically illustrates examples of various carbon forms.

FIG. 8 schematically illustrates examples of various carbon forms 805, 810, 815, 820, and 825. Such carbon forms may form various carbon-based materials. The carbon forms may comprise functional groups. A given carbon form may comprise, for example, one or more hydroxyl and/or epoxy functional groups 830, one or more carboxylic functional groups 835, one or more other functional groups (e.g., carbonyl functional groups), or any combination thereof. The carbon form 805 may be, for example, graphite. The graphite may comprise a plurality of carbon sheets 840 (e.g., greater than or equal to about 100, 1,000, 10,000, 100,000, 1 million, 10 million, 100 million or more) that are each one atom thick. The plurality of carbon sheets 840 may be stacked on top of each other (e.g., as a result of strong van der Waals forces). The carbon sheets 840 may stick together such that the interior of the stack may not be accessible (e.g., only top and bottom sheets may be accessible, while the interior sheets stick together due to van der Waals interactions such that no pores are present). The carbon form 805 may include substantially no functional groups. The carbon form 810 may be, for example, graphene. The graphene may comprise a carbon sheet 845 that is one atom thick. The carbon form 810 may include substantially no functional groups. The carbon form 815 may be, for example, graphene oxide (e.g., singular graphite oxide in solution). The graphene oxide may comprise a carbon sheet 850 that is one atom thick. In some embodiments, one or more carbon forms 815 may agglomerate. In such instances, individual carbon sheets 815 may be separated. The carbon sheets may not agglomerate due to van der Waals interactions. The carbon form 815 may include one or more hydroxyl and/or epoxy functional groups 830, and one or more carboxylic functional groups 835. The hydroxyl and/or epoxy functional groups 830 may be attached or otherwise associated with/bonded to the surfaces of the carbon sheet 850. The carboxylic functional groups 835 may be attached or otherwise associated with/bonded to edges of the carbon sheet 850. The carbon form 825 may be, for example, few layer graphene oxide (e.g., bilayer or trilayer graphite oxide in solution). The few layer graphene oxide may comprise two or more carbon sheets or layers 860 that are each one atom thick. The two or more carbon sheets or layers 860 may be held together by van der Waals interactions. In some embodiments, the few layer graphene oxide may comprise greater than or equal to 2, 3, 4, 5, 6, 7, 8, 9 or 10 carbon sheets or layers 860. In an embodiment, the few layer graphene oxide may comprise less than or equal to 10 carbon sheets or layers 860 (e.g., up to 10 carbon sheets or layers). In some embodiments, the few layer graphene oxide may comprise between 2 and 3, 2 and 4, 2 and 5, 2 and 6, 2 and 7, 2 and 8, 2 and 9, 2 and 10, 3 and 4, 3 and 5, 3 and 6, 3 and 7, 3 and 8, 3 and 9, 3 and 10, 4 and 5, 4 and 6, 4 and 7, 4 and 8, 4 and 9, 4 and 10, 5 and 6, 5 and 7, 5 and 8, 5 and 9, 5 and 10, 6 and 7, 6 and 8, 6 and 9, 6 and 10, 7 and 8, 7 and 9, 7 and 10, 8 and 9, 8 and 10, or 9 and 10 carbon sheets or layers 860. In some embodiments, the few layer graphene oxide may comprise between 2 and 4, or 2 and 3 carbon sheets or layers 860. In an embodiment, the few layer graphene oxide comprises up to 4 carbon sheets or layers 860. In another embodiment, the few layer graphene oxide comprises up to 4 carbon sheets or layers 860. The carbon form 825 may include one or more carboxylic functional groups 835. The carboxylic functional groups 835 may be attached or otherwise associated with/bonded to edges of one or more of the carbon sheets 860. In some embodiments, the carboxylic functional groups 835 may be primarily or solely attached or otherwise associated with/bonded to edges of the top and bottom carbon sheets 860 in a stack of the carbon sheets or layers 860. In some embodiments, the carboxylic functional groups 835 may be attached or otherwise associated with/bonded to edges of any (e.g., each, or at least 2, 3, 4 or more) of the carbon sheets 860. The carbon form 820 may be, for example, reduced graphene oxide (e.g., porous carbon sheets(s) (PCS) formed in solution). The reduced graphene oxide may comprise a carbon sheet 855 that is one atom thick. The carbon form 820 may include one or more carboxylic functional groups 835. The carboxylic functional groups 835 may be attached or otherwise associated with/bonded to edges of the carbon sheet 855.

The presence and quantity of functional groups may affect the overall carbon-to-oxygen (C:O) atomic ratio of the carbon forms in FIG. 8. For example, the carbon forms 825 and 815 may differ in the amount and/or type of oxygen functionality. Such differences may affect their respective C:O atomic ratios. In another example, the carbon form 825 may be produced upon oxidation of the carbon form 805, and the carbon form 825 may in turn be further oxidized to the carbon form 815. It will be appreciated that each of the carbon forms in FIG. 8 may be produced via one or more pathways, and/or at least some of the carbon forms in FIG. 8 may be transformed from one to another at least in some implementations. For example, the carbon form 815 may be formed via an alternative pathway.

In some embodiments, a single-layer graphite oxide and graphene oxide (GO) may comprise between about 93% and 96% (e.g., by weight) of singular graphene oxide (e.g., carbon form 815 in FIG. 8). In some embodiments, a multi-layer GO may comprise a given distribution (e.g., by weight) of a number of layers (e.g., a distribution of carbon forms 825 with different numbers of layers). For example, a multi-layer GO may comprise greater than or equal to about 5%, 10%, 15%, 25%, 50%, 75%, 85%, 90%, or 95% (e.g., by weight) of a carbon form 825 with a given number of layers (e.g., 3 or 4). The multi-layer GO may comprise such percentages of a carbon form 825 together with less than or equal to about 95%, 90%, 75%, 50%, 25%, 15%, 10%, or 5% (e.g., by weight) of another carbon form 825 with a different number of layers. A multi-layer GO may comprise less than about 95%, 90%, 85%, 75%, 50%, 25%, 15%, 10%, or 5% (e.g., by weight) of a carbon form 825 with a given number of layers.

In some instances, only edges of the graphite may be oxidized while the material maintains a large portion of the conductive properties of graphene (e.g., see carbon form 825 in FIG. 8). The GO from the first reaction may have one or more properties (e.g., conductivity) that are, up to a given reaction time of the GO, substantially the same or similar to those of reduced GO. For example, the GO and reduced GO may be substantially the same or similar in terms of one or more properties below a given degree of oxidation of the GO. In an example, when oxidized (e.g., from the carbon form 805) to the carbon form 825, the GO may have one or more properties that are substantially the same as or similar to reduced GO produced from one or more of the oxidized carbon forms in FIG. 8 (e.g., substantially the same as or similar to reduced GO produced from the carbon form 825). The GO may or may not maintain one or more of such properties upon further oxidation. For example, if the carbon form 825 is further oxidized to the carbon form 815, one or more of such properties may differ (e.g., may begin to differ) from the reduced GO.

In some embodiments, the carbon-based material of the present disclosure comprises one or more PCS. The carbon-based material may be dispersed in solution. For example, PCS may be formed through chemical reduction in solution (e.g., as described in greater detail elsewhere herein). A PCS may have an oxygen content of less than or equal to about 10%, 9%, 8%, 7%, 6%, 5%, 4.5%, 4%, 3.5%, 3%, 2.5%, 2%, 1.5%, 1%, or 0.5%. A PCS may have a pore size of less than or equal to about 10 nanometers (nm), 9 nm, 8 nm, 7 nm, 6 nm, 5 nm, 4 nm, 3 nm, 2 nm, or 1 nm. A PCS may have a pore size of greater than or equal to about 1 nm. A PCS may have a pore size of between about 1 nm and 2 nm, 1 nm and 3 nm, 1 nm and 4 nm, 1 nm and 5 nm, 1 nm and 6 nm, 1 nm and 7 nm, 1 nm and 8 nm, 1 nm and 9 nm, 1 nm and 10 nm, 2 nm and 3 nm, 2 nm and 4 nm, 2 nm and 5 nm, 2 nm and 6 nm, 2 nm and 7 nm, 2 nm and 8 nm, 2 nm and 9 nm, 2 nm and 10 nm, 3 nm and 4 nm, 3 nm and 5 nm, 3 nm and 6 nm, 3 nm and 7 nm, 3 nm and 8 nm, 3 nm and 9 nm, 3 nm and 10 nm, 4 nm and 5 nm, 4 nm and 6 nm, 4 nm and 7 nm, 4 nm and 8 nm, 4 nm and 9 nm, 4 nm and 10 nm, 5 nm and 6 nm, 5 nm and 7 nm, 5 nm and 8 nm, 5 nm and 9 nm, 5 nm and 10 nm, 6 nm and 7 nm, 6 nm and 8 nm, 6 nm and 9 nm, 6 nm and 10 nm, 7 nm and 8 nm, 7 nm and 9 nm, 7 nm and 10 nm, 8 nm and 9 nm, 8 nm and 10 nm, or 9 nm and 10 nm. For example, the PCS may have a pore size between about 1 nm and 4 nm, or 1 nm and 10 nm. The PCS may have one or more pore sizes (e.g., the PCS may have a distribution of such pore sizes).

Methods of Forming a Carbon-Based Material

Figure 1:
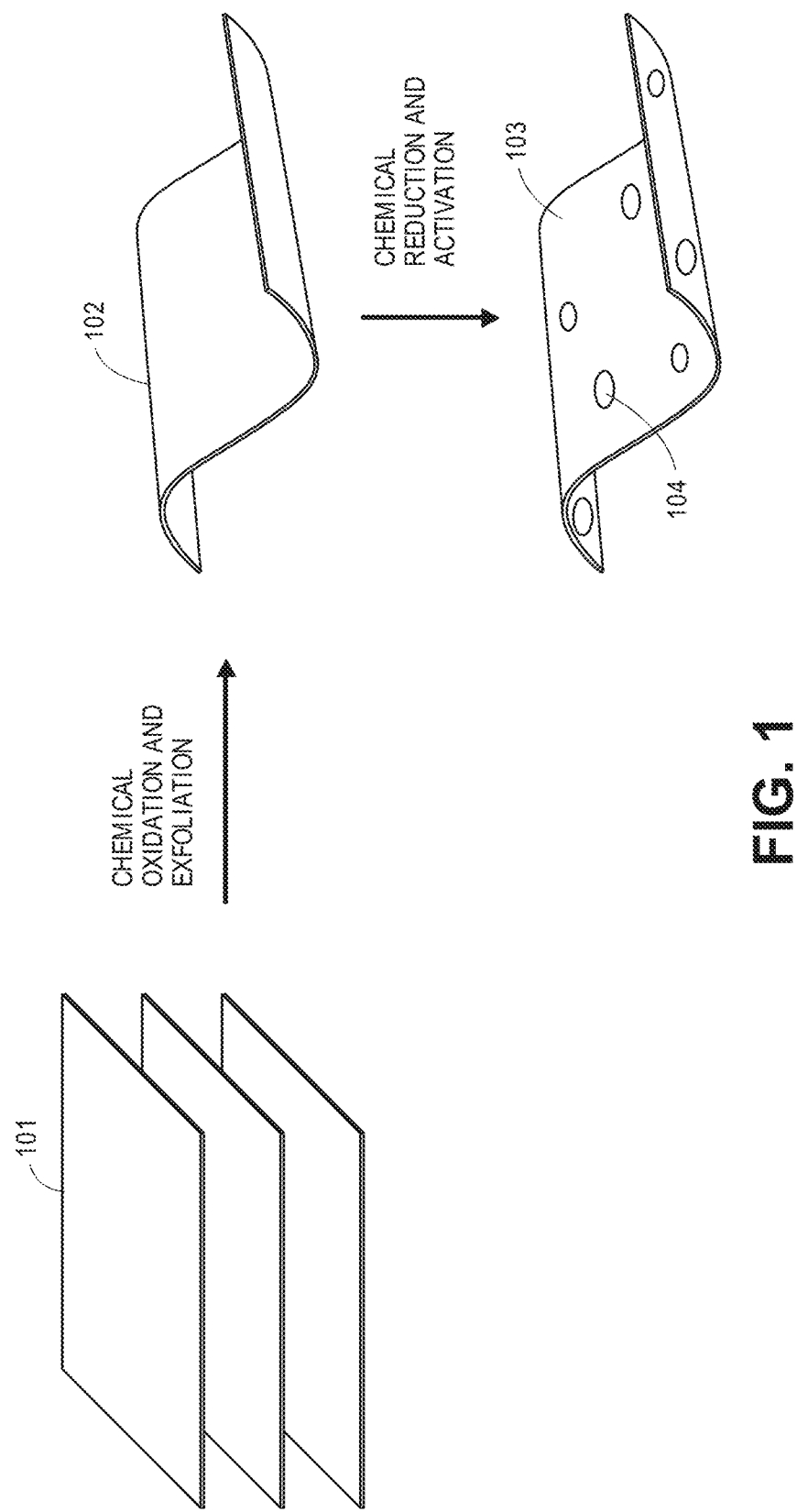
FIG. 1 schematically illustrates an example of making porous carbon sheets.

FIG. 1 schematically illustrates an example of making PCS. Graphite 101 may be chemically oxidized and exfoliated to graphite oxide or graphene oxide 102. For the purpose of this disclosure, the terms graphite oxide and graphene oxide are used interchangeably. In some instances, graphite oxide and graphene oxide are collectively referred to herein as "GO."

The graphite 101 may be chemically oxidized and exfoliated to the GO using Hummers' method and modified Hummers' method (and various modifications thereof, for example, various methods derived from the modified Hummers' method, including renamed methods derived from the modified Hummers' method), collectively referred to herein as Hummers'-based methods.

In certain embodiments, a Hummers'-based method (e.g., a modified Hummers' method) may require several weeks of purification, expensive hydrochloric acid (HCl) washes, proper technique that is left to the judgment of the individual scientist, and/or a resulting product that sometimes gives acceptable results and sometimes does not give acceptable results.

Figure 23:
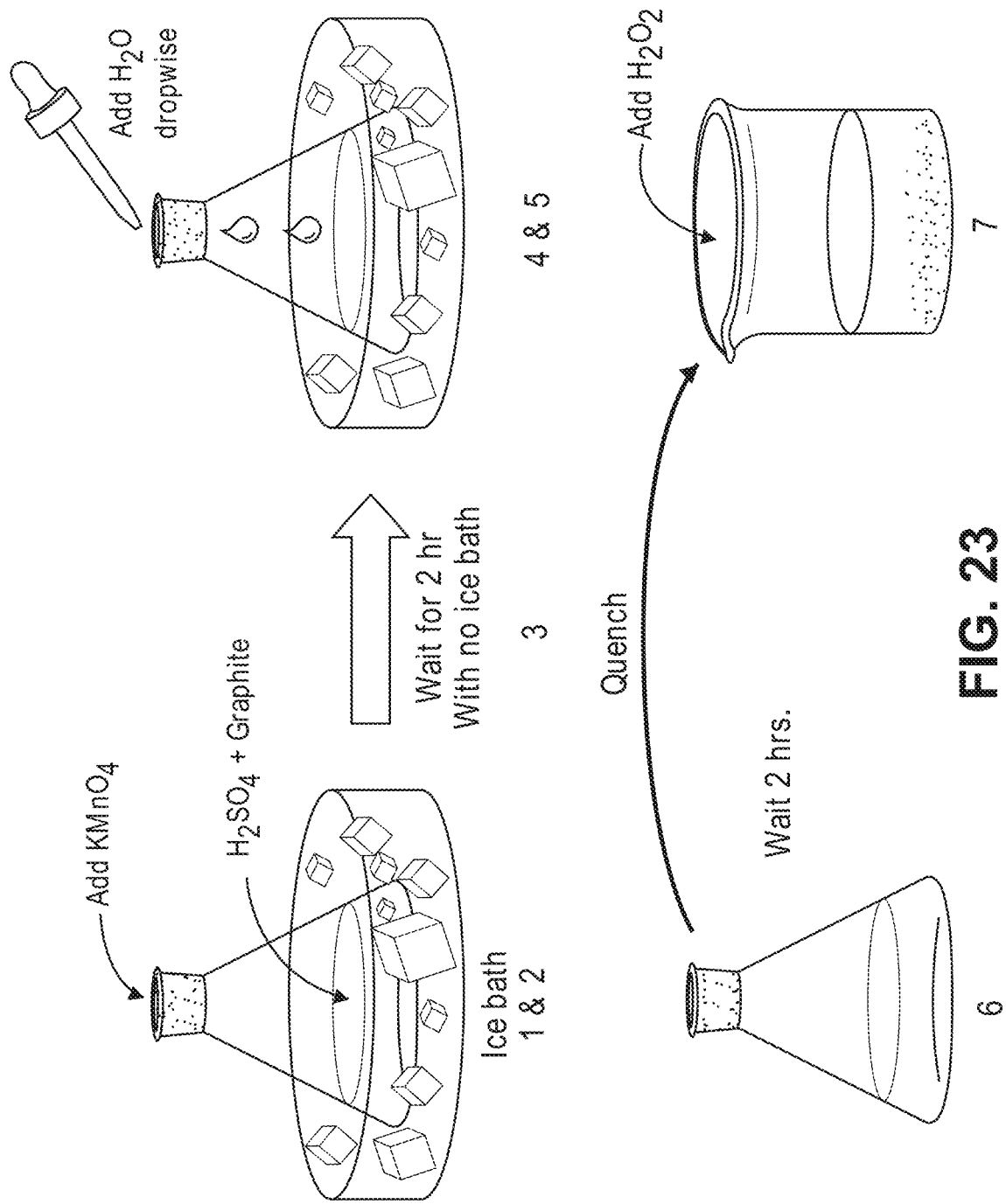
FIG. 23 is a diagram showing an example of a Hummers'-based method (e.g., modified Hummers' method) of producing graphite oxide.

FIG. 23 shows an example of a Hummers'-based method (e.g., a modified Hummers' method) of producing graphite oxide. The method includes, in a first step, adding 15 grams (g) graphite to 750 milliliters (mL) concentrated sulfuric acid ($H_2SO_4$) at 0° C. using an ice bath. The method further includes, in a second step, adding 90 g potassium permanganate ($KMnO_4$) (exothermic). A third step includes removing the reaction flask from the ice bath and waiting 2 hours. A fourth step includes placing the reaction flask back into the ice bath. In a fifth step, 1.5 liters (L) water ($H_2O$) is added drop-wise over the course of about 1-1.5 hours while maintaining the temperature at 45° C. (controlling the temperature by the rate of addition of water and by adding ice to a melting ice bath). In certain embodiments, the ice bath from the first and/or second steps may be maintained and/or refilled for use in the fourth and/or fifth steps. A sixth step includes removing the reaction flask from the ice bath and waiting 2 hours. A seventh step includes quenching the reaction with 4.2 L $H_2O$ and then 75 mL 30% hydrogen peroxide ($H_2O_2$). An eighth step includes purification. The purification involves five HCl washes, followed by nine $H_2O$ washes, followed by allowing the solution to air dry for about 2 weeks and then rehydrating the dried graphite oxide with a known amount of water and putting it into dialysis for about 2 weeks. In an example, the total processing time is about 2 months, and the total cost is $93/kg.

Alternatively, the graphite 101 may be chemically oxidized and exfoliated to the GO using a non-Hummers'-based method (e.g., first reaction described in greater detail elsewhere herein). The GO may be of different forms (e.g., single-layer GO or multi-layer GO). The GO 102 may be chemically reduced and activated to produce PCS 103. The PCS 103 may comprise pores 104. The PCS may be a two-dimensional material.

In the non-Hummers'-based method, the graphite 101 may be chemically oxidized and exfoliated to the GO 102 in a first reaction. The first reaction may be followed by a first purification. The GO 102 may be chemically reduced to the PCS 103 in a second reaction. The second reaction may be followed by a second purification. In some embodiments, the first reaction and/or second reaction may allow GO and PCS, respectively, to be produced on a large scale (e.g., by the ton). In some embodiments, the second reaction may be performed separately from the first reaction. For example, the second reaction, in some cases followed by the second filtration, may be performed using any graphite oxide feedstock with suitable specifications.

The first reaction may include a low-temperature process for the production of GO with production of at least about 1 pound per day, including the time for purification. GO synthesis via the first reaction may be tunable in terms of control of oxidation characteristics and amount of exfoliation, safer than other methods because of procedural and engineered temperature controls, efficient in its minimal use of reagents, configured to be fully scalable, or any combination thereof. In certain embodiments of the non-Hummers'-based method described herein, the first reaction may produce a more controlled form of GO than Hummers'-based methods, as described in greater detail elsewhere herein. In some embodiments, this low-temperature process reduces the amount of chemicals used and thus promises lower cost. In addition, the lower reaction temperature of the method may reduce the risk of explosion.

The GO produced by the first reaction may be suitably exfoliated (e.g., sufficiently exfoliated but not so much as to absorb a too large amount of water). The GO may have an amount and/or type of oxygen functionality that allows less than a given amount of water to be absorbed. The amount and type of oxygen functionality may change with degree of oxidation. As described elsewhere herein, GO produced using the first reaction described herein may comprise a repeatable (e.g., consistent) amount and/or type of oxygen functionality. At least a portion of the oxygen functionality may allow water to be absorbed. The GO may be substantially (e.g., fully) exfoliated but not over-oxidized. The GO may be oxidized to a degree less than that which allows water to be absorbed in a suitably low amount (e.g., an over-oxidized graphite oxide may comprise an excessive amount and/or unsuitable type(s) of oxygen functionality that allow an excessive amount of water to be absorbed).

In addition, the degree of oxidation of graphite oxide in the first reaction may be adjusted to enable good control over the electrical conductivity and the number of layers of graphene oxide sheets in the final product. For example, reaction conditions may be adjusted to form single-layer graphite oxide or multi-layer graphite oxide. The two types of graphite oxide may have different properties. The properties may include, for example, given physicochemical properties and/or performance characteristics (e.g., conductivity or purity). For example, single-layer graphite oxide or multi-layer graphite oxide may have different conductive properties. In some embodiments, the resulting graphite oxide synthesis product may be affected by reaction conditions and/or by type or quality of the graphite feedstock.

A graphite feedstock may include various grades or purities, for example, carbon content measured as, for example, weight-% graphitic carbon ($C_g$), types (e.g., amorphous graphite, for example, 60%-85% carbon), flake graphite (e.g., greater than 85% carbon) or vein graphite (e.g., greater than 90% carbon), sizes (e.g., mesh size), shapes (e.g., large flake, medium flake, powder, or spherical graphite), and origin (e.g., synthetic or natural, for example, natural flake graphite). Such characteristics (e.g., physical and chemical properties) may affect the type or quality of the graphite oxide. For example, the mesh size of the graphite may affect the resulting graphite oxide. The graphite may have a grade or carbon content of at greater than or equal to about 1%, 2%, 5%, 10%, 15%, 20%, 30%, 40%, 50%, 60%, 70%, 80%, 90%, 91%, 92%, 93%, 94%, 95%, 96%, 97%, 98%, or 99% (e.g., by weight). The graphite may have a grade or carbon content of less than about 100%, 99%, 98%, 97%, 96%, 95%, 94%, 93%, 92%, 91%, 90%, 85%, 80%, 70%, 60%, 50%, 40%, 30%, 20%, 15%, 10%, 5%, 2%, or 1% (e.g., by weight). The graphite may have such grades or carbon contents at a mesh size of greater than or equal to about −200, −150, −100, −80, −50, −48, +48, +80, +100, +150, or +200 mesh size. Mesh sizes may be converted to size in other dimensions (e.g., microns). Other examples of graphite feedstocks are provided elsewhere herein.

The non-Hummers'-based GO synthesis method of the present disclosure may be used to form GO with a given purity or grade (e.g., a minimum purity or grade). In some embodiments, purity or grade of the GO may be provided in terms of an ionic conductivity measured at the end of purification. The ionic conductivity may provide a metric for how much impurity the graphite oxide contains. In some embodiments, the ionic conductivity (e.g., for the method in FIG. 24) may be between about 10 microsiemens per centimeter (μS/cm) and 20 μS/cm, 10 μS/cm and 30 μS/cm, 10 μS/cm and 40 μS/cm, 10 μS/cm and 50 μS/cm, 20 μS/cm and 30 μS/cm, 20 μS/cm and 40 μS/cm, 20 μS/cm and 50 μS/cm, 30 μS/cm and 40 μS/cm, 30 μS/cm and 50 μS/cm, or 40 μS/cm and 50 μS/cm. In some embodiments, the ionic conductivity (e.g., for the method in FIG. 24) may be less than and equal to about 50 μS/cm, 40 μS/cm, 30 μS/cm, 20 μS/cm or 10 μS/cm. In certain embodiments of the non-Hummers'-based method described herein, the given purity or grade may be achieved at least about 2, 3, 4, 5, 6, 7, 8, 9, or 10 times faster than a Hummers'-based method. In certain embodiments of the non-Hummers'-based method described herein, the given purity or grade may be achieved between about 2 and 5, 2 and 8, or 5 and 8 times faster than a Hummers'-based method. In certain embodiments of the non-Hummers'-based method described herein, the purity or grade may be reached at the aforementioned faster rates because a Hummers'-based method requires hydrochloric acid to be washed out and is therefore slower to reach the given purity or grade. The second reaction may be used to form (e.g., from GO produced via the first reaction) PCS with a given purity or grade (e.g., a minimum purity or grade). In some embodiments, a purity or grade of the PCS may be at least about 90%, 95%, 96%, 97%, 98%, 99%, 99.5%, or 99.9% carbon (e.g., by weight).

In certain embodiments of the non-Hummers'-based method described herein, the non-Hummers'-based method (e.g., see FIG. 24) may be faster, safer, and cheaper and may produce more repeatable results than Hummers'-based methods. In some embodiments, the improved repeatability may be at least in part due to a lower reaction temperature than a Hummers'-based method. In some embodiments, the non-Hummers'-based method described herein produces GO with a composition (e.g., C:O atomic ratio and quantity of oxygen functionality) and/or morphology repeatable to within about 1%, 2%, 3%, 4%, 5%, 6%, 7%, 8%, 9%, or 10%. For example, the method may produce GO with a C:O atomic ratio repeatable to within about 1%, 2%, 3%, 4%, 5%, 6%, 7%, 8%, 9%, or 10%. In certain embodiments of the non-Hummers'-based method described herein, the non-Hummers'-based method may include, for example, expedited purification without the use of costly HCl and a lower reaction temperature that reduces the risk of explosion.

In certain embodiments of the non-Hummers'-based method described herein, the non-Hummers'-based method may provide several advantages or benefits over a Hummers'-based method. For example, in certain embodiments, the non-Hummers'-based method described herein may be cheaper (e.g., at a cost per mass of graphite oxide of at least about 4 times less than a Hummers'-based method; less waste per mass graphite oxide produced than a Hummers'-based method), faster (e.g., removed HCl washes and/or faster purification; at least about 2, 5, or 8 times faster than (i) a Hummers'-based method or (ii) with HCl and/or without air drying; in less than or equal to about 1 week), more reliable (e.g., removal of human error/judgment), safer (e.g., reaction runs at lower temperatures, for example, at a maximum temperature of (i) less than about 45° C. or (ii) at least about 30° C. less than a maximum temperature used in a Hummers'-based method), or any combination thereof.

Figure 24:
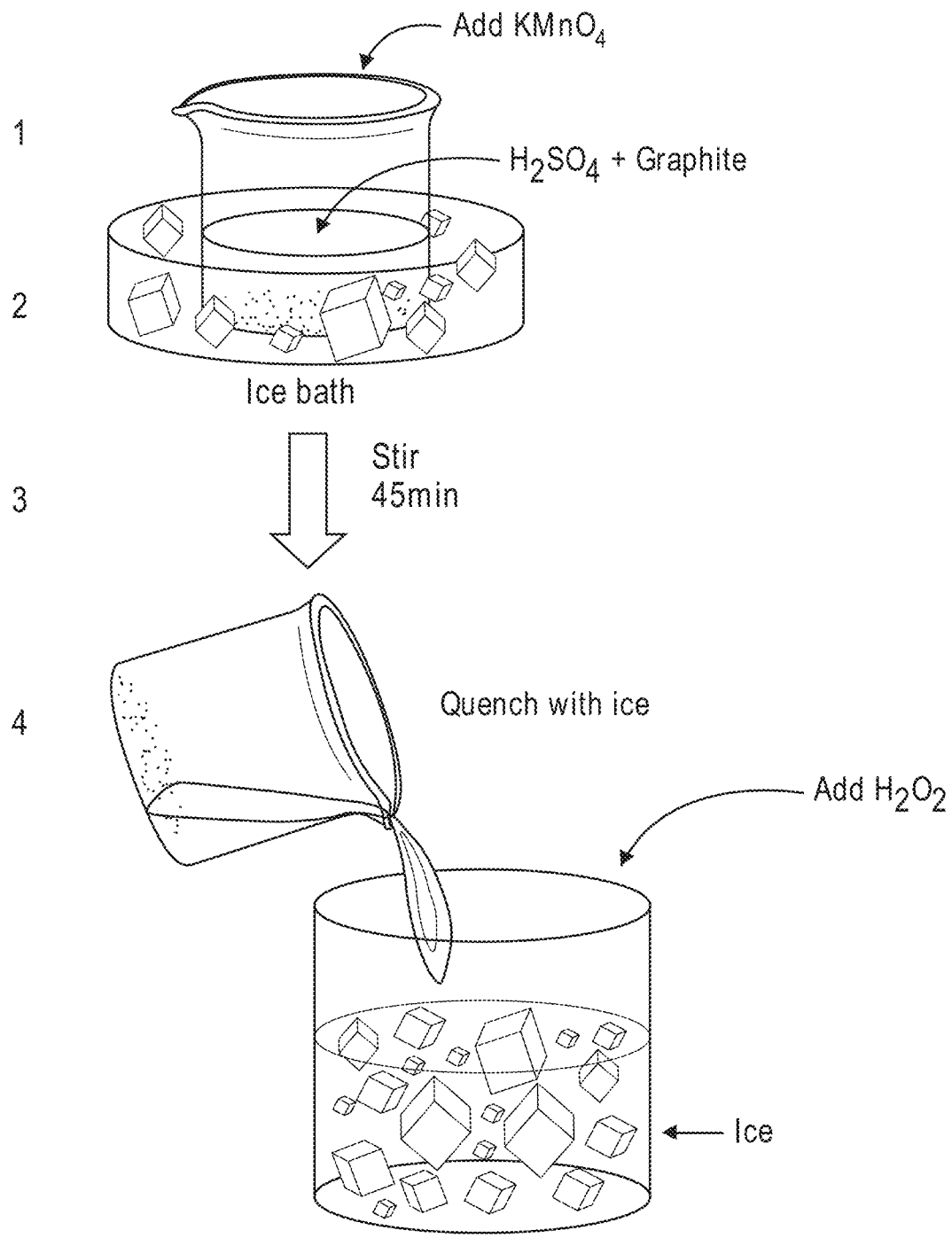
FIG. 24 is a diagram showing an example of a method for producing graphite oxide.

FIG. 24 is a diagram showing an example of a method for producing graphite oxide. The method in FIG. 24 provides examples of the first reaction and the first purification. The method includes, in a first step, adding about 15 g graphite to about 750 mL concentrated $H_2SO_4$ at about 0° C. using ice bath or recirculating chiller. In a second step, the method includes adding about 90 g $KMnO_4$ (exothermic) while keeping the temperature below about 15° C. using an ice bath or recirculating chiller. A third step (also "step 3" herein) includes stirring the reaction for about 45 minutes. A fourth step (also "step 4" herein) includes quenching the reaction by adding the reaction mixture to about 2.6 kg ice and then adding about 75 mL 30% $H_2O_2$. The method may further include a fifth step comprising purification. In this example, purification involves five $H_2O$ washes, followed by less than or equal to about 1 week in a continuous-flow dialysis setup. In an example, the total processing time is about 1 week, and the total cost is $21/kg.

The reaction conditions (time/duration and temperature) in step 3 may vary. In this example, the reaction in step 3 is cooled by ice bath, and a time of about 45 minutes is selected. In other examples, the duration may be as described in greater detail elsewhere herein, and the reaction temperature may vary with time (duration) according to specific cooling conditions (e.g., presence or absence of cooling by ice bath).

The purification in step 5 may include at least 1, 2, 3, 4, or 5 or more $H_2O$ washes. The purification in step 5 may include 5 or fewer $H_2O$ washes. The purification may further include other water purification steps, for example, dialysis. For example, dialysis may include placing the material in a porous tube and removing (e.g., leaching out) ions from the material through the walls of the tube into a water bath that is refreshed continuously or batch-wise. The method may include using one or more filtration methods other than dialysis (e.g., after the $H_2O$ washes, another filtration method may be applied in lieu of dialysis). The filtration may take less than 1 week. The duration of the filtration may depend on batch size. For example, for the 15 g graphite batch above, filtration may take less than or equal to about 1 or 2 days. Total filtration (e.g., dialysis) time may be less than or equal to about 7 days, 6 days, 5 days, 4 days, 3 days, 2 days, 1 day, or ½ day. A shorter filtration time may reduce the total processing time to less than or equal to about 7 days, 6 days, 5 days, 4 days, 3 days, 2 days, 1 day, or ½ day.

In step 4, the reaction mixture may be added to greater than or equal to about 2.6 kg ice. In some instances, the amount of ice described herein may be a minimum amount. Step 4 may include adding greater than or equal to about 75 mL 30% $H_2O_2$. In some instances, the amount of $H_2O_2$ described herein may be a minimum amount.

Given the scalability of the methods described herein (e.g., the method in FIG. 24), the amount of oxidizing agent (also "oxidizer" herein) may be provided in terms of a ratio of oxidizing agent ($KMnO_4$) to graphite (also "Ox:Gr" herein). For example, about 90 g $KMnO_4$ may be used per 15 g graphite, corresponding to about 6× mass ratio Ox:Gr. In another example, about 75 mL 30% $H_2O_2$ (e.g., about 30% by weight in aqueous solution, corresponding to about 0.66 moles $H_2O_2$) may be used (i) per 90 g $KMnO_4$, corresponding to about 0.25 units of $H_2O_2$ per unit of $KMnO_4$ on a weight basis or about 1.16 units of $H_2O_2$ per unit of $KMnO_4$ on a molar basis, or (ii) per 750 mL concentrated $H_2SO_4$ with a concentration of between about 96% $H_2SO_4$ and 98% $H_2SO_4$ (e.g., by weight in aqueous solution), corresponding to a volume ratio of 30% $H_2O_2$ to concentrated sulfuric acid of about 10:1 (e.g., about 1 L of aqueous solution having about 30% $H_2O_2$ for every 10 L of concentrated $H_2SO_4$). In yet another example, about 50 L of concentrated $H_2SO_4$ may be consumed for every 1 kg of graphite. Further examples of amounts and ratios are provided elsewhere herein, for example, in relation to methods for producing single-layer GO and multi-layer GO (e.g., on a per kilogram graphite oxide basis).

In some embodiments, $H_2SO_4$ (e.g., with a concentration of between about 96% $H_2SO_4$ and 98% $H_2SO_4$) may be provided in an amount between about 1 g graphite:10 mL $H_2SO_4$ and about 1 g graphite:50 mL $H_2SO_4$. The method may include providing between about 10 mL $H_2SO_4$ and 20 mL $H_2SO_4$, 10 mL $H_2SO_4$ and 30 mL $H_2SO_4$, 10 mL $H_2SO_4$ and 40 mL $H_2SO_4$, 10 mL $H_2SO_4$ and 50 mL $H_2SO_4$, 20 mL $H_2SO_4$ and 30 mL $H_2SO_4$, 20 mL $H_2SO_4$ and 40 mL $H_2SO_4$, 20 mL $H_2SO_4$ and 50 mL $H_2SO_4$, 30 mL $H_2SO_4$ and 40 mL $H_2SO_4$, 30 mL $H_2SO_4$ and 50 mL $H_2SO_4$, or 40 mL $H_2SO_4$ and 50 mL $H_2SO_4$ per 1 g graphite. The method may include providing greater than or equal to about 10 mL $H_2SO_4$, 20 mL $H_2SO_4$, 30 mL $H_2SO_4$, 40 mL $H_2SO_4$, or 50 mL $H_2SO_4$ per 1 g graphite. The method may include providing less than about 75 mL $H_2SO_4$, 70 mL $H_2SO_4$, 60 mL $H_2SO_4$, 50 mL $H_2SO_4$, 40 mL $H_2SO_4$, 30 mL $H_2SO_4$, 20 mL $H_2SO_4$, or 15 mL $H_2SO_4$ per 1 g graphite.

In some embodiments, $H_2SO_4$ (e.g., with a concentration of between about 96% $H_2SO_4$ and 98% $H_2SO_4$) may be provided in an amount between about 1 g graphite:18.4 g $H_2SO_4$ and about 1 g graphite:92.0 g $H_2SO_4$. The method may include providing between about 18.4 g $H_2SO_4$ and 30 g $H_2SO_4$, 18.4 g $H_2SO_4$ and 40 g $H_2SO_4$, 18.4 g $H_2SO_4$ and 50 g $H_2SO_4$, 18.4 g $H_2SO_4$ and 60 g $H_2SO_4$, 18.4 g $H_2SO_4$ and 70 g $H_2SO_4$, 18.4 g $H_2SO_4$ and 80 g $H_2SO_4$, 18.4 g $H_2SO_4$ and 92.0 g $H_2SO_4$, 30 g $H_2SO_4$ and 40 g $H_2SO_4$, 30 g $H_2SO_4$ and 50 g $H_2SO_4$, 30 g $H_2SO_4$ and 60 g $H_2SO_4$, 30 g $H_2SO_4$ and 70 g $H_2SO_4$, 30 g $H_2SO_4$ and 80 g $H_2SO_4$, 30 g $H_2SO_4$ and 92.0 g $H_2SO_4$, 40 g $H_2SO_4$ and 50 g $H_2SO_4$, 30 g $H_2SO_4$ and 60 g $H_2SO_4$, 30 g $H_2SO_4$ and 70 g $H_2SO_4$, 30 g $H_2SO_4$ and 80 g $H_2SO_4$, 30 g $H_2SO_4$ and 92.0 g $H_2SO_4$, 40 g $H_2SO_4$ and 50 g $H_2SO_4$, 40 g $H_2SO_4$ and 60 g $H_2SO_4$, 40 g $H_2SO_4$ and 70 g $H_2SO_4$, 40 g $H_2SO_4$ and 80 g $H_2SO_4$, 40 g $H_2SO_4$ and 92.0 g $H_2SO_4$, 50 g $H_2SO_4$ and 60 g $H_2SO_4$, 50 g $H_2SO_4$ and 70 g $H_2SO_4$, 50 g $H_2SO_4$ and 80 g $H_2SO_4$, 50 g $H_2SO_4$ and 92.0 g $H_2SO_4$, 60 g $H_2SO_4$ and 70 g $H_2SO_4$, 60 g $H_2SO_4$ and 80 g $H_2SO_4$, 60 g $H_2SO_4$ and 92.0 g $H_2SO_4$, 70 g $H_2SO_4$ and 80 g $H_2SO_4$, 70 g $H_2SO_4$ and 92.0 g $H_2SO_4$, 80 g $H_2SO_4$ and 92.0 g $H_2SO_4$ per 1 g graphite. The method may include providing greater than or equal to about 18.4 g $H_2SO_4$, 20 g $H_2SO_4$, 25 g $H_2SO_4$, 30 g $H_2SO_4$, 35 g $H_2SO_4$, 40 g $H_2SO_4$, 45 g $H_2SO_4$, 50 g $H_2SO_4$, 55 g $H_2SO_4$, 60 g $H_2SO_4$, 65 g $H_2SO_4$, 70 g $H_2SO_4$, 75 g $H_2SO_4$, 80 g $H_2SO_4$, 85 g $H_2SO_4$, 90 g $H_2SO_4$, or 92.0 g $H_2SO_4$ per 1 g graphite. The method may include providing less than about 140 g $H_2SO_4$, 130 g $H_2SO_4$, 120 g $H_2SO_4$, 110 g $H_2SO_4$, 100 g $H_2SO_4$, 95 g $H_2SO_4$, 90 g $H_2SO_4$, 80 g $H_2SO_4$, 70 g $H_2SO_4$, 60 g $H_2SO_4$, 50 g $H_2SO_4$, 40 g $H_2SO_4$, 30 g $H_2SO_4$, or 20 g $H_2SO_4$ per 1 g graphite.

In some embodiments, $KMnO_4$ may be provided in an amount between about 1 g graphite:2 g $KMnO_4$ and about 1 g graphite:6 g $KMnO_4$. The method may include providing between about 1 g $KMnO_4$ and 2 g $KMnO_4$, 1 g $KMnO_4$ and 3 g $KMnO_4$, 1 g $KMnO_4$ and 4 g $KMnO_4$, 1 g $KMnO_4$ and 5 g $KMnO_4$, 1 g $KMnO_4$ and 6 g $KMnO_4$, 2 g $KMnO_4$ and 3 g $KMnO_4$, 2 g $KMnO_4$ and 4 g $KMnO_4$, 2 g $KMnO_4$ and 5 g $KMnO_4$, 2 g $KMnO_4$ and 6 g $KMnO_4$, 3 g $KMnO_4$ and 4 g $KMnO_4$, 3 g $KMnO_4$ and 5 g $KMnO_4$, 3 g $KMnO_4$ and 6 g $KMnO_4$, 4 g $KMnO_4$ and 5 g $KMnO_4$, 4 g $KMnO_4$ and 6 g $KMnO_4$, or 5 g $KMnO_4$ and 6 g $KMnO_4$ per 1 g graphite. The method may include providing greater than or equal to about 1 g $KMnO_4$, 2 g $KMnO_4$, 3 g $KMnO_4$, 4 g $KMnO_4$, 5 g $KMnO_4$, or 6 g $KMnO_4$ per 1 g graphite. The method may include providing less than about 9 g $KMnO_4$, 8 g $KMnO_4$, 7 g $KMnO_4$, 6 g $KMnO_4$, 5 g $KMnO_4$, 4 g $KMnO_4$, 3 g $KMnO_4$, or 2 g $KMnO_4$ per 1 g graphite.

In some embodiments, $H_2O_2$ may be provided in an amount of at least about 1 mol $H_2O_2$ per 1 mol $KMnO_4$. The method may include providing between about 1 mol $H_2O_2$ and 1.1 mol $H_2O_2$, 1 mol $H_2O_2$ and 1.2 mol $H_2O_2$, 1 mol $H_2O_2$ and 1.3 mol $H_2O_2$, 1 mol $H_2O_2$ and 1.4 mol $H_2O_2$, or 1 mol $H_2O_2$ and 1.5 mol $H_2O_2$ per 1 mol $KMnO_4$. The method may include providing greater than or equal to about 1 mol $H_2O_2$, 1.1 mol $H_2O_2$, 1.2 mol $H_2O_2$, 1.3 mol $H_2O_2$, 1.4 mol $H_2O_2$, or 1.5 mol $H_2O_2$ per 1 mol $KMnO_4$. The method may include providing less than about 1.5 mol $H_2O_2$, 1.4 mol $H_2O_2$, 1.3 mol $H_2O_2$, 1.2 mol $H_2O_2$, or 1.1 mol $H_2O_2$ per 1 mol $KMnO_4$.

In some embodiments, ice may be provided in an amount between about 1 g $H_2SO_4$:0 g ice and about 1 g $H_2SO_4$:1.09 g ice, between about 1 g $H_2SO_4$:1.09 g ice and about 1 g $H_2SO_4$:1.63 g ice, or between about 1 g $H_2SO_4$:0 g ice and about 1 g $H_2SO_4$:1.63 g ice. The method may include providing between about 0 g ice and 0.4 g ice, 0 g ice and 0.8 g ice, 0 g ice and 1.2 g ice, 0 g ice and 1.63 g ice, 0.4 g ice and 0.8 g ice, 0.4 g ice and 1.2 g ice, 0.4 g ice and 1.63 g ice, 0.8 g ice and 1.2 g ice, 0.8 g ice and 1.63 g ice, or 1.2 g ice and 1.63 g ice per 1 g $H_2SO_4$. The method may include providing greater than or equal to about 0 g ice, 0.2 g ice, 0.4 g ice, 0.6 g ice, 0.8 g ice, 1.09 g ice, 1.2 g ice, 1.4 g ice, or 1.63 g ice per 1 g $H_2SO_4$. The method may include providing less than about 2.4 g ice, 2.2 g ice, 2.0 g ice, 1.8 g ice, 1.63 g ice, 1.4 g ice, 1.2 g ice, 1.09 g ice, 0.8 g ice, 0.6 g ice, 0.4 g ice, 0.2 g ice, or 0.1 g ice per 1 g $H_2SO_4$.

In some embodiments, ice may be provided in an amount between about 1 mL $H_2SO_4$:0 g ice and about 1 mL $H_2SO_4$:2 g ice, between about 1 mL $H_2SO_4$:2 g ice and about 1 mL $H_2SO_4$:3 g ice, or between about 1 mL $H_2SO_4$:0 g ice and about 1 mL $H_2SO_4$:3 g ice. The method may include providing between about 0 g ice and 1 g ice, 0 g ice and 2 g ice, 0 g ice and 3 g ice, 1 g ice and 2 g ice, 1 g ice and 3 g ice, or 2 g ice and 3 g ice per 1 mL $H_2SO_4$. The method may include providing greater than or equal to about 0 g ice, 0.2 g ice, 0.4 g ice, 0.6 g ice, 0.8 g ice, 1 g ice, 1.2 g ice, 1.4 g ice, 1.6 g ice, 1.8 g ice, 2 g ice, 2.2 g ice, 2.4 g ice, 2.6 g ice, 2.8 g ice or 3 g ice per 1 mL $H_2SO_4$. The method may include providing less than about 4.5 g ice, 4 g ice, 3.5 g ice, 3 g ice, 2.5 g ice, 2 g ice, 1.5 g ice, 1 g ice, 0.5 g ice, 0.25 g ice, or 0.1 g ice per 1 mL $H_2SO_4$.

In certain embodiments, the graphite may be provided in powder form. It will be appreciated that the reactant amounts may be suitably scaled for production on a large scale. Substantially all of the graphite may be converted. The amount of GO produced per unit of graphite may depend on the oxygen content of the GO. In some embodiments, the C:O atomic ratio of the GO may be, for example, between about 4:1 and 5:1, and the amount of GO produced may be between about 1.27 and 1.33 units of GO per unit of graphite on a weight basis (e.g., between about 19 g and 20 g GO per 15 g graphite). The C:O atomic ratio of the GO may differ for single-layer and multi-layer GO (e.g., as described in relation to FIG. 8). Thus, the amount of GO produced per unit of graphite may differ for single-layer GO and multi-layer GOs. It will also be appreciated that the concentration of one or more of the reactants may in some cases vary. In an example, sulfuric acid may be provided at a concentration of between about 96% $H_2SO_4$ and 98% $H_2SO_4$ (e.g., by weight in aqueous solution). In another example, in some instances an absolute concentration of $H_2O_2$ may not substantially affect reaction conditions; instead, reaction conditions may depend on a ratio of $H_2O_2$ to $KMnO_4$ (e.g., affecting lesser manganese species). In such instances, volume and/or mass of the reactant mixture may be suitably adjusted such that a given (e.g., predetermined) total mass or molar amount of the reactant is provided. It will further be appreciated that in some instances a minimum or maximum concentration may be required to ensure suitable reaction conditions. For example, a substantially lower sulfuric acid concentration than about 96%-98% (e.g., by weight in aqueous solution) may lead to a different morphology of the GO (e.g., the lower concentration may affect oxygen-containing groups).

The present non-Hummers'-based method for producing graphite oxide may comprise steps of: providing a graphite powder and $H_2SO_4$ mixture while cooling the graphite powder and $H_2SO_4$ mixture to a first predetermined temperature; adding a predetermined amount of $KMnO_4$ to the graphite powder and $H_2SO_4$ mixture to make a graphite oxidizing mixture; agitating (e.g., after the addition of the predetermined amount of $KMnO_4$ has been completed) the graphite oxidizing mixture for a predetermined amount of time; cooling the graphite oxidizing mixture to a second predetermined temperature; and adding a predetermined amount of $H_2O_2$ to the graphite oxidizing mixture to yield graphite oxide. In some implementations, the graphite powder and $H_2SO_4$ mixture may be provided, and then cooled to the first predetermined temperature.

The non-Hummers'-based method described herein may further include purifying the graphite oxide by rinsing the graphite oxide with water (e.g., deionized water), purifying the graphite oxide by chemistry dialysis, or a combination thereof (e.g., rinsing followed by dialysis).

The first predetermined temperature resulting from cooling the graphite powder and $H_2SO_4$ mixture may be about 0° C. The first predetermined temperature resulting from cooling the graphite powder and $H_2SO_4$ mixture may range from about −10° C. to about 15° C. The first predetermined temperature may be greater than or equal to about −10° C., −9° C., −8° C., −7° C., −6° C., −5° C., 4° C., −3° C., −2° C., −1° C., or 0° C. but less than or equal to about 1° C., 2° C., 3° C., 4° C., 5° C., 6° C., 7° C., 8° C., 9° C., 10° C., 11° C., 12° C., 13° C., 14° C., or 15° C.

A reaction temperature of the graphite oxidizing mixture may be prevented from rising above about 15° C. while adding the predetermined amount of $KMnO_4$ to the graphite powder and $H_2SO_4$ mixture. The addition of the $KMnO_4$ to the graphite powder and $H_2SO_4$ mixture may initiate an exothermic (e.g., self-heated) reaction. The reaction temperature of the graphite oxidizing mixture may be less than or equal to about 15° C., 14° C., 13° C., 12° C., 11° C., 10° C., 9° C., 8° C., 7° C., 6° C., 5° C., 4° C., 3° C., 2° C., or 1° C. while adding the predetermined amount of $KMnO_4$ to the graphite powder and $H_2SO_4$ mixture. In certain embodiments, the reaction temperature of the graphite oxidizing mixture may be less than about 15° C. while adding the predetermined amount of $KMnO_4$ to the graphite powder and $H_2SO_4$ mixture.

The agitating may include stirring at a rate that ranges from about 50 revolutions per minute (rpm) to about 150 rpm. In some embodiments, the agitating may include stirring at a rate of at least about 50 rpm, 60 rpm, 70 rpm, 80 rpm, 90 rpm, 100 rpm, 110 rpm, 120 rpm, 130 rpm, 140 rpm, or 150 rpm. In some embodiments, the agitating may include stirring at such rates (also "stirring rates" herein) while maintaining a stirring rate of less than or equal to about 150 rpm. The predetermined time for agitating the graphite oxidizing mixture may range from about 45 minutes to about 300 minutes. The predetermined time for agitating the graphite oxidizing mixture may be at least about 45 minutes, 50 minutes, 60 minutes, 70 minutes, 80 minutes, 90 minutes, 100 minutes, 120 minutes, 140 minutes, 160 minutes, 180 minutes, 200 minutes, 220 minutes, 240 minutes, 260 minutes, 280 minutes, or 300 minutes. The predetermined time may or may not depend upon the stirring rate. In some examples, the predetermined time may be independent of the stirring rate beyond a given threshold (e.g., a minimum stirring rate) and/or within a given range of stirring rates. In some embodiments, a reaction temperature of the graphite oxidizing mixture during the agitating may be maintained below about 45° C. In some embodiments, a reaction temperature of the graphite oxidizing mixture during the agitating may be maintained at less than or equal to about 15° C.

The cooling of the graphite oxidizing mixture to the second predetermined temperature may be achieved by quenching the graphite oxidizing mixture with water and/or ice. The second predetermined temperature may be about 0° C. The second predetermined temperature may range from about 0° C. to about 10° C. The second predetermined temperature may be greater than or equal to about 0° C. but less than or equal to about 1° C., 2° C., 3° C., 4° C., 5° C., 6° C., 7° C., 8° C., 9° C., or 10° C.

In some embodiments, single-layer GO is produced. The first reaction may include using about 32 L 98% $H_2SO_4$ per kilogram graphite. About 4.8 kg $KMnO_4$ powder per kilogram graphite may be used. The method may or may not include cooking time. The method may include given temperatures and processes. The method may include, from the beginning of the reaction, about 1.5 hour of addition of $KMnO_4$ (reaction temperature less than about 15° C.), about 2 hours of reaction time (reaction temperature range of about 20-30° C.), about 1 hour of addition of about 32 kg ice (reaction temperature of about 50° C.) and about 1 hour reaction time (reaction temperature of about 50° C.). About 72 kg ice per kilogram graphite may be used to quench the reaction and/or for ice for reaction cooling. About 2 L 30% $H_2O_2$ per kilogram of graphite may be used to quench the reaction and/or for neutralizing. The graphite may be of a given type. The graphite may be 325sh natural flake graphite. Mixing speed (e.g., during one or more reaction processes) may be about 100 rpm. The method may include given timing of mixing ingredients. Sulfuric acid and graphite may be premixed to minimize graphite dust and added to the reactor rapidly. Potassium permanganate addition may be exothermic. The $KMnO_4$ may be added at a rate slow enough to keep the reaction temperature below about 15° C. (e.g., the $KMnO_4$ may be added over approximately 1.5 hours).

During oxidation to single-layer GO, graphite (about 1 kg) may be mixed with 98% $H_2SO_4$ (about 32 L) and chilled to about −10° C. GO reactor cooling coils may be chilled to −2° C. Graphite/$H_2SO_4$ mixture may then be poured carefully into the reactor. Potassium permanganate (about 4.8 kg) powder may be added to the reactor slowly over the course of about 1.5 hours, carefully keeping the reaction temperature below about 15° C. After addition of $KMnO_4$ is complete, the reactor cooling coil temperature may be raised to about 12° C. and the reaction may heat up to about 30° C. over about 1.5 hours. Then, the reactor cooling coils may be cooled to about −2° C. and the reaction temperature may stay at about 30° C. for approximately an additional 30 minutes. Crushed ice (about 32 kg) may be added over the course of about 1 hour. The reaction temperature may climb to about 50° C. over this time. After ice addition, the reaction may be allowed to stir for about 1 hour. The reaction may then be quenched with crushed ice (about 72 kg). The ice may melt during this quench, and then 30% hydrogen peroxide (about 2 L) may be added to stop the reaction.

In some embodiments, multi-layer GO is produced. The first reaction may include using about 25 L 98% $H_2SO_4$ per kilogram graphite. About 2 kg $KMnO_4$ per kilogram graphite oxide may be used. The method may or may not include cooking time. The method may include given temperatures and process(es). The method may include a 45-minute addition of $KMnO_4$ (reaction temperature less than about 15° C.) and 30-minute reaction time (reaction temperature of about 15° C.). About 125 kg ice per kilogram graphite may be used to quench the reaction and/or for ice for reaction cooling. About 1 L 30% hydrogen peroxide per kilogram of graphite may be used to quench the reaction and/or for neutralizing. The graphite may be of a given type. The graphite may be highly exfoliated and milled, small flake, large surface area graphite, 9 micron flakes, or any combination thereof. Mixing speed (e.g., during one or more reaction processes) may be about 100 rpm. The method may include a given timing of mixing ingredients. Sulfuric acid and graphite may be premixed to minimize graphite dust and added to the reactor rapidly. Potassium permanganate addition may be exothermic. The $KMnO_4$ may be added at a rate slow enough to keep the reaction temperature below about 15° C. (e.g., the $KMnO_4$ may be added over approximately 1.5 hours).

During oxidation to multi-layer GO, graphite (about 1 kg) may be mixed with 98% $H_2SO_4$ (about 32 L) and chilled to about −10° C. Graphite oxide/graphene oxide reactor cooling coils may be chilled to about −2° C. Graphite/$H_2SO_4$ mixture may then be poured carefully into the reactor. Potassium permanganate (about 2 kg) powder may be added to the reactor slowly over the course of about 45 minutes, carefully keeping the reaction temperature below about 15° C. The reaction may then be allowed to stir for about 30 minutes at a reaction temperature of about 15° C. The reaction may then be quenched with crushed ice (about 125 kg). The ice may melt during this quench, and then 30% $H_2O_2$ (about 1 L) may be added to stop the reaction.

A first purification may include filtration (also "first filtration" herein). The first filtration may be performed after the first reaction. The first filtration may include post-oxidation purification. The first filtration may remove impurities from the crude product and bring the pH up to at least about 5. After oxidation, the crude product may contain GO as well as one or more (e.g., several) impurities, for example, $H_2SO_4$, manganese oxides, and manganese sulfate. After purification is complete, the GO may then be concentrated to, for example, a solution of about 1% by weight. Water and/or acid from first reaction may be removed during filtration. After the first reaction, the acid concentration may be about 30% (single-layer) or about 16% (multi-layer) $H_2SO_4$, corresponding to a pH of approximately 0. Filtration may be complete when the pH reaches about 5, correspond to an acid concentration of about 0.00005%. A given amount or degree of concentration may be needed (e.g., if used as feedstock for a second reaction). In some embodiments, the GO may be in dry powder form and/or an aqueous solution of about 2% (by weight).

Purification may be performed using a tangential flow filtration process. The filter type may be a modified polyether sulfone hollow filter membrane with about 0.02 micron pore size. Purification may be complete when the pH of the product reaches about 5. The purified GO may then be concentrated to a solution of about 1% by weight. After the first purification, the $H_2SO_4$ concentration of the product may be about 0.00005% with a pH of about 5.

The second reaction may include reduction of GO (in solution) to form reduced GO (e.g., PCS). In some embodiments, GO from the first reaction may be used as input to the second reaction. For example, single-layer GO from the first reaction may be used as input to the second reaction. In some embodiments, GO produced by a Hummers'-based method may be used as input to the second reaction. For example, single-layer GO from a Hummers'-based method may be used as input to the second reaction. In some embodiments, single-layer GO may be used instead of multi-layer GO as input to the second reaction to produce PCS. Use of single-layer may in some instances reduce waste material relative to multi-layer GO when PCS is produced in the second reaction (e.g., to produce sheets). For example, a higher amount of multi-layer GO may be needed to produce PCS than when single-layer GO is used.

The second reaction may include heating the reaction to about 90° C. and adding $H_2O_2$ over the course of about an hour. The reaction may continue to heat at about 90° C. for about 3 more hours. Sodium ascorbate (e.g., $C_6H_7NaO_6$) may be added over the course of about 30 minutes. The reaction may continue to heat at about 90° C. for approximately an additional 1.5 hours. The total time at about 90° C. may be about 6 hours. The mixing speed (also "stirring rate" herein) may be as described elsewhere herein (e.g., in relation to synthesis of GO). In some embodiments, the mixing speed (e.g., during one or more reaction processes) may be at least about 100 rpm, 110 rpm, 120 rpm, 130 rpm, 140 rpm, 150 rpm, 160 rpm, 170 rpm, 180 rpm, 190 rpm, or 200 rpm.

As previously described, the reaction temperature may be about 90° C. Alternatively, one or more of the aforementioned steps may be performed at a temperature of between about 60° C. and 180° C. The steps may be performed at the same temperature or temperature range, or at one or more different temperatures or temperature ranges (e.g., at one or more different temperatures between about 60° C. and 180° C.). For example, all steps may be performed at the same temperature (or temperature range), each step may be performed at a different temperature (or temperature range), or subset(s) of steps may be performed at the same temperature (or temperature range). In some embodiments, the temperature may be between about 60° C. and 80° C., 60° C. and 90° C., 60° C. and 100° C., 60° C. and 120° C., 60° C. and 140° C., 60° C. and 160° C., 60° C. and 180° C., 80° C. and 90° C., 80° C. and 100° C., 80° C. and 120° C., 80° C. and 140° C., 80° C. and 160° C., 80° C. and 180° C., 90° C. and 100° C., 90° C. and 120° C., 90° C. and 140° C., 90° C. and 160° C., 90° C. and 180° C., 100° C. and 120° C., 100° C. and 140° C., 100° C. and 160° C., 100° C. and 180° C., 120° C. and 140° C., 120° C. and 160° C., 120° C. and 180° C., 140° C. and 160° C., 140° C. and 180° C., or 160° C. and 180° C. The temperature may or may not be allowed to change or fluctuate within a given range (e.g., the temperature for a given step may be kept constant at a given temperature within a given range, or may be allowed to fluctuate within the given range). In some instances (e.g., at temperatures above about 100° C.), the reaction chamber may need to be sealed.

The concentration of the GO in the solution prior to the second reaction may range, for example, between about 0% and 2% by mass (e.g., 0-2 kg/100 L of aqueous solution). For example, the concentration of GO by mass may be between about 0% and 0.5%, 0% and 1%, 0% and 1.5%, 0% and 2%, 0.5% and 1%, 0.5% and 1.5%, 0.5% and 2%, 1% and 1.5%, 1% and 2%, or 1.5% and 2%. The concentration of GO may be less than or equal to about 2%, 1.5%, 1%, 0.5%, 0.25%, 0.1% (or less) by mass. For example, the concentration of GO in the solution (e.g., from the first reaction) may be about 1% by mass (1 kg GO in 100 L of aqueous solution). In some embodiments, the concentration may be limited by how much GO may be dissolved in water while maintaining its fluidity. In some embodiments, the solution may become viscous (e.g., at a concentration of 2% or more, i.e., 2 kg or more of GO in 100 L of water). In some embodiments, the solution viscosity may be less than a viscosity at which reaction cooking may become difficult. A higher concentration (e.g., 1% by mass) may allow the amount of water used in the reaction to be decreased (e.g., as high concentration as possible may minimize the amount of water used in the reaction). The water may be filtered at the end of the second reaction. A decrease in the amount of water used in the second reaction may decrease filtration time (e.g., the larger the volume of the solution, the longer it may take in filtration).

In some embodiments, $H_2O_2$ (e.g., with a concentration of about 30% by weight) may be provided in an amount between about 10 L and 100 L per 1 kg GO. For example, between about 10 L and 20 L, 10 L and 30 L, 10 L and 40 L, 10 L and 50 L, 10 L and 60 L, 10 L and 70 L, 10 L and 80 L, 10 L and 90 L, 10 L and 100 L, 20 L and 30 L, 20 L and 40 L, 20 L and 50 L, 20 L and 60 L, 20 L and 70 L, 20 L and 80 L, 20 L and 90 L, 20 L and 100 L, 30 L and 40 L, 30 L and 50 L, 30 L and 60 L, 30 L and 70 L, 30 L and 80 L, 30 L and 90 L, 30 L and 100 L, 40 L and 50 L, 40 L and 60 L, 40 L and 70 L, 40 L and 80 L, 40 L and 90 L, 40 L and 100 L, 50 L and 60 L, 50 L and 70 L, 50 L and 80 L, 50 L and 90 L, 50 L and 100 L, 60 L and 70 L, 60 L and 80 L, 60 L and 90 L, 60 L and 100 L, 70 L and 80 L, 70 L and 90 L, 70 L and 100 L, 80 L and 90 L, 80 L and 100 L, or 90 L and 100 L of $H_2O_2$ (e.g., with a concentration of about 30% by weight) may be provided per 1 kg of GO. In some embodiments, greater than or equal to about 10 L, 20 L, 30 L, 40 L, 50 L, 60 L, 70 L, 80 L, 90 L, or 100 L of $H_2O_2$ (e.g., with a concentration of about 30% by weight) per 1 kg GO may be provided. In some embodiments, less than about 100 L, 90 L, 80 L, 70 L, 60 L, 50 L, 40 L, 30 L, 20 L, or 15 L of $H_2O_2$ (e.g., with a concentration of about 30% by weight) per 1 kg GO may be provided. An amount of $H_2O_2$ equivalent to any of the aforementioned amounts of the 30% solution may be added as a solution with a different concentration or in concentrated or pure form (e.g., 90%-100% by weight). The amount of $H_2O_2$ equivalent to any of the aforementioned amounts of the 30% solution may be expressed in terms of volume based on a 100% (or pure) solution. The amount of $H_2O_2$ equivalent to any of the aforementioned amounts of the 30% solution may be expressed in terms of moles or in terms of weight of $H_2O_2$. For example, between about 3 kg (or 88 moles) and 30 kg (or 882 moles) of (pure) $H_2O_2$ may be provided per 1 kg GO. Expressed on a weight basis, between about 3 kg and 6 kg, 3 kg and 9 kg, 3 kg and 12 kg, 3 kg and 15 kg, 3 kg and 18 kg, 3 kg and 21 kg, 3 kg and 24 kg, 3 kg and 27 kg, 3 kg and 30 kg, 6 kg and 9 kg, 6 kg and 12 kg, 6 kg and 15 kg, 6 kg and 18 kg, 6 kg and 21 kg, 6 kg and 24 kg, 6 kg and 27 kg, 6 kg and 30 kg, 9 kg and 12 kg, 9 kg and 15 kg, 9 kg and 18 kg, 9 kg and 21 kg, 9 kg and 24 kg, 9 kg and 30 kg, 12 kg and 15 kg, 12 kg and 18 kg, 12 kg and 21 kg, 12 kg and 24 kg, 12 kg and 27 kg, 12 kg and 30 kg, 15 kg and 18 kg, 15 kg and 21 kg, 15 kg and 24 kg, 15 kg and 30 kg, 18 kg and 21 kg, 18 kg and 24 kg, 18 kg and 27 kg, 18 kg and 30 kg, 21 kg and 24 kg, 21 kg and 27 kg, 21 kg and 30 kg, 24 kg and 27 kg, 24 kg and 30 kg, or 27 kg and 30 kg of pure $H_2O_2$ may be added per 1 kg GO. Expressed on a weight basis, greater than or equal to about 3 kg, 6 kg, 9 kg, 12 kg, 15 kg, 18 kg, 21 kg, 24 kg, or 30 kg of pure $H_2O_2$ per 1 kg GO may be provided. Expressed on a weight basis, less than about 30 kg, 24 kg, 21 kg, 18 kg, 15 kg, 12 kg, 9 kg, 6 kg, or 4.5 kg of pure $H_2O_2$ per 1 kg GO may be provided.

In some embodiments, sodium ascorbate may be provided in an amount between about 1 kg and 10 kg per 1 kg GO. For example, between about 1 kg and 2 kg, 1 kg and 3 kg, 1 kg and 4 kg, 1 kg and 5 kg, 1 kg and 6 kg, 1 kg and 7 kg, 1 kg and 8 kg, 1 kg and 9 kg, 1 kg and 10 kg, 2 kg and 3 kg, 2 kg and 4 kg, 2 kg and 5 kg, 2 kg and 6 kg, 2 kg and 7 kg, 2 kg and 8 kg, 2 kg and 9 kg, 2 kg and 10 kg, 3 kg and 4 kg, 3 kg and 5 kg, 3 kg and 6 kg, 3 kg and 7 kg, 3 kg and 8 kg, 3 kg and 9 kg, 3 kg and 10 kg, 4 kg and 5 kg, 4 kg and 6 kg, 4 kg and 7 kg, 4 kg and 8 kg, 4 kg and 9 kg, 4 kg and 10 kg, 5 kg and 6 kg, 5 kg and 7 kg, 5 kg and 8 kg, 5 kg and 9 kg, 5 kg and 10 kg, 6 kg and 7 kg, 6 kg and 8 kg, 6 kg and 9 kg, 6 kg and 10 kg, 7 kg and 8 kg, 7 kg and 9 kg, 7 kg and 10 kg, 8 kg and 9 kg, 8 kg and 10 kg, or 9 kg and 10 kg of sodium ascorbate may be provided per 1 kg of GO. In some embodiments, greater than or equal to about 1 kg, 2 kg, 3 kg, 4 kg, 5 kg, 6 kg, 7 kg, 8 kg, 9 kg or 10 kg of sodium ascorbate per 1 kg GO may be provided. In some embodiments, less than about 15 kg, 14 kg, 13 kg, 12 kg, 11 kg, 10 kg, 9 kg, 8 kg, 7 kg, 6 kg, 5 kg, 4 kg, 3 kg, 2 kg or 1.5 kg of sodium ascorbate per 1 kg GO may be provided.

In some embodiments, for 1 kg of GO, between about 10 L and 100 L of 30% $H_2O_2$ and between about 1 kg and 10 kg of sodium ascorbate may be used.

In some embodiments, at least about y=90%, 95%, 98%, 99%, or 99.5%, or substantially all of the GO may be converted. The amount of PCS produced per unit of GO may depend on the oxygen content of the GO and on the oxygen content of the PCS. In some embodiments, the C:O atomic ratio of the GO may be, for example, between about 4:1 and 5:1, and the oxygen content of the PCS may be, for example, less than or equal to about 5 atomic percent. In such cases, the amount of PCS produced may be between about 0.75y and 0.84 units of PCS per unit of GO on a weight basis. In some embodiments, the C:O atomic ratio of the GO may be, for example, between about 7:3 and 5:1, and the oxygen content of the PCS may be, for example, less than or equal to about 5 atomic percent. In such cases, the amount of PCS produced may be between about 0.64y and 0.84 units of PCS per unit of GO on a weight basis. In some embodiments, the C:O atomic ratio of the GO may be, for example, at least about 7:3, and the oxygen content of the PCS may be, for example, less than or equal to about 5 atomic percent. In such cases, the amount of PCS produced may be at least about 0.64y units of PCS per unit of GO on a weight basis. In some embodiments, the amount of PCS produced may be at least about 0.5, 0.55, 0.6, 0.65, 0.7, 0.75, or 0.8 units of PCS per unit of GO on a weight basis. In some embodiments, the amount of PCS produced may be between about 0.5 and 0.85, 0.6 and 0.8, or 0.7 and 0.8 units of PCS per unit of GO on a weight basis.

A second purification may include purifying PCS via vacuum filtration through, for example, a 2 micron 316 stainless steel mesh filter. The filtration (also "second filtration" herein) may be performed after the second reaction. After the second reaction, there may be several impurities such as, for example, sodium ascorbate, plus small amounts of $H_2SO_4$, manganese oxides, and manganese salts. The filtration may remove at least a portion of the impurities from the solution. Water, acid, and/or salts may be left over from second reaction. For example, there may be about 4.95 kg of sodium ascorbate per kilogram of GO left over in solution from the second reaction. There may also be impurities from the GO. For example, there may remain small amounts of $H_2SO_4$, manganese oxides, and manganese salts from the initial oxidation (e.g., first reaction).

Water may be flushed through the PCS to remove salts. The conductivity of the solution after reduction may be greater than about 200 millisiemens per centimeter (mS/cm). The PCS solution may be washed with deionized water (e.g., with copious amounts of deionized water) until the conductivity of the PCS solution reaches about 50 microsiemens per centimeter (μS/cm) or less. Purification may be complete when the PCS solution has a conductivity of about 50 μS/cm or less. A given amount or degree of concentration may be needed for straight PCS use. For example, a concentration of about 2% by weight or greater may be needed.

Energy Storage Devices

Energy storage devices of the present disclosure may comprise at least one electrode (e.g., a positive electrode and a negative electrode). The carbon-based material of the present disclosure may be provided in the positive electrode (cathode during discharge), the negative electrode (anode during discharge), or both. In certain embodiments, the energy storage device may be a lithium-ion battery. In certain embodiments, the energy storage device may be a lithium metal battery. In certain embodiments, the energy storage device may be a supercapacitor.

A battery may comprise at least one cell comprising a negative electrode (anode during discharge) comprising graphite, and a positive electrode (cathode during discharge) comprising PCS/lithium iron phosphate (LFP). A configuration/form factor of the battery may be as described elsewhere herein (e.g., cylindrical, pouch, prismatic, or button cells of various sizes). In certain embodiments, the battery may have a cylindrical configuration/form factor (e.g., 18650 packaging). It will be appreciated that while the positive electrode and battery in this example is primarily described as comprising PCS, such positive electrodes and batteries may comprise any carbon-based material in accordance with the present disclosure.

Figure 9:
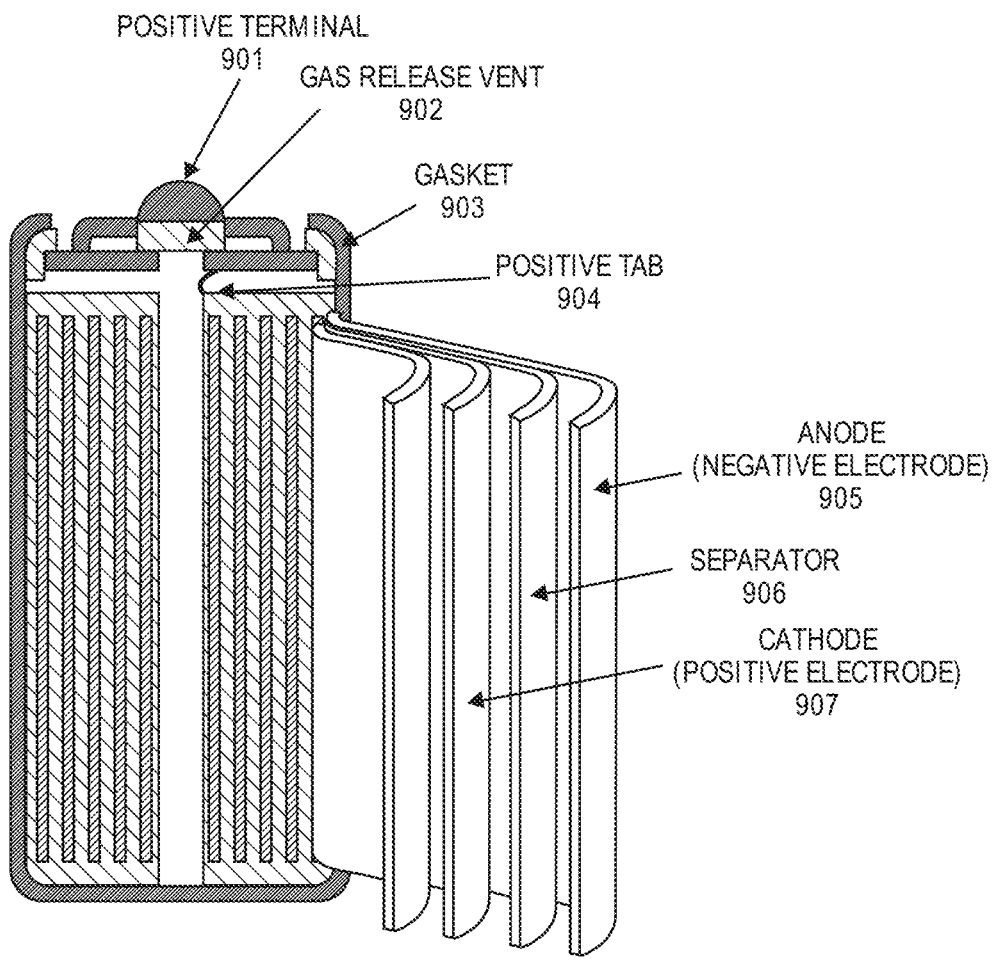
FIG. 9 is a schematic illustration of an example of a structure of a battery.
Figure 11:
FIG. 11 shows examples of finished cells.

FIG. 9 is a schematic illustration of an example of a structure of a (battery) cell (e.g., an LFP-based cell). The battery comprises a positive terminal 901, a gas release vent 902 adjacent to the positive terminal 901, and a gasket 903 that seals the interior of the battery. A positive tab 904 connects the positive terminal 901 to a positive electrode 907. A separator 906 separates the positive electrode from a negative electrode 905. In some embodiments, the battery comprises layered sheets of, in sequence, the separator 906, the positive electrode 907, the separator 906, and the negative electrode 905 rolled into a cylinder with a circular cross-section. In this configuration, at least a portion of the outer surface of the cell (e.g., bottom surface of cell can) may serve as a negative terminal. FIG. 11 shows examples of finished LFP-based batteries. In this instance, the batteries are configured with a cylindrical configuration/form factor.

Figure 16:
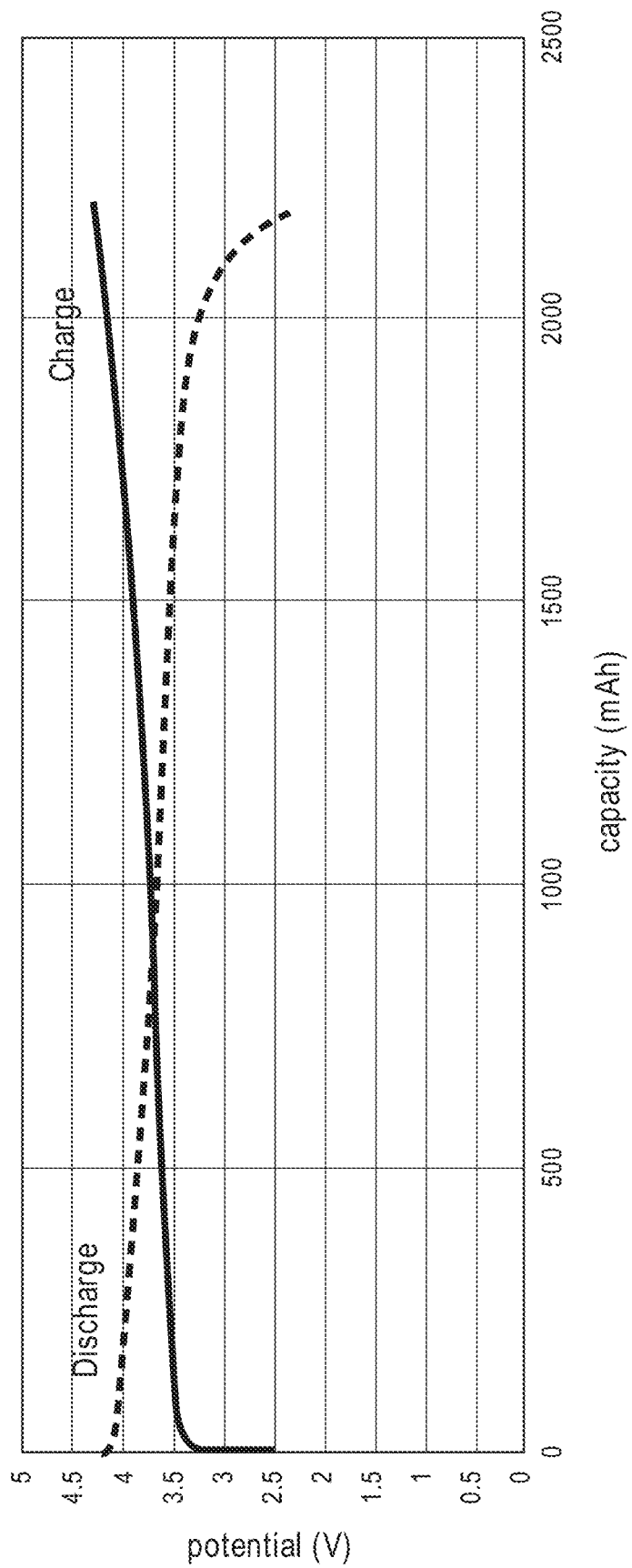
FIG. 16 shows an example of performance of a lithium nickel cobalt aluminum oxide (NCA)-based cell.

A battery may comprise at least one cell comprising a negative electrode (anode during discharge) comprising graphite, and a positive electrode (cathode during discharge) comprising PCS/lithium nickel cobalt aluminum oxide (NCA). A configuration/form factor of the battery may be as described elsewhere herein (e.g., cylindrical, pouch, prismatic, or button cells of various sizes). In certain embodiments, the battery may have a cylindrical configuration/form factor (e.g., 18650 packaging). FIG. 16 shows example performance of an NCA-based battery. It will be appreciated that while the positive electrode and battery in this example is primarily described as comprising PCS, such positive electrodes and batteries may comprise any carbon-based material in accordance with the present disclosure.

Figure 13:
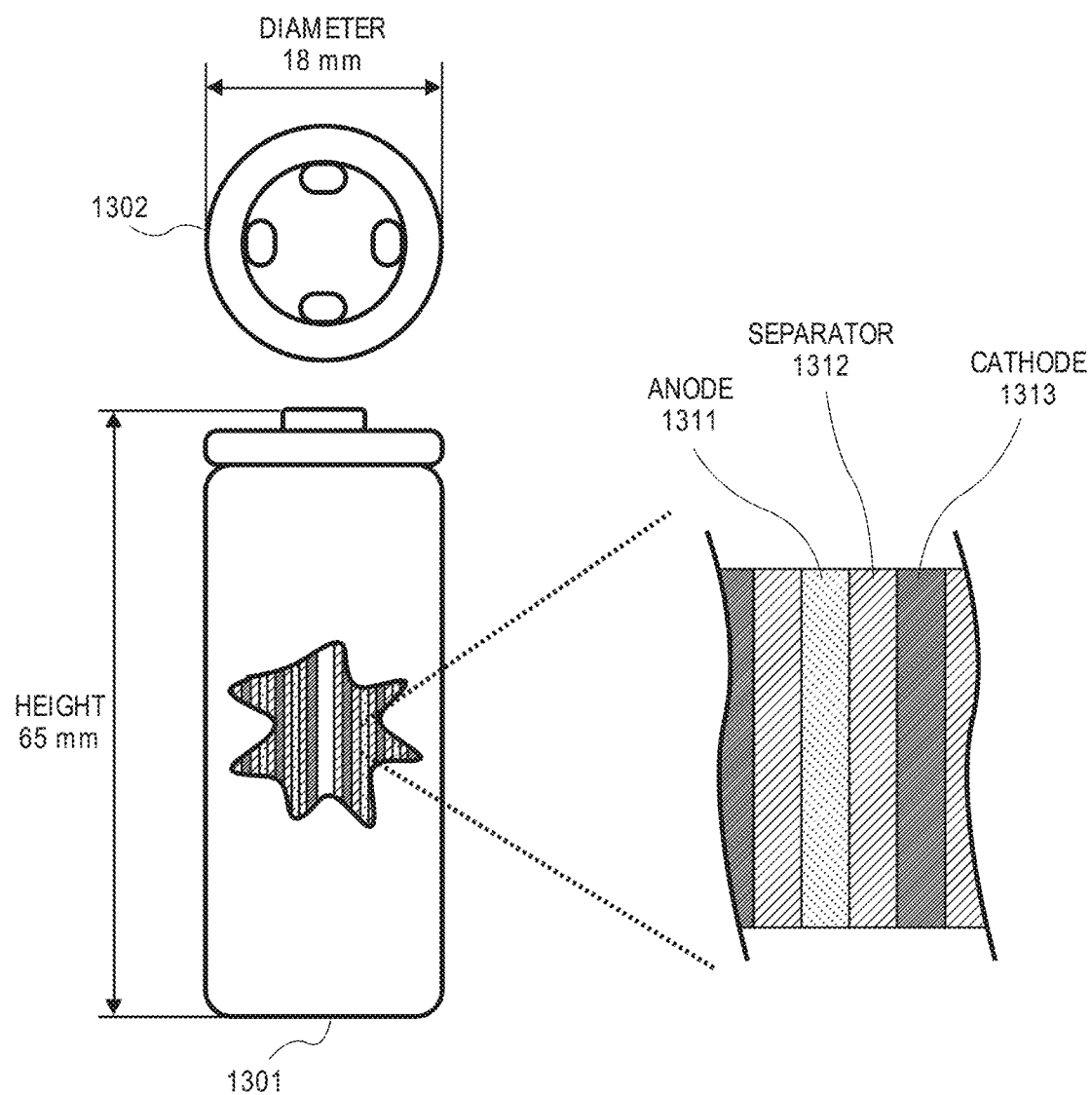
FIG. 13 is a schematic illustration of an example of a structure of a battery.
Figure 15:
FIG. 15 shows examples of finished cells.

FIG. 13 is a schematic illustration of an example of a structure of a (battery) cell (e.g., an NCA-based cell). A side view 1301 and a top view 1302 of the battery are shown. In some embodiments, the battery has a height of about 65 mm, and a diameter of about 18 mm. A separator 1312 separates a cathode (positive electrode) 1313 from an anode (negative electrode) 1311. In some embodiments, the battery comprises layered sheets of the anode 1311, the separator 1312, and the cathode 1313 rolled into a cylinder with a circular cross-section. FIG. 15 shows examples of finished NCA-based batteries. In this instance, the batteries are configured with a cylindrical configuration/form factor.

A battery may comprise at least one cell comprising a negative electrode (anode during discharge) comprising graphite and a positive electrode (cathode during discharge) comprising PCS/lithium nickel manganese cobalt oxide (NMC). A configuration/form factor of the battery may be as described elsewhere herein (e.g., cylindrical, pouch, prismatic, or button cells of various sizes). In certain embodiments, the battery may have a pouch configuration/form factor (e.g., LiPoly packaging). It will be appreciated that while the positive electrode and battery in this example are primarily described as comprising PCS, such positive electrodes and batteries may comprise any carbon-based material in accordance with the present disclosure.

Figure 17:
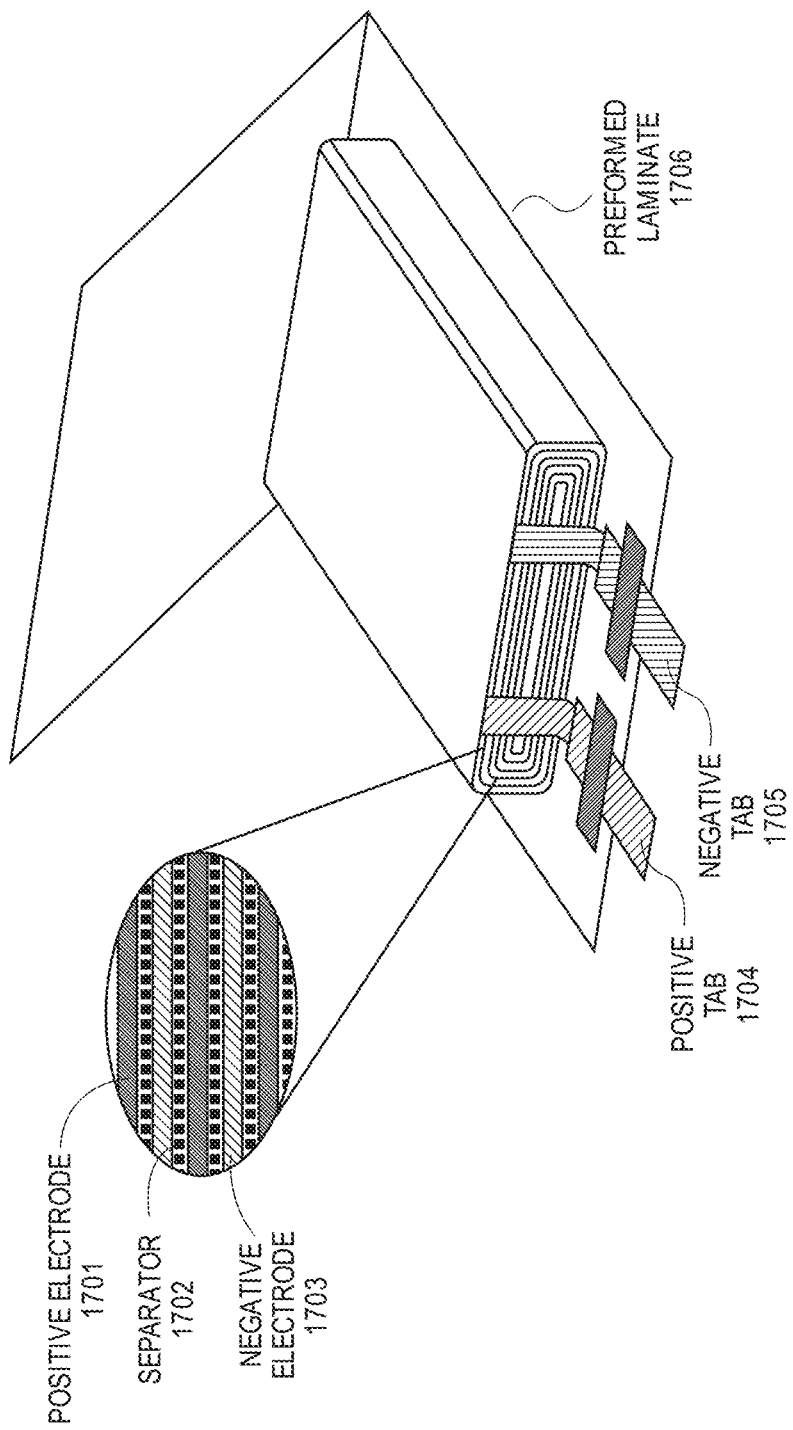
FIG. 17 is a schematic illustration of an example of a structure of a battery.
Figure 21:
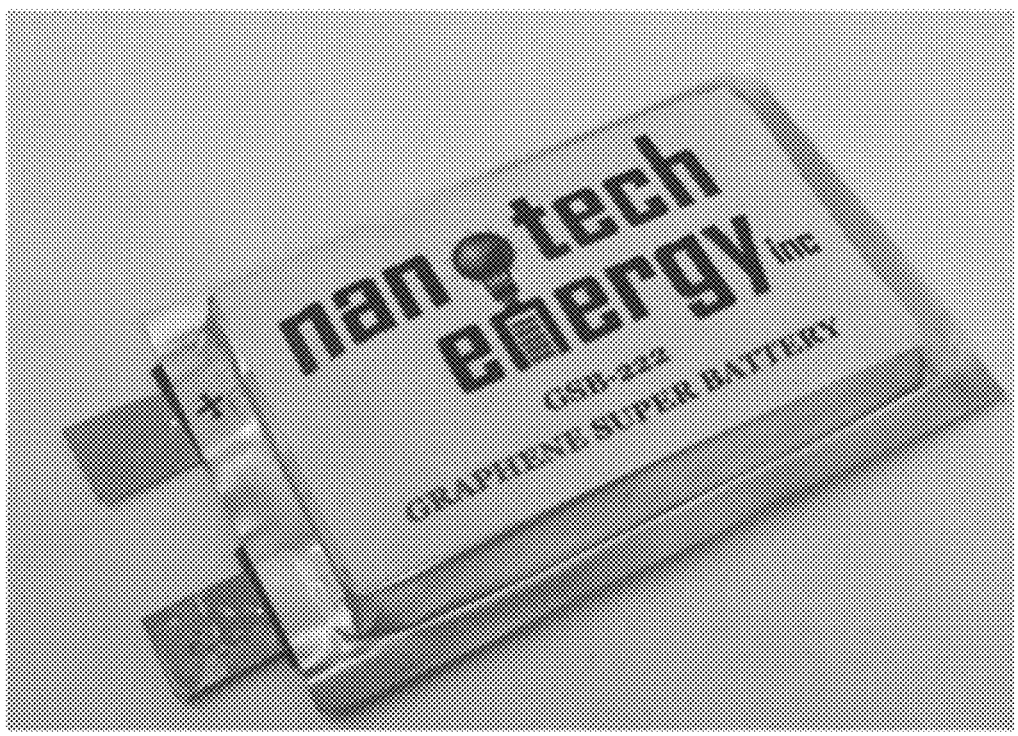
FIG. 21 shows an example of a finished cell.

FIG. 17 is a schematic illustration of an example of a structure of a (battery) cell (e.g., an NMC-based cell). A separator 1702 separates a positive electrode 1701 from a negative electrode 1703. In some embodiments, the battery comprises layered sheets of the negative electrode 1703, the separator 1702, and the positive electrode 1701 rolled into a cylinder with a rectangular cross-section. The positive and negative electrodes are connected with a positive tab 1704 and a negative tab 1705, respectively. The battery may be encapsulated in a preformed aluminum laminate 1706. FIG. 21 shows an example of a finished NMC-based battery. In this instance, the battery is configured with a pouch configuration/form factor.

Energy storage devices of the present disclosure may have different configurations and/or form factors (e.g., see FIG. 9, FIG. 11, FIG. 13, FIG. 15, FIG. 17, and FIGS. 20-21). Any aspects of the present disclosure described in relation to a given configuration and/or form factor described in relation to an energy storage device comprising a given material or set of materials may equally apply to an energy storage device comprising a different material or set of materials described herein at least in some configurations. The energy storage devices of the present disclosure may be packaged in any form. The packaging may be driven by final application.

A given configuration and/or form factor may include a given packaging. The configuration and/or form factor may be selected based on application (e.g., a pouch cell may be selected for application in a cell phone, whereas cylindrical cells may be selected for certain other consumer devices). For example, a cell of an energy storage device described herein may be configured as a cylindrical cell, a pouch cell, a rectangular cell, a prismatic cell, a button cell, or another configuration. Each such configuration may have a given size and final form factor. The form factor may correspond to a given packaging. The packaging may be rigid or non-rigid. The packaging may or may not hermetically seal the cell.

Cylindrical, prismatic, and button cells may use metallic enclosures. A cylindrical cell may have an exterior stainless steel can as its package. In some embodiments, a cell may comprise 18 mm by 65 mm cylindrical cell packaging (also "18650 packaging" herein), 26 mm by 65 mm cylindrical cell packaging (also "26650 packaging" herein), or 32 mm by 65 mm cylindrical cell packaging (also "32650 packaging" herein). Such packaging may include, for example, one or more of outer metallic packaging and a negative terminal (e.g., a cell can), gasket(s), insulator(s), separator(s) (e.g., anode separator(s)), a metal mesh, and/or other components (e.g., see FIG. 9 and FIG. 13). The sealed can exterior may withstand high internal pressures. In some embodiments, the cylindrical cell package may include a pressure relief mechanism, for example, a membrane seal that ruptures upon excess internal pressure, and/or a re-sealable vent to release internal pressure.

A button cell may not have a safety vent. The button cell may comprise a cell can (e.g., in electrical communication with a positive electrode) sealed to a cap (e.g., in electrical communication with a negative electrode) with a gasket.

Prismatic cells may be contained in a rectangular can. A prismatic cell may be packaged, for example, in welded aluminum housings. Heavier gauge metal may be used for a prismatic cell container (e.g., a slightly thicker wall size may be used for the prismatic cell to compensate for decreased mechanical stability from a cylindrical configuration). In some embodiments, electrodes of a prismatic cell may be stacked. In some embodiments, electrodes of a prismatic cell may be in the form of a flattened spiral. Prismatic cells may be configured in various formats and/or sizes. Such formats and/or sizes may be configured, for example, based on charge storage capacity (e.g., 800 milliamp hours (mAh) to 4,000 mAh format for mobile phones, tablets, low-profile laptops, and other portable consumer electronics, or 20-50 Ah for electric powertrains in hybrid and electric vehicles).

Soft case/pack or pouch cells may comprise a laminated architecture in a bag of thin aluminized plastic, glued with different types of polymers for tightness. A pouch cell may comprise heat-sealable multi-layer foil packaging (e.g., see FIG. 17). Such packaging may serve as a soft pack. The electrical contacts in the pouch cell may comprise conductive foil tabs welded to the electrodes and sealed to the pouch material (e.g., brought to the outside in a fully sealed way). The pouch cell may be packaged using, for example, lithium polymer battery packaging (e.g., packaging used for lithium polymer cells with solid electrolytes, also "LiPoly packaging" herein). Such packaging may include, for example, a foil pouch with an outer plastic laminate. A pouch cell may have different sizes. In some embodiments, a pouch cell may be configured or sized for a specific application (e.g., pouch cells may be placed into small areas between custom electronics packages). In some embodiments, a size of a pouch cell may correspond to given charge storage capacity (e.g., a charge storage capacity in the 40 Ah range for use in energy storage systems or a charge storage capacity suitable for cell phone and portable consumer electronics applications such as drones and hobby gadgets).

Composition of Energy Storage Devices

A lithium-ion battery (LIB) may comprise a negative electrode. In some embodiments, the LIB may comprise a carbon-based negative electrode (e.g., comprising graphite or carbon nanotubes). In some embodiments, the LIB may comprise a silicon (Si) negative electrode. In some embodiments, the LIB may comprise an alloy-based negative electrode (e.g., comprising tin alloys). In some embodiments, the LIB may comprise an oxide or sulfide-based negative electrode (e.g., comprising manganese(II) oxide (MnO) or magnesium sulfide (MgS)). The LIB may comprise a positive electrode comprising an oxide, for example, layered oxide (e.g., $LiCoO_2$), spinel (e.g., $LiMn_2O_4$), or olivine (e.g., $LiFePO_4$). The LIB may comprise conductive additive(s). The conductive additive(s) may be provided in the positive electrode, the negative electrode, or both. The conductive additive(s) may include, for example, carbon black or carbon nanotubes. The LIB may comprise a binder, wherein the binder comprises at least one of a first binder and a second binder. In some embodiments, the first binder is the same as the second binder. In some embodiments, the first binder is not the same as the second binder. The LIB may comprise an electrolyte. The electrolyte may include, for example, a lithium salt (e.g., lithium hexafluorophosphate ($LiPF_6$), lithium tetrafluoroborate ($LiBF_4$), or lithium perchlorate ($LiClO_4$)) in an organic solution (e.g., ethylene carbonate, dimethyl carbonate, or diethyl carbonate).

In some embodiments, the carbon-based material of the present disclosure may be provided in the positive electrode of a lithium-ion battery. The carbon-based material may be used as a conductive additive (e.g., to replace carbon black). The carbon-based material may be used as an active material in the positive electrode.

In some embodiments, the carbon-based material of the present disclosure may be provided in the negative electrode of a lithium-ion battery. The carbon-based material may be used as an active material in the negative electrode. The carbon-based material may be used as coating on other active materials (e.g., Si) and/or may form composites with other active materials (e.g., Si) for the negative electrode.

In some embodiments, the carbon-based material of the present disclosure may be provided in the negative electrode of a lithium metal battery. The carbon-based material may be used as coating on the lithium negative electrode (e.g., to inhibit dendrite growth).

In some embodiments, the carbon-based material of the present disclosure may be provided in the positive electrode and in the negative electrode of a lithium-ion battery. The carbon-based material may be used as a conductive additive in the positive electrode and at the same time as active material in the negative electrode. The carbon-based material may be used as active material in the positive electrode (e.g., when GO is used in the negative electrode).

In some embodiments, the carbon-based material of the present disclosure may be provided as active material in symmetric supercapacitors. The carbon-based material may be used in both electrodes (e.g., as carbon-based aerogel).

In some embodiments, the carbon-based material of the present disclosure may be provided as active material in asymmetric supercapacitors. The carbon-based material may be used as one electrode and coupled with another electrode made of other materials (e.g., $MnO_2$). The carbon-based material may also be used in both electrodes when it forms composites with different materials in the two electrodes.

The energy storage devices described herein may comprise an electrolyte. Electrolytes described herein may include, for example, aqueous, organic, and/or ionic liquid-based electrolytes. The electrolyte may be liquid, solid, or a gel. An ionic liquid may be hybridized with another solid component, for example, polymer or silica (e.g., fumed silica), to form a gel-like electrolyte (also "ionogel" herein). An aqueous electrolyte may be hybridized with, for example, a polymer, to form a gel-like electrolyte (also "hydrogel" and "hydrogel-polymer" herein). An organic electrolyte may be hybridized with, for example, a polymer, to form a gel-like electrolyte. In some embodiments, the electrolyte may also include a lithium salt (e.g., $LiPF_6$, $LiBF_4$, or $LiClO_4$). For example, the electrolyte may include a lithium salt (e.g., $LiPF_6$, $LiBF_4$, or $LiClO_4$) in an organic solution (e.g., ethylene carbonate (EC), dimethyl carbonate (DMC), or diethyl carbonate (DEC)). The electrolyte may comprise one or more additional components (e.g., one or more additives). In some embodiments, an electrolyte composition (e.g., a soft pack polymer LIB electrolyte) may include one or more of EC, ethyl methyl carbonate (EMC), DEC, $LiPF_6$, and an additive. In some embodiments, an electrolyte composition (e.g., a high capacity LIB electrolyte) may include one or more of EC, DEC, propylene carbonate (PC), $LiPF_6$, and an additive.

The energy storage device may comprise a polymer. In some embodiments, the energy storage device may comprise a separator. For example, the energy storage device may comprise a polyethylene separator (e.g., an ultra-high molecular weight polyethylene separator). The separator may have a thickness of less than or equal to about 16 µm, 15 µm, 14 µm, 13 µm, 12 µm, 11 µm, 10 µm, 9 µm, or 8 µm (e.g., about 12±2.0 µm). The separator may have a given permeability. The separator may have a permeability (e.g., Gurley type) of greater than or equal to about 150 sec/100 mL, 160 sec/100 mL, 170 sec/100 mL, 180 sec/100 mL, 190 sec/100 mL, 200 sec/100 mL, 210 sec/100 mL, 220 sec/100 mL, 230 sec/100 mL, 240 sec/100 mL, 250 sec/100 mL, 260 sec/100 mL, 270 sec/100 mL, 280 sec/100 mL, 290 sec/100 mL, or 300 sec/100 mL (e.g., 180±50 sec/100 mL). Alternatively, the separator may have a permeability (e.g., Gurley type) of less than about 150 sec/100 mL, 160 sec/100 mL, 170 sec/100 mL, 180 sec/100 mL, 190 sec/100 mL, 200 sec/100 mL, 210 sec/100 mL, 220 sec/100 mL, 230 sec/100 mL, 240 sec/100 mL, 250 sec/100 mL, 260 sec/100 mL, 270 sec/100 mL, 280 sec/100 mL, 290 sec/100 mL, or 300 sec/100 mL. The separator may have a given porosity. The separator may have a porosity of greater than or equal to about 35%, 40%, 45%, or 50% (e.g., 40%±5%). Alternatively, the separator may have a porosity of less than about 35%, 40%, 45%, or 50%. The separator may have a given shut-down temperature (e.g., above the shut-down temperature, the separator may not function normally). In some embodiments, the separator may have a shut-down temperature (actual) of less than or equal to about 150° C., 140° C., 130° C., 120° C., 110° C., or 100° C. In some embodiments, the separator may have a shut-down temperature (DSC) between about 130° C. and 150° C., 130° C. and 140° C., or 136° C. and 140° C.

An active material of an electrode (e.g., a positive electrode of a LIB) may include, for example, graphene, lithium iron phosphate (LFP; $LiFePO_4$), lithium nickel cobalt aluminum oxide (NCA; $LiNiCoAlO_2$), lithium nickel manganese cobalt oxide (NMC; $LiNiMnCoO_2$), lithium cobalt oxide (LCO; $LiCoO_2$), lithium manganese oxide (LMO; $LiMn_2O_4$), lithium titanate (LTO; $Li_4TisOi_2$), lithium sulfur, or any combination thereof. One or more of such active materials may be present in the electrode at an individual or combined concentration (e.g., by weight on a dry basis, without solvent) between about 0.25% and 0.5%, 0.25% and 0.75%, 0.25% and 1%, 0.25% and 2%, 0.25% and 5%, 0.25% and 10%, 0.25% and 20%, 0.25% and 30%, 0.25% and 40%, 0.25% and 50%, 0.5% and 0.75%, 0.5% and 1%, 0.5% and 2%, 0.5% and 5%, 0.5% and 10%, 0.5% and 20%, 0.5% and 30%, 0.5% and 40%, 0.5% and 50%, 0.75% and 1%, 0.75% and 2%, 0.75% and 5%, 0.75% and 10%, 0.75% and 20%, 0.75% and 30%, 0.75% and 40%, 0.75% and 50%, 1% and 2%, 1% and 5%, 1% and 10%, 1% and 20%, 1% and 30%, 1% and 40%, 1% and 50%, 2% and 5%, 2% and 10%, 2% and 20%, 2% and 30%, 2% and 40%, 2% and 50%, 5% and 10%, 5% and 20%, 5% and 30%, 5% and 40%, 5% and 50%, 10% and 20%, 10% and 30%, 10% and 40%, 10% and 50%, 20% and 30%, 20% and 40%, 20% and 50%, 30% and 40%, 30% and 50%, 40% and 50%, 50% and 55%, 50% and 60%, 50% and 65%, 50% and 67%, 50% and 69%, 50% and 71%, 50% and 73%, 50% and 75%, 50% and 77%, 50% and 79%, 50% and 81%, 50% and 83%, 50% and 85%, 50% and 87%, 50% and 89%, 50% and 91%, 50% and 93%, 50% and 95%, 50% and 97%, 50% and 99%, 55% and 60%, 55% and 65%, 55% and 67%, 55% and 69%, 55% and 71%, 55% and 73%, 55% and 75%, 55% and 77%, 55% and 79%, 55% and 81%, 55% and 83%, 55% and 85%, 55% and 87%, 55% and 89%, 55% and 91%, 55% and 93%, 55% and 95%, 55% and 97%, 55% and 99%, 60% and 65%, 60% and 67%, 60% and 69%, 60% and 71%, 60% and 73%, 60% and 75%, 60% and 77%, 60% and 79%, 60% and 81%, 60% and 83%, 60% and 85%, 60% and 87%, 60% and 89%, 60% and 91%, 60% and 93%, 60% and 95%, 60% and 97%, 60% and 99%, 65% and 67%, 65% and 69%, 65% and 71%, 65% and 73%, 65% and 75%, 65% and 77%, 65% and 79%, 65% and 81%, 65% and 83%, 65% and 85%, 65% and 87%, 65% and 89%, 65% and 91%, 65% and 93%, 65% and 95%, 65% and 97%, 65% and 99%, 67% and 69%, 67% and 71%, 67% and 73%, 67% and 75%, 67% and 77%, 67% and 79%, 67% and 81%, 67% and 83%, 67% and 85%, 67% and 87%, 67% and 89%, 67% and 91%, 67% and 93%, 67% and 95%, 67% and 97%, 67% and 99%, 69% and 71%, 69% and 73%, 69% and 75%, 69% and 77%, 69% and 79%, 69% and 81%, 69% and 83%, 69% and 85%, 69% and 87%, 69% and 89%, 69% and 91%, 69% and 93%, 69% and 95%, 69% and 97%, 69% and 99%, 71% and 73%, 71% and 75%, 71% and 77%, 71% and 79%, 71% and 81%, 71% and 83%, 71% and 85%, 71% and 87%, 71% and 89%, 71% and 91%, 71% and 93%, 71% and 95%, 71% and 97%, 71% and 99%, 73% and 75%, 73% and 77%, 73% and 79%, 73% and 81%, 73% and 83%, 73% and 85%, 73% and 87%, 73% and 89%, 73% and 91%, 73% and 93%, 73% and 95%, 73% and 97%, 73% and 99%, 75% and 77%, 75% and 79%, 75% and 81%, 75% and 83%, 75% and 85%, 75% and 87%, 75% and 89%, 75% and 91%, 75% and 93%, 75% and 95%, 75% and 97%, 75% and 99%, 77% and 79%, 77% and 81%, 77% and 83%, 77% and 85%, 77% and 87%, 77% and 89%, 77% and 91%, 77% and 93%, 77% and 95%, 77% and 97%, 77% and 99%, 79% and 81%, 79% and 83%, 79% and 85%, 79% and 87%, 79% and 89%, 79% and 91%, 79% and 93%, 79% and 95%, 79% and 97%, 79% and 99%, 81% and 83%, 81% and 85%, 81% and 87%, 81% and 89%, 81% and 91%, 81% and 93%, 81% and 95%, 81% and 97%, 81% and 99%, 83% and 85%, 83% and 87%, 83% and 89%, 83% and 91%, 83% and 93%, 83% and 95%, 83% and 97%, 83% and 99%, 85% and 87%, 85% and 89%, 85% and 91%, 85% and 93%, 85% and 95%, 85% and 97%, 85% and 99%, 87% and 89%, 87% and 91%, 87% and 93%, 87% and 95%, 87% and 97%, 87% and 99%, 89% and 91%, 89% and 93%, 89% and 95%, 89% and 97%, 89% and 99%, 90% and 90.5%, 90% and 91%, 90% and 91.5%, 90% and 92%, 90% and 92.5%, 90% and 93%, 90% and 93.5%, 90% and 94%, 90% and 94.5%, 90% and 95%, 90% and 95.5%, 90% and 96%, 90% and 96.5%, 90% and 97%, 90% and 97.5%, 90% and 98%, 90% and 98.5%, 90% and 99%, 90% and 99.5%, 90.5% and 91%, 90.5% and 91.5%, 90.5% and 92%, 90.5% and 92.5%, 90.5% and 93%, 90.5% and 93.5%, 90.5% and 94%, 90.5% and 94.5%, 90.5% and 95%, 90.5% and 95.5%, 90.5% and 96%, 90.5% and 96.5%, 90.5% and 97%, 90.5% and 97.5%, 90.5% and 98%, 90.5% and 98.5%, 90.5% and 99%, 90.5% and 99.5%, 91% and 91.5%, 91% and 92%, 91% and 92.5%, 91% and 93%, 91% and 93.5%, 91% and 94%, 91% and 94.5%, 91% and 95%, 91% and 95.5%, 91% and 96%, 91% and 96.5%, 91% and 97%, 91% and 97.5%, 91% and 98%, 91% and 98.5%, 91% and 99%, 91% and 99.5%, 91.5% and 92%, 91.5% and 92.5%, 91.5% and 93%, 91.5% and 93.5%, 91.5% and 94%, 91.5% and 94.5%, 91.5% and 95%, 91.5% and 95.5%, 91.5% and 96%, 91.5% and 96.5%, 91.5% and 97%, 91.5% and 97.5%, 91.5% and 98%, 91.5% and 98.5%, 91.5% and 99%, 91.5% and 99.5%, 92% and 92.5%, 92% and 93%, 92% and 93.5%, 92% and 94%, 92% and 94.5%, 92% and 95%, 92% and 95.5%, 92% and 96%, 92% and 96.5%, 92% and 97%, 92% and 97.5%, 92% and 98%, 92% and 98.5%, 92% and 99%, 92% and 99.5%, 92.5% and 93%, 92.5% and 93.5%, 92.5% and 94%, 92.5% and 94.5%, 92.5% and 95%, 92.5% and 95.5%, 92.5% and 96%, 92.5% and 96.5%, 92.5% and 97%, 92.5% and 97.5%, 92.5% and 98%, 92.5% and 98.5%, 92.5% and 99%, 92.5% and 99.5%, 93% and 93.5%, 93% and 94%, 93% and 94.5%, 93% and 95%, 93% and 95.5%, 93% and 96%, 93% and 96.5%, 93% and 97%, 93% and 97.5%, 93% and 98%, 93% and 98.5%, 93% and 99%, 93% and 99.5%, 93.5% and 94%, 93.5% and 94.5%, 93.5% and 95%, 93.5% and 95.5%, 93.5% and 96%, 93.5% and 96.5%, 93.5% and 97%, 93.5% and 97.5%, 93.5% and 98%, 93.5% and 98.5%, 93.5% and 99%, 93.5% and 99.5%, 94% and 94.5%, 94% and 95%, 94% and 95.5%, 94% and 96%, 94% and 96.5%, 94% and 97%, 94% and 97.5%, 94% and 98%, 94% and 98.5%, 94% and 99%, 94% and 99.5%, 94.5% and 95%, 94.5% and 95.5%, 94.5% and 96%, 94.5% and 96.5%, 94.5% and 97%, 94.5% and 97.5%, 94.5% and 98%, 94.5% and 98.5%, 94.5% and 99%, 94.5% and 99.5%, 95% and 95.5%, 95% and 96%, 95% and 96.5%, 95% and 97%, 95% and 97.5%, 95% and 98%, 95% and 98.5%, 95% and 99%, 95% and 99.5%, 95.5% and 96%, 95.5% and 96.5%, 95.5% and 97%, 95.5% and 97.5%, 95.5% and 98%, 95.5% and 98.5%, 95.5% and 99%, 95.5% and 99.5%, 96% and 96.5%, 96% and 97%, 96% and 97.5%, 96% and 98%, 96% and 98.5%, 96% and 99%, 96% and 99.5%, 96.5% and 97%, 96.5% and 97.5%, 96.5% and 98%, 96.5% and 98.5%, 96.5% and 99%, 96.5% and 99.5%, 97% and 97.5%, 97% and 98%, 97% and 98.5%, 97% and 99%, 97% and 99.5%, 97.5% and 98%, 97.5% and 98.5%, 97.5% and 99%, 97.5% and 99.5%, 98% and 98.5%, 98% and 99%, 98% and 99.5%, 98.5% and 99%, 98.5% and 99.5%, or 99% and 99.5%. One or more of such active materials may be present in the electrode at an individual or combined concentration (e.g., by weight on a dry basis, without solvent) of greater than or equal to about 50%, 51%, 52%, 53%, 54%, 55%, 56%, 57%, 58%, 59%, 60%, 61%, 62%, 63%, 64%, 65%, 65.5%, 66%, 66.5%, 67%, 67.5%, 68%, 68.5%, 69%, 69.5%, 70%, 70.5%, 71%, 71.5%, 72%, 72.5%, 73%, 73.5%, 74%, 74.5%, 75%, 75.5%, 76%, 76.5%, 77%, 77.5%, 78%, 78.5%, 79%, 79.5%, 80%, 80.5%, 81%, 81.5%, 82%, 82.5%, 83%, 83.5%, 84%, 84.5%, 85%, 85.5%, 86%, 86.5%, 87%, 87.5%, 88%, 88.5%, 89%, 89.5%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5%, 99%, 99.5%, or 99.9%. In addition, or as an alternative, one or more of such active materials may be present in the electrode at an individual or combined concentration of less than or equal to about 99.9%, 99.5%, 99%, 98.5%, 98%, 97.5%, 97%, 96.5%, 96%, 95.5%, 95%, 94.5%, 94%, 93.5%, 93%, 92.5%, 92%, 91.5%, 91%, 90.5%, 90%, 89.5%, 89%, 88.5%, 88%, 87.5%, 87%, 86.5%, 86%, 85.5%, 85%, 84.5%, 84%, 83.5%, 83%, 82.5%, 82%, 81.5%, 81%, 80.5%, 80%, 79.5%, 79%, 78.5%, 78%, 77.5%, 77%, 76.5%, 76%, 75.5%, 75%, 74.5%, 74%, 73.5%, 73%, 72.5%, 72%, 71.5%, 71%, 70.5%, 70%, 69.5%, 69%, 68.5%, 68%, 67.5%, 67%, 66.5%, 66%, 65.5%, 65%, 64%, 63%, 62%, 61%, 60%, 59%, 58%, 57%, 56%, 55%, 54%, 53%, 52%, 51%, or 50%. One or more of such active materials may be present in the electrode at such concentrations in combination with one or more other materials (e.g., one or more other electrode materials and concentrations thereof described herein).

The aforementioned active material may comprise non-lithium metals at a given ratio. For example, the active material may comprise nickel, cobalt, and aluminum at a given ratio (e.g., about 0.815:0.15:0.035 for NCA), or nickel, cobalt, and manganese at a given ratio (e.g., about 6:2:2 for NMC). The active material may comprise at least 1, 2, 3, 4, 5, or more non-lithium metals. The non-lithium metals may be selected among, for example, nickel, cobalt, aluminum, manganese, iron, and titanium. In some embodiments, the active material may comprise a first non-lithium metal at a ratio (e.g., by weight or by mol) of at least about 1, 2, 3, 4, 5, 6, 7, 8, 9, 10, or 15 with respect to a second non-lithium metal. In some embodiments, the active material may comprise the first non-lithium metal at a ratio (e.g., by weight or by mol) of at least about 1, 2, 3, 4, 5, 6, 8, 10, 12, 14, 16, 18, 20, 22, 24, 26, 28, 30, or 35 with respect a third non-lithium metal. In some embodiments, the active material may comprise the second non-lithium metal at a ratio (e.g., by weight or by mol) of at least about 1, 2, 3, 4, 5, 6, 7, 8, 9, 10, or 15 with respect to the third non-lithium metal. The active material may comprise the non-lithium metal(s) and/or one or more non-metals at an individual or combined concentration (e.g., by weight) of greater than or equal to about 1%, 2%, 4%, 6%, 8%, 10%, 15%, 20%, 25%, 30%, 35%, 40%, 45%, 50%, 55%, 60%, 65%, 70%, 75%, 80%, 85%, 90%, 95%, or 99%. In addition, or as an alternative, the active material may comprise the non-lithium metal(s) and/or the one or more non-metals at an individual or combined concentration (e.g., by weight) of less than or equal to about 99.5%, 99%, 95%, 90%, 85%, 80%, 75%, 70%, 65%, 60%, 55%, 50%, 45%, 40%, 35%, 30%, 25%, 20%, 15%, 10%, 5%, or 2%. In certain embodiments, the active material may comprise nickel, cobalt, and aluminum at a concentration (e.g., by weight total) of at least about 50%, 51%, 52%, 53%, 54%, 55%, 56%, 57%, 58%, 59%, or 60% (e.g., about 59±1.0% for NCA). In certain embodiments, the active material may comprise iron at a concentration (e.g., by weight) between about 33% and 36%, and phosphorus at a concentration (e.g., by weight) between about 19% and 21% (e.g., greater than or equal to about 58.5% for NMC). In certain embodiments, the active material may comprise nickel, cobalt, and aluminum at a concentration (e.g., by weight total) of at least about 50%, 51%, 52%, 53%, 54%, 55%, 56%, 57%, 58%, 59%, or 60% (e.g., about 59±1.0% for NCA). The active material may comprise lithium at a concentration (e.g., by weight) of at greater than or equal to about 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, or 10%. In addition, or as an alternative, the active material may comprise lithium at a concentration (e.g., by weight) of less than or equal to about 15%, 10%, 8%, 6%, 5%, 4%, 3%, 2%, or 1.5%. For example, the active material may comprise lithium at a concentration (e.g., by weight) of about 7.2±0.4% for NCA, 7.1% for NMC, or between about 3.9% and 4.9% for LFP. The active material may comprise such lithium concentrations in addition to the aforementioned concentrations of non-lithium metals (e.g., of nickel, cobalt, and aluminum, or of nickel, cobalt, and manganese). The active material may have a given specific surface area. The active material may have a specific surface area greater than or equal to about 0.1 square meter per gram ($m^2/g$), 0.2 $m^2/g$, 0.3 $m^2/g$, 0.4 $m^2/g$, 0.5 $m^2/g$, 0.6 $m^2/g$, 0.7 $m^2/g$, 0.8 $m^2/g$, 0.9 $m^2/g$, 1 $m^2/g$, 2 $m^2/g$, 3 $m^2/g$, 4 $m^2/g$, 5 $m^2/g$, 6 $m^2/g$, 7 $m^2/g$, 8 $m^2/g$, 9 $m^2/g$, 10 $m^2/g$, 11 $m^2/g$, 12 $m^2/g$, 13 $m^2/g$, 14 $m^2/g$, 15 $m^2/g$, 16 $m^2/g$, 17 $m^2/g$, 18 $m^2/g$, 19 $m^2/g$, 20 $m^2/g$ or 25 $m^2/g$. In addition, or as an alternative, the active material may have a specific surface area of less than or equal to about 30 $m^2/g$, 25 $m^2/g$, 20 $m^2/g$, 19 $m^2/g$, 18 $m^2/g$, 17 $m^2/g$, 16 $m^2/g$, 15 $m^2/g$, 14 $m^2/g$, 13 $m^2/g$, 12 $m^2/g$, 11 $m^2/g$, 10 $m^2/g$, 9 $m^2/g$, 8 $m^2/g$, 7 $m^2/g$, 6 $m^2/g$, 5 $m^2/g$, 4 $m^2/g$, 3 $m^2/g$, 2 $m^2/g$, 1 $m^2/g$, 0.9 $m^2/g$, 0.8 $m^2/g$, 0.7 $m^2/g$, 0.6 $m^2/g$, 0.5 $m^2/g$, 0.4 $m^2/g$, 0.3 $m^2/g$, or 0.2 $m^2/g$. In some embodiments, the active material (e.g., NCA) may have a specific surface area between about 0.3 $m^2/g$ and 0.7 $m^2/g$. In some embodiments, the active material (e.g., NMC) may have a specific surface area between about 0.2 $m^2/g$ and 0.5 $m^2/g$. In some embodiments, the active material (e.g., LFP) may have a specific surface area between about 9 $m^2/g$ and 13 $m^2/g$, or 8 $m^2/g$ and 12 $m^2/g$. The active material may have a given first discharge capacity. The active material may have a first discharge capacity of greater than or equal to about 100 milliamp hours per gram (mAh/g), 105 mAh/g, 110 mAh/g, 115 mAh/g, 120 mAh/g, 125 mAh/g, 130 mAh/g, 135 mAh/g, 140 mAh/g, 145 mAh/g, 150 mAh/g, 155 mAh/g, 160 mAh/g, 165 mAh/g, 170 mAh/g, 175 mAh/g, 180 mAh/g, 185 mAh/g, 190 mAh/g, 195 mAh/g, 200 mAh/g, 205 mAh/g, 210 mAh/g, 215 mAh/g, or 220 mAh. In addition, or as an alternative, the active material may have a first discharge capacity less than or equal to about 230 mAh/g, 225 mAh/g, 220 mAh/g, 215 mAh/g, 210 mAh/g, 205 mAh/g, 200 mAh/g, 195 mAh/g, 190 mAh/g, 185 mAh/g, 180 mAh/g, 175 mAh/g, 170 mAh/g, 165 mAh/g, 160 mAh/g, 155 mAh/g, or 150 mAh/g. In some embodiments, the active material (e.g., NCA) may have a first discharge capacity of greater than or equal to about 195 mAh/g (e.g., at a charge/discharge rate of 0.1 C/0.1 C and a voltage window of 4.3-3.0 volts (V)). In some embodiments, the active material (e.g., NMC) may have a first discharge capacity greater than or equal to about 178 mAh/g (e.g., for a coin cell (e.g., CR2032) at a charge/discharge rate of 0.1 C/0.1 C and a voltage window of 3.0 V~4.3 V versus lithium). In some embodiments, the active material (e.g., LFP) may have a first discharge capacity of greater than or equal to about 150 mAh/g (e.g., at 0.2 C). The active material may have a given capacity. The active material may have a capacity of greater than or equal to about 80 mAh/g, 85 mAh/g, 90 mAh/g, 95 mAh/g, 100 mAh/g, 105 mAh/g, 110 mAh/g, 115 mAh/g, 120 mAh/g, 125 mAh/g, 130 mAh/g, 135 mAh/g, 140 mAh/g, 145 mAh/g, 150 mAh/g, 155 mAh/g, 160 mAh/g, 165 mAh/g, 170 mAh/g, 175 mAh/g, 180 mAh/g, 185 mAh/g, 190 mAh/g, 195 mAh/g, 200 mAh/g, 220 mAh/g, 240 mAh/g, 260 mAh/g, 280 mAh/g, 300 mAh/g, 400 mAh/g, 500 mAh/g, 600 mAh/g, 700 mAh/g, 800 mAh/g, or 900 mAh/g. In addition, or as an alternative, the active material may have a capacity greater than or equal to about 600 mAh/g, 500 mAh/g, 400 mAh/g, 300 mAh/g, 250 mAh/g, 210 mAh/g, 205 mAh/g, 200 mAh/g, 195 mAh/g, 190 mAh/g, 185 mAh/g, 180 mAh/g, 175 mAh/g, 170 mAh/g, 165 mAh/g, 160 mAh/g, 155 mAh/g, 150 mAh/g, 145 mAh/g, 140 mAh/g, 135 mAh/g, or 130 mAh/g. In some embodiments, the active material (e.g., NMC) may have a capacity between about 162 mAh/g and 168 mAh/g (e.g., for a full cell at a charge/discharge rate of 0.5 C). The active material may have a given first discharge efficiency (e.g., greater than or equal to about 75%, 81%, 82%, 83%, 84%, 85% (e.g., NMC), 86%, 87%, 88%, 89% (e.g., NCA), 90%, 91%, 92%, 93%, 94%, or 95%). The active material may have any combination of one or more of the aforementioned particle size compositions, specific surface areas, first discharge capacities, capacities, first discharge efficiencies, and other properties.

An electrode (e.g., a positive or negative electrode of a LIB) may include a binder. In some embodiments, the binder comprises at least one of a first binder and a second binder. In some embodiments, the first binder is the same as the second binder. In some embodiments, the first binder is not the same as the second binder. A binder (e.g., a first binder or a second binder) may comprise, for example, one or more fluoropolymers (e.g., non-reactive thermoplastic fluoropolymers), copolymers, and/or other polymer types. Examples of binders may include, but are not limited to, polyvinyl fluoride (PVF), polyvinylidene fluoride (PVDF), polytetrafluoroethylene (PTFE), polychlorotrifluoroethylene (PCTFE), perfluoroalkoxy polymer (PFA, MFA), fluorinated ethylene-propylene (FEP), polyethylenetetrafluoroethylene (ETFE), polyethylenechlorotrifluoroethylene (ECTFE), perfluorinated plastomer (FFPM/FFKM), fluorocarbon or (also "chlorotrifluoroethylenevinylidene fluoride" in the claims herein; FPM/FKM), fluoroelastomer (also "tetrafluoroethylene-propylene" in the claims herein; FEPM), perfluoropolyether (PFPE), perfluorosulfonic acid (PFSA), perfluoropolyoxetane, P(VDF-trifluoroethylene), P(VDF-tetrafluoroethylene), or any combination thereof. One or more of such binder materials may be present in the electrode (e.g., in the positive electrode and/or in the negative electrode) at an individual or combined concentration (e.g., by weight on a dry basis, without solvent) between about 0.5% and 1%, 0.5% and 2%, 0.5% and 3%, 0.5% and 4%, 0.5% and 5%, 0.5% and 6%, 0.5% and 7%, 0.5% and 8%, 0.5% and 9%, 0.5% and 10%, 0.5% and 11%, 0.5% and 12%, 0.5% and 13%, 0.5% and 14%, 0.5% and 15%, 0.5% and 16%, 0.5% and 17%, 0.5% and 18%, 0.5% and 19%, 0.5% and 20%, 1% and 2%, 1% and 3%, 1% and 4%, 1% and 5%, 1% and 6%, 1% and 7%, 1% and 8%, 1% and 9%, 1% and 10%, 1% and 11%, 1% and 12%, 1% and 13%, 1% and 14%, 1% and 15%, 1% and 16%, 1% and 17%, 1% and 18%, 1% and 19%, 1% and 20%, 2% and 3%, 2% and 4%, 2% and 5%, 2% and 6%, 2% and 7%, 2% and 8%, 2% and 9%, 2% and 10%, 2% and 11%, 2% and 12%, 2% and 13%, 2% and 14%, 2% and 15%, 2% and 16%, 2% and 17%, 2% and 18%, 2% and 19%, 2% and 20%, 3% and 4%, 3% and 5%, 3% and 6%, 3% and 7%, 3% and 8%, 3% and 9%, 3% and 10%, 3% and 11%, 3% and 12%, 3% and 13%, 3% and 14%, 3% and 15%, 3% and 16%, 3% and 17%, 3% and 18%, 3% and 19%, 3% and 20%, 4% and 5%, 4% and 6%, 4% and 7%, 4% and 8%, 4% and 9%, 4% and 10%, 4% and 11%, 4% and 12%, 4% and 13%, 4% and 14%, 4% and 15%, 4% and 16%, 4% and 17%, 4% and 18%, 4% and 19%, 4% and 20%, 5% and 6%, 5% and 7%, 5% and 8%, 5% and 9%, 5% and 10%, 5% and 11%, 5% and 12%, 5% and 13%, 5% and 14%, 5% and 15%, 5% and 16%, 5% and 17%, 5% and 18%, 5% and 19%, 5% and 20%, 6% and 7%, 6% and 8%, 6% and 9%, 6% and 10%, 6% and 11%, 6% and 12%, 6% and 13%, 6% and 14%, 6% and 15%, 6% and 16%, 6% and 17%, 6% and 18%, 6% and 19%, 6% and 20%, 7% and 8%, 7% and 9%, 7% and 10%, 7% and 11%, 7% and 12%, 7% and 13%, 7% and 14%, 7% and 15%, 7% and 16%, 7% and 17%, 7% and 18%, 7% and 19%, 7% and 20%, 8% and 9%, 8% and 10%, 8% and 11%, 8% and 12%, 8% and 13%, 8% and 14%, 8% and 15%, 8% and 16%, 8% and 17%, 8% and 18%, 8% and 19%, 8% and 20%, 9% and 10%, 9% and 11%, 9% and 12%, 9% and 13%, 9% and 14%, 9% and 15%, 9% and 16%, 9% and 17%, 9% and 18%, 9% and 19%, 9% and 20%, 10% and 11%, 10% and 12%, 10% and 13%, 10% and 14%, 10% and 15%, 10% and 16%, 10% and 17%, 10% and 18%, 10% and 19%, 10% and 20%, 11% and 12%, 11% and 13%, 11% and 14%, 11% and 15%, 11% and 16%, 11% and 17%, 11% and 18%, 11% and 19%, 11% and 20%, 12% and 13%, 12% and 14%, 12% and 15%, 12% and 16%, 12% and 17%, 12% and 18%, 12% and 19%, 12% and 20%, 13% and 14%, 13% and 15%, 13% and 16%, 13% and 17%, 13% and 18%, 13% and 19%, 13% and 20%, 14% and 15%, 14% and 16%, 14% and 17%, 14% and 18%, 14% and 19%, 14% and 20%, 15% and 16%, 15% and 17%, 15% and 18%, 15% and 19%, 15% and 20%, 16% and 17%, 16% and 18%, 16% and 19%, 16% and 20%, 17% and 18%, 17% and 19%, 17% and 20%, 18% and 19%, 18% and 20%, or 19% and 20%. One or more of such binder materials may be present in the electrode (e.g., in the positive electrode and/or in the negative electrode) at an individual or combined concentration (e.g., by weight on a dry basis, without solvent) of greater than or equal to about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, or 20%. In addition, or as an alternative, one or more of such binder materials may be present in the electrode (e.g., in the positive electrode and/or in the negative electrode) at an individual or combined concentration of less than or equal to about 20%, 19.5%, 19%, 18.5%, 18%, 17.5%, 17%, 16.5%, 16%, 15.5%, 15%, 14.5%, 14%, 13.5%, 13%, 12.5%, 12%, 11.5%, 11%, 10.5%, 10%, 9.5%, 9%, 8.5%, 8%, 7.5%, 7%, 6.5%, 6%, 5.5%, 5%, 4.5%, 4%, 3.5%, 3%, 2.5%, 2%, 1.5%, 1%, or 0.5%. One or more of such binder materials may be present in the electrode at such concentrations in combination with one or more other materials (e.g., one or more other electrode materials and concentrations thereof described herein).

An electrode (e.g., a positive or negative electrode of a LIB) may be prepared with the aid of a solvent. A formula may include various levels of the solvent. At least a portion or all of the solvent may evaporate from the electrode. Examples of solvents may include, but are not limited to, 2-pyrrolidone (2-Py), n-vinylpyrrolidone (NVP), n-methyl-2-pyrrolidone (NMP), methyl ethyl ketone, or any combination thereof. One or more of such solvent compounds may be present in the electrode (e.g., in the positive electrode and/or in the negative electrode) at an individual or combined concentration (e.g., by weight on a wet basis) between about 20% and 25%, 20% and 30%, 20% and 35%, 20% and 40%, 20% and 45%, 20% and 50%, 20% and 55%, 20% and 60%, 20% and 65%, 20% and 70%, 20% and 75%, 25% and 30%, 25% and 35%, 25% and 40%, 25% and 45%, 25% and 50%, 25% and 55%, 25% and 60%, 25% and 65%, 25% and 70%, 25% and 75%, 30% and 35%, 30% and 40%, 30% and 45%, 30% and 50%, 30% and 55%, 30% and 60%, 30% and 65%, 30% and 70%, 30% and 75%, 35% and 40%, 35% and 45%, 35% and 50%, 35% and 55%, 35% and 60%, 35% and 65%, 35% and 70%, 35% and 75%, 40% and 45%, 40% and 50%, 40% and 55%, 40% and 60%, 40% and 65%, 40% and 70%, 40% and 75%, 45% and 50%, 45% and 55%, 45% and 60%, 45% and 65%, 45% and 70%, 45% and 75%, 50% and 55%, 50% and 60%, 50% and 65%, 50% and 70%, 50% and 75%, 55% and 60%, 55% and 65%, 55% and 70%, 55% and 75%, 60% and 65%, 60% and 70%, 60% and 75%, 65% and 70%, 65% and 75%, or 70% and 75%. One or more of such solvent compounds may be present in the electrode (e.g., in the positive electrode and/or in the negative electrode) at an individual or combined concentration (e.g., by weight on a wet basis) of greater than or equal to about 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, or 75%. In addition, or as an alternative, one or more of such solvent compounds may be present in the electrode (e.g., in the positive electrode and/or in the negative electrode) at an individual or combined concentration (e.g., by weight on a wet basis) of less than or equal to about 75%, 74%, 73%, 72%, 71%, 70%, 69%, 68%, 67%, 66%, 65%, 64%, 63%, 62%, 61%, 60%, 59%, 58%, 57%, 56%, 55%, 54%, 53%, 52%, 51%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, or 20%. One or more of such solvent compounds may be present in the electrode at such concentrations in combination with one or more other materials (e.g., one or more other electrode materials and concentrations thereof described herein).

An active material of an electrode (e.g., a negative electrode of a LIB) may include, for example, polyacetylene, graphite (e.g., natural graphite or artificial graphite), vapor-phase-grown carbon fiber, soft carbon (graphitizable carbon), hard carbon (non-graphitizable carbon), carbon nanotubes, or any combination thereof. One or more of such active materials may be present in the electrode at an individual or combined concentration (e.g., by weight on a dry basis, without solvent) between about 0.25% and 0.5%, 0.25% and 0.75%, 0.25% and 1%, 0.25% and 2%, 0.25% and 5%, 0.25% and 10%, 0.25% and 20%, 0.25% and 30%, 0.25% and 40%, 0.25% and 50%, 0.5% and 0.75%, 0.5% and 1%, 0.5% and 2%, 0.5% and 5%, 0.5% and 10%, 0.5% and 20%, 0.5% and 30%, 0.5% and 40%, 0.5% and 50%, 0.75% and 1%, 0.75% and 2%, 0.75% and 5%, 0.75% and 10%, 0.75% and 20%, 0.75% and 30%, 0.75% and 40%, 0.75% and 50%, 1% and 2%, 1% and 5%, 1% and 10%, 1% and 20%, 1% and 30%, 1% and 40%, 1% and 50%, 2% and 5%, 2% and 10%, 2% and 20%, 2% and 30%, 2% and 40%, 2% and 50%, 5% and 10%, 5% and 20%, 5% and 30%, 5% and 40%, 5% and 50%, 10% and 20%, 10% and 30%, 10% and 40%, 10% and 50%, 20% and 30%, 20% and 40%, 20% and 50%, 30% and 40%, 30% and 50%, 40% and 50%, 50% and 55%, 50% and 60%, 50% and 65%, 50% and 70%, 50% and 72%, 50% and 74%, 50% and 76%, 50% and 78%, 50% and 80%, 50% and 82%, 50% and 84%, 50% and 86%, 50% and 88%, 50% and 90%, 50% and 91%, 50% and 92%, 50% and 93%, 50% and 94%, 50% and 95%, 50% and 96%, 50% and 97%, 50% and 98%, 50% and 99%, 55% and 60%, 55% and 65%, 55% and 70%, 55% and 72%, 55% and 74%, 55% and 76%, 55% and 78%, 55% and 80%, 55% and 82%, 55% and 84%, 55% and 86%, 55% and 88%, 55% and 90%, 55% and 91%, 55% and 92%, 55% and 93%, 55% and 94%, 55% and 95%, 55% and 96%, 55% and 97%, 55% and 98%, 55% and 99%, 60% and 65%, 60% and 70%, 60% and 72%, 60% and 74%, 60% and 76%, 60% and 78%, 60% and 80%, 60% and 82%, 60% and 84%, 60% and 86%, 60% and 88%, 60% and 90%, 60% and 91%, 60% and 92%, 60% and 93%, 60% and 94%, 60% and 95%, 60% and 96%, 60% and 97%, 60% and 98%, 60% and 99%, 65% and 70%, 65% and 72%, 65% and 74%, 65% and 76%, 65% and 78%, 65% and 80%, 65% and 82%, 65% and 84%, 65% and 86%, 65% and 88%, 65% and 90%, 65% and 91%, 65% and 92%, 65% and 93%, 65% and 94%, 65% and 95%, 65% and 96%, 65% and 97%, 65% and 98%, 65% and 99%, 70% and 72%, 70% and 74%, 70% and 76%, 70% and 78%, 70% and 80%, 70% and 82%, 70% and 84%, 70% and 86%, 70% and 88%, 70% and 90%, 70% and 91%, 70% and 92%, 70% and 93%, 70% and 94%, 70% and 95%, 70% and 96%, 70% and 97%, 70% and 98%, 70% and 99%, 72% and 74%, 72% and 76%, 72% and 78%, 72% and 80%, 72% and 82%, 72% and 84%, 72% and 86%, 72% and 88%, 72% and 90%, 72% and 91%, 72% and 92%, 72% and 93%, 72% and 94%, 72% and 95%, 72% and 96%, 72% and 97%, 72% and 98%, 72% and 99%, 74% and 76%, 74% and 78%, 74% and 80%, 74% and 82%, 74% and 84%, 74% and 86%, 74% and 88%, 74% and 90%, 74% and 91%, 74% and 92%, 74% and 93%, 74% and 94%, 74% and 95%, 74% and 96%, 74% and 97%, 74% and 98%, 74% and 99%, 76% and 78%, 76% and 80%, 76% and 82%, 76% and 84%, 76% and 86%, 76% and 88%, 76% and 90%, 76% and 91%, 76% and 92%, 76% and 93%, 76% and 94%, 76% and 95%, 76% and 96%, 76% and 97%, 76% and 98%, 76% and 99%, 78% and 80%, 78% and 82%, 78% and 84%, 78% and 86%, 78% and 88%, 78% and 90%, 78% and 91%, 78% and 92%, 78% and 93%, 78% and 94%, 78% and 95%, 78% and 96%, 78% and 97%, 78% and 98%, 78% and 99%, 80% and 82%, 80% and 84%, 80% and 86%, 80% and 88%, 80% and 90%, 80% and 91%, 80% and 92%, 80% and 93%, 80% and 94%, 80% and 95%, 80% and 96%, 80% and 97%, 80% and 98%, 80% and 99%, 82% and 84%, 82% and 86%, 82% and 88%, 82% and 90%, 82% and 91%, 82% and 92%, 82% and 93%, 82% and 94%, 82% and 95%, 82% and 96%, 82% and 97%, 82% and 98%, 82% and 99%, 84% and 86%, 84% and 88%, 84% and 90%, 84% and 91%, 84% and 92%, 84% and 93%, 84% and 94%, 84% and 95%, 84% and 96%, 84% and 97%, 84% and 98%, 84% and 99%, 86% and 88%, 86% and 90%, 86% and 91%, 86% and 92%, 86% and 93%, 86% and 94%, 86% and 95%, 86% and 96%, 86% and 97%, 86% and 98%, 86% and 99%, 88% and 90%, 88% and 91%, 88% and 92%, 88% and 93%, 88% and 94%, 88% and 95%, 88% and 96%, 88% and 97%, 88% and 98%, 88% and 99%, 90% and 91%, 90% and 92%, 90% and 93%, 90% and 94%, 90% and 95%, 90% and 96%, 90% and 97%, 90% and 98%, 90% and 99%, 91% and 92%, 91% and 93%, 91% and 94%, 91% and 95%, 91% and 96%, 91% and 97%, 91% and 98%, 91% and 99%, 92% and 93%, 92% and 94%, 92% and 95%, 92% and 96%, 92% and 97%, 92% and 98%, 92% and 99%, 93% and 94%, 93% and 95%, 93% and 96%, 93% and 97%, 93% and 98%, 93% and 99%, 94% and 95%, 94% and 96%, 94% and 97%, 94% and 98%, 94% and 99%, 95% and 96%, 95% and 97%, 95% and 98%, 95% and 99%, 96% and 97%, 96% and 98%, 96% and 99%, 97% and 98%, 97% and 99%, or 98% and 99%. One or more of such active materials may be present in the electrode at an individual or combined concentration (e.g., by weight on a dry basis, without solvent) of greater than or equal to about 50%, 51%, 52%, 53%, 54%, 55%, 56%, 57%, 58%, 59%, 60%, 61%, 62%, 63%, 64%, 65%, 66%, 67%, 68%, 69%, 70%, 70.5%, 71%, 71.5%, 72%, 72.5%, 73%, 73.5%, 74%, 74.5%, 75%, 75.5%, 76%, 76.5%, 77%, 77.5%, 78%, 78.5%, 79%, 79.5%, 80%, 80.5%, 81%, 81.5%, 82%, 82.5%, 83%, 83.5%, 84%, 84.5%, 85%, 85.5%, 86%, 86.5%, 87%, 87.5%, 88%, 88.5%, 89%, 89.5%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5%, 99%, or 99.5%. In addition, or as an alternative, one or more of such active materials may be present in the electrode at an individual or combined concentration (e.g., by weight on a dry basis, without solvent) of less than or equal to about 99.5%, 99%, 98.5%, 98%, 97.5%, 97%, 96.5%, 96%, 95.5%, 95%, 94.5%, 94%, 93.5%, 93%, 92.5%, 92%, 91.5%, 91%, 90.5%, 90%, 89.5%, 89%, 88.5%, 88%, 87.5%, 87%, 86.5%, 86%, 85.5%, 85%, 84.5%, 84%, 83.5%, 83%, 82.5%, 82%, 81.5%, 81%, 80.5%, 80%, 79.5%, 79%, 78.5%, 78%, 77.5%, 77%, 76.5%, 76%, 75.5%, 75%, 74.5%, 74%, 73.5%, 73%, 72.5%, 72%, 71.5%, 71%, 70.5%, 70%, 69%, 68%, 67%, 66%, 65%, 64%, 63%, 62%, 61%, 60%, 59%, 58%, 57%, 56%, 55%, 54%, 53%, 52%, 51%, or 50%. One or more of such active materials may be present in the electrode at such concentrations in combination with one or more other materials (e.g., one or more other electrode materials and concentrations thereof described herein).

The aforementioned active material may have a particle size distribution such that, for example, 10% of the particles are smaller than about 11 μm, 10 μm, 9 μm, 8 μm, 7 μm, 6 μm, 5 μm, or 4 μm. The active material may have such particle size distribution in combination with, for example, 50% of the particles being smaller than about 16 μm, 15 μm, 14 μm, 13 μm, 12 μm, 11 μm, 10 μm, or 9 μm. The active material may such particle size distribution in combination with, for example, 90% of the particles being smaller than about 31 μm, 30 μm, 29 μm, 28 μm, 27 μm, 26 μm, 25 μm, 24 μm, 23 μm, 22 μm, 21 μm, 20 μm, 19 μm, 18 μm, 17 μm, 16 μm, 15 μm, or 14 μm. In one embodiment, the active material may have a particle size distribution characterized by 10% of the particles smaller than about 6.8 μm, 50% of the particles smaller than about 11.6 μm and 90% of the particles smaller than about 19.3 μm. The active material may have a given tap density (e.g., a tap density of less than or equal to about 1.5 grams per cubic centimeter (g/cm$^3$), 1.4 g/cm$^3$, 1.3 g/cm$^3$, 1.2 g/cm$^3$, 1.1 g/cm$^3$, 1 g/cm$^3$, 0.9 g/cm$^3$, 0.8 g/cm$^3$, 0.7 g/cm$^3$, 0.6 g/cm$^3$, or 0.5 g/cm$^3$). In one embodiment, the active material may have a tap density of less than or equal to about 0.99 g/cm$^3$. The active material may have a given specific surface area (e.g., greater than or equal to about 1 m$^2$/g, 1.5 m$^2$/g, 2 m$^2$/g, 2.5 m$^2$/g, 3 m$^2$/g, 3.5 m$^2$/g, 4 m$^2$/g, 4.5 m$^2$/g, 5 m$^2$/g, 5.5 m$^2$/g, 6 m$^2$/g, 6.5 m$^2$/g, or 7 m$^2$/g). In one embodiment, the active material may have a specific surface area of at least about 3.8 m$^2$/g. The active material may have a given first capacity or first discharge capacity. The active material may have a first capacity or first discharge capacity of at least about 320 mAh/g, 325 mAh/g, 330 mAh/g, 335 mAh/g, 340 mAh/g, 345 mAh/g, 350 mAh/g, 351 mAh/g, 352 mAh/g, 353 mAh/g, 354 mAh/g, 355 mAh/g, 356 mAh/g, 357 mAh/g, 358 mAh/g, 359 mAh/g, 360 mAh/g, 361 mAh/g, 362 mAh/g, 363 mAh/g, 364 mAh/g, 365 mAh/g, 366 mAh/g, 367 mAh/g, 368 mAh/g, 369 mAh/g, 370 mAh/g, 371 mAh/g, 372 mAh/g, 373 mAh/g, 374 mAh/g, 375 mAh/g, 376 mAh/g, 377 mAh/g, 378 mAh/g, 379 mAh/g, 380 mAh/g, 385 mAh/g, 390 mAh/g, 395 mAh/g or 400 mAh/g. In one embodiment, the active material may have a first capacity of at least about 364.9 mAh/g. The active material may have a given efficiency or first discharge efficiency. The active material may have an efficiency or first discharge efficiency of at least about 80%, 81%, 82%, 83%, 84%, 85%, 86%, 87%, 88%, 89%, 90%, 91%, 91.5%, 92%, 92.5%, 93%, 93.5%, 94%, 94.5%, 95%, 95.5%, 96%, 96.5%, 97%, 97.5%, 98%, 98.5%, or 99%. In one embodiment, the active material may have an efficiency of at least about 94.5%. The active material may have a given wettability (e.g., a time to wet surface of at least about 80 seconds (s), 82 s, 84 s, 86 s, 88 s, 90 s, 92 s, 94 s, 96 s, 98 s, 100 s, 105 s, 110 s, or 115 s). In one embodiment, the active material may have a wettability of at least about 92 s. The active material may have a given powder conductivity (e.g., at least about 250 siemens per centimeter (S/cm), 255 S/cm, 260 S/cm, 265 S/cm, 270 S/cm, 275 S/cm, 280 S/cm, 285 S/cm, 290 S/cm, 295 S/cm, 300 S/cm, 305 S/cm, 310 S/cm, 315 S/cm, 320 S/cm, 325 S/cm, 330 S/cm, 335 S/cm, 340 S/cm, 345 S/cm, 350 S/cm, 355 S/cm, 360 S/cm, 365 S/cm or 370 S/cm). In one embodiment, the active material may have a powder conductivity of at least about 340 S/cm. The active material may have a given crystal orientation. The active material may have any combination of one or more of the aforementioned particle size distributions, tap densities, specific surface areas, pellet densities, first capacities, efficiencies, or first discharge efficiencies, wettability, powder conductivities, and other properties (e.g., crystal orientations).

An electrode (e.g., a negative electrode of a LIB) may include conductive additive(s). A conductive additive may comprise, for example, conductive carbon. Examples of conductive additives may include, but are not limited to, carbon black (e.g., acetylene black, furnace black, or other carbon types), vapor-grown carbon fibers, carbon nanotubes, or any combination thereof. One or more of such conductive additives may be present in the electrode at an individual or combined concentration (e.g., by weight on a dry basis, without solvent) between about 0.1% and 0.5%, 0.1% and 1%, 0.1% and 1.5%, 0.1% and 2%, 0.1% and 2.5%, 0.1% and 3%, 0.1% and 3.5%, 0.1% and 4%, 0.1% and 4.5%, 0.1% and 5%, 0.1% and 5.5%, 0.1% and 6%, 0.1% and 6.5%, 0.1% and 7%, 0.1% and 7.5%, 0.1% and 8%, 0.1% and 8.5%, 0.1% and 9%, 0.1% and 9.5%, 0.1% and 10%, 0.5% and 1%, 0.5% and 1.5%, 0.5% and 2%, 0.5% and 2.5%, 0.5% and 3%, 0.5% and 3.5%, 0.5% and 4%, 0.5% and 4.5%, 0.5% and 5%, 0.5% and 5.5%, 0.5% and 6%, 0.5% and 6.5%, 0.5% and 7%, 0.5% and 7.5%, 0.5% and 8%, 0.5% and 8.5%, 0.5% and 9%, 0.5% and 9.5%, 0.5% and 10%, 1% and 1.5%, 1% and 2%, 1% and 2.5%, 1% and 3%, 1% and 3.5%, 1% and 4%, 1% and 4.5%, 1% and 5%, 1% and 5.5%, 1% and 6%, 1% and 6.5%, 1% and 7%, 1% and 7.5%, 1% and 8%, 1% and 8.5%, 1% and 9%, 1% and 9.5%, 1% and 10%, 1.5% and 2%, 1.5% and 2.5%, 1.5% and 3%, 1.5% and 3.5%, 1.5% and 4%, 1.5% and 4.5%, 1.5% and 5%, 1.5% and 5.5%, 1.5% and 6%, 1.5% and 6.5%, 1.5% and 7%, 1.5% and 7.5%, 1.5% and 8%, 1.5% and 8.5%, 1.5% and 9%, 1.5% and 9.5%, 1.5% and 10%, 2% and 2.5%, 2% and 3%, 2% and 3.5%, 2% and 4%, 2% and 4.5%, 2% and 5%, 2% and 5.5%, 2% and 6%, 2% and 6.5%, 2% and 7%, 2% and 7.5%, 2% and 8%, 2% and 8.5%, 2% and 9%, 2% and 9.5%, 2% and 10%, 2.5% and 3%, 2.5% and 3.5%, 2.5% and 4%, 2.5% and 4.5%, 2.5% and 5%, 2.5% and 5.5%, 2.5% and 6%, 2.5% and 6.5%, 2.5% and 7%, 2.5% and 7.5%, 2.5% and 8%, 2.5% and 8.5%, 2.5% and 9%, 2.5% and 9.5%, 2.5% and 10%, 3% and 3.5%, 3% and 4%, 3% and 4.5%, 3% and 5%, 3% and 5.5%, 3% and 6%, 3% and 6.5%, 3% and 7%, 3% and 7.5%, 3% and 8%, 3% and 8.5%, 3% and 9%, 3% and 9.5%, 3% and 10%, 3.5% and 4%, 3.5% and 4.5%, 3.5% and 5%, 3.5% and 5.5%, 3.5% and 6%, 3.5% and 6.5%, 3.5% and 7%, 3.5% and 7.5%, 3.5% and 8%, 3.5% and 8.5%, 3.5% and 9%, 3.5% and 9.5%, 3.5% and 10%, 4% and 4.5%, 4% and 5%, 4% and 5.5%, 4% and 6%, 4% and 6.5%, 4% and 7%, 4% and 7.5%, 4% and 8%, 4% and 8.5%, 4% and 9%, 4% and 9.5%, 4% and 10%, 4.5% and 5%, 4.5% and 5.5%, 4.5% and 6%, 4.5% and 6.5%, 4.5% and 7%, 4.5% and 7.5%, 4.5% and 8%, 4.5% and 8.5%, 4.5% and 9%, 4.5% and 9.5%, 4.5% and 10%, 5% and 5.5%, 5% and 6%, 5% and 6.5%, 5% and 7%, 5% and 7.5%, 5% and 8%, 5% and 8.5%, 5% and 9%, 5% and 9.5%, 5% and 10%, 5.5% and 6%, 5.5% and 6.5%, 5.5% and 7%, 5.5% and 7.5%, 5.5% and 8%, 5.5% and 8.5%, 5.5% and 9%, 5.5% and 9.5%, 5.5% and 10%, 6% and 6.5%, 6% and 7%, 6% and 7.5%, 6% and 8%, 6% and 8.5%, 6% and 9%, 6% and 9.5%, 6% and 10%, 6.5% and 7%, 6.5% and 7.5%, 6.5% and 8%, 6.5% and 8.5%, 6.5% and 9%, 6.5% and 9.5%, 6.5% and 10%, 7% and 7.5%, 7% and 8%, 7% and 8.5%, 7% and 9%, 7% and 9.5%, 7% and 10%, 7.5% and 8%, 7.5% and 8.5%, 7.5% and 9%, 7.5% and 9.5%, 7.5% and 10%, 8% and 8.5%, 8% and 9%, 8% and 9.5%, 8% and 10%, 8.5% and 9%, 8.5% and 9.5%, 8.5% and 10%, 9% and 9.5%, 9% and 10%, or 9.5% and 10%. One or more of such conductive additives may be present in the electrode at an individual or combined concentration (e.g., by weight on a dry basis, without solvent) of greater than or equal to about 0.1%, 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, or 10%. In addition, or as an alternative, one or more of such conductive additives may be present in the electrode at an individual or combined concentration (e.g., by weight on a dry basis, without solvent) of less than or equal to about 10%, 9.5%, 9%, 8.5%, 8%, 7.5%, 7%, 6.5%, 6%, 5.5%, 5%, 4.5%, 4%, 3.5%, 3%, 2.5%, 2%, 1.5%, 1%, 0.5%, or 0.1%. One or more of such conductive additives may be present in the electrode at such concentrations in combination with one or more other materials (e.g., one or more other electrode materials and concentrations thereof described herein).

The aforementioned conductive additive may have a given conductivity. The conductive additive may have an electrical conductivity of at least about 5 S/cm, 6 S/cm, 7 S/cm, 8 S/cm, 9 S/cm, 10 S/cm, 15 S/cm, 20 S/cm, 30 S/cm, 35 S/cm, 40 S/cm, 45 S/cm, 50 S/cm, 55 S/cm, 60 S/cm, or 65 S/cm. The conductive additive may be a powder. In some embodiments, the powder may initially be compressed (e.g., 50% or 100% compressed). The conductive additive may have a given surface area. The conductive additive may have a surface area (e.g., Brunauer, Emmett and Teller (BET) nitrogen surface area, as measured, for example, by ASTM D3037-89 test method) of at least about 10 m$^2$/g, 15 m$^2$/g, 20 m$^2$/g, 25 m$^2$/g, 30 m$^2$/g, 35 m$^2$/g, 40 m$^2$/g, 45 m$^2$/g, 50 m$^2$/g, 55 m$^2$/g, 60 m$^2$/g, 65 m$^2$/g, or 70 m$^2$/g. The conductive additive may have a given density. The conductive additive may have a density (e.g., in the bag, as measured by a suitable test method) of at least about 100 kilograms per cubic meter (kg/m$^3$), 110 kg/m$^3$, 120 kg/m$^3$, 130 kg/m$^3$, 140 kg/m$^3$, 150 kg/m$^3$, 160 kg/m$^3$, 170 kg/m$^3$, 180 kg/m$^3$, 200 kg/m$^3$, 210 kg/m$^3$, 220 kg/m$^3$, 230 kg/m$^3$, 240 kg/m$^3$, or 250 kg/m$^3$.

The carbon-based material of the present disclosure may be used in an electrode as active material, as conductive additive, and/or as binder. In certain embodiments, use of the carbon-based material of the present disclosure in an electrode may allow improved utilization of active material(s) in the electrode. For example, in a conventional LIB, a significant portion of the electrode may not be active, as a large amount of conductive additive (e.g., carbon black) may need to be added to allow the percolation threshold to be reached. In an example, a percolation threshold of carbon black in positive electrodes of lithium-ion batteries (e.g., in LFP) is about 10-15 wt %. A large amount of conductive additive (e.g., about 10-15 wt % carbon black) may therefore need to be added to the electrode to reach the percolation threshold, thereby decreasing the amount of active material that may be provided. The threshold value may depend on the size and aspect ratio of particles in the active material of the positive electrode (e.g., metal oxide may form spherical particles with a diameter of between about 2 microns and 10 microns). When the carbon-based material of the present disclosure is used instead of carbon black (or other conductive additives), the percolation threshold may be significantly lowered (e.g., by a factor of at least about 2, 3, 4, 5, or more). Such decreases in the percolation threshold may be achieved when the carbon-based material is used alone or in combination with one or more other conductive additives (e.g., in combination with some of the conductive additives that it replaces). The carbon-based material of the present disclosure may be used to entirely replace other conductive additives. In such a case, a percolation threshold may or may not exist. Use of the carbon-based material of the present disclosure (alone or in combination with one or more other conductive additives) may allow at least about 5%, 10%, 15%, 20%, or 25% (e.g., by weight) more active material to be incorporated in the electrode when compared with an electrode with substantially the same conductivity (e.g., electrical conductivity) that does not comprise the present carbon-based material. The improved performance of the carbon-based network described herein may result from its composition, morphology, and/or distribution. For example, the carbon-based material may have a higher conductivity per unit weight. The carbon-based material may have a higher conductivity per unit weight serve as binder. In some embodiments, as described elsewhere herein, the carbon-based material described herein may form PCS. The carbon in the carbon-based material of the present disclosure may form a porous network. At least a portion of the carbon-based material of the present disclosure may comprise non-sp2 carbon.

A carbon-based material of the present disclosure (e.g., PCS) may be present in an electrode (e.g., a positive electrode of a LIB) at a concentration (e.g., by weight on a dry basis, without solvent) between about 0.01% and 0.05%, 0.01% and 0.1%, 0.01% and 0.5%, 0.01% and 1%, 0.01% and 2%, 0.01% and 3%, 0.01% and 4%, 0.01% and 5%, 0.01% and 6%, 0.01% and 7%, 0.01% and 8%, 0.01% and 9%, 0.01% and 10%, 0.01% and 11%, 0.01% and 12%, 0.01% and 13%, 0.01% and 14%, 0.01% and 15%, 0.01% and 16%, 0.01% and 17%, 0.01% and 18%, 0.01% and 19%, 0.01% and 20%, 0.01% and 25%, 0.01% and 30%, 0.01% and 35%, 0.01% and 40%, 0.05% and 0.1%, 0.05% and 0.5%, 0.05% and 1%, 0.05% and 2%, 0.05% and 3%, 0.05% and 4%, 0.05% and 5%, 0.05% and 6%, 0.05% and 7%, 0.05% and 8%, 0.05% and 9%, 0.05% and 10%, 0.05% and 11%, 0.05% and 12%, 0.05% and 13%, 0.05% and 14%, 0.05% and 15%, 0.05% and 16%, 0.05% and 17%, 0.05% and 18%, 0.05% and 19%, 0.05% and 20%, 0.05% and 25%, 0.05% and 30%, 0.05% and 35%, 0.05% and 40%, 0.1% and 0.5%, 0.1% and 1%, 0.1% and 2%, 0.1% and 3%, 0.1% and 4%, 0.1% and 5%, 0.1% and 6%, 0.1% and 7%, 0.1% and 8%, 0.1% and 9%, 0.1% and 10%, 0.1% and 11%, 0.1% and 12%, 0.1% and 13%, 0.1% and 14%, 0.1% and 15%, 0.1% and 16%, 0.1% and 17%, 0.1% and 18%, 0.1% and 19%, 0.1% and 20%, 0.1% and 25%, 0.1% and 30%, 0.1% and 35%, 0.1% and 40%, 0.5% and 1%, 0.5% and 2%, 0.5% and 3%, 0.5% and 4%, 0.5% and 5%, 0.5% and 6%, 0.5% and 7%, 0.5% and 8%, 0.5% and 9%, 0.5% and 10%, 0.5% and 11%, 0.5% and 12%, 0.5% and 13%, 0.5% and 14%, 0.5% and 15%, 0.5% and 16%, 0.5% and 17%, 0.5% and 18%, 0.5% and 19%, 0.5% and 20%, 0.5% and 25%, 0.5% and 30%, 0.5% and 35%, 0.5% and 40%, 1% and 2%, 1% and 3%, 1% and 4%, 1% and 5%, 1% and 6%, 1% and 7%, 1% and 8%, 1% and 9%, 1% and 10%, 1% and 11%, 1% and 12%, 1% and 13%, 1% and 14%, 1% and 15%, 1% and 16%, 1% and 17%, 1% and 18%, 1% and 19%, 1% and 20%, 1% and 25%, 1% and 30%, 1% and 35%, 1% and 40%, 2% and 3%, 2% and 4%, 2% and 5%, 2% and 6%, 2% and 7%, 2% and 8%, 2% and 9%, 2% and 10%, 2% and 11%, 2% and 12%, 2% and 13%, 2% and 14%, 2% and 15%, 2% and 16%, 2% and 17%, 2% and 18%, 2% and 19%, 2% and 20%, 2% and 25%, 2% and 30%, 2% and 35%, 2% and 40%, 3% and 4%, 3% and 5%, 3% and 6%, 3% and 7%, 3% and 8%, 3% and 9%, 3% and 10%, 3% and 11%, 3% and 12%, 3% and 13%, 3% and 14%, 3% and 15%, 3% and 16%, 3% and 17%, 3% and 18%, 3% and 19%, 3% and 20%, 3% and 25%, 3% and 30%, 3% and 35%, 3% and 40%, 4% and 5%, 4% and 6%, 4% and 7%, 4% and 8%, 4% and 9%, 4% and 10%, 4% and 11%, 4% and 12%, 4% and 13%, 4% and 14%, 4% and 15%, 4% and 16%, 4% and 17%, 4% and 18%, 4% and 19%, 4% and 20%, 4% and 25%, 4% and 30%, 4% and 35%, 4% and 40%, 5% and 6%, 5% and 7%, 5% and 8%, 5% and 9%, 5% and 10%, 5% and 11%, 5% and 12%, 5% and 13%, 5% and 14%, 5% and 15%, 5% and 16%, 5% and 17%, 5% and 18%, 5% and 19%, 5% and 20%, 5% and 25%, 5% and 30%, 5% and 35%, 5% and 40%, 6% and 7%, 6% and 8%, 6% and 9%, 6% and 10%, 6% and 11%, 6% and 12%, 6% and 13%, 6% and 14%, 6% and 15%, 6% and 16%, 6% and 17%, 6% and 18%, 6% and 19%, 6% and 20%, 6% and 25%, 6% and 30%, 6% and 35%, 6% and 40%, 7% and 8%, 7% and 9%, 7% and 10%, 7% and 11%, 7% and 12%, 7% and 13%, 7% and 14%, 7% and 15%, 7% and 16%, 7% and 17%, 7% and 18%, 7% and 19%, 7% and 20%, 7% and 25%, 7% and 30%, 7% and 35%, 7% and 40%, 8% and 9%, 8% and 10%, 8% and 11%, 8% and 12%, 8% and 13%, 8% and 14%, 8% and 15%, 8% and 16%, 8% and 17%, 8% and 18%, 8% and 19%, 8% and 20%, 8% and 25%, 8% and 30%, 8% and 35%, 8% and 40%, 9% and 10%, 9% and 11%, 9% and 12%, 9% and 13%, 9% and 14%, 9% and 15%, 9% and 16%, 9% and 17%, 9% and 18%, 9% and 19%, 9% and 20%, 9% and 25%, 9% and 30%, 9% and 35%, 9% and 40%, 10% and 11%, 10% and 12%, 10% and 13%, 10% and 14%, 10% and 15%, 10% and 16%, 10% and 17%, 10% and 18%, 10% and 19%, 10% and 20%, 10% and 25%, 10% and 30%, 10% and 35%, 10% and 40%, 11% and 12%, 11% and 13%, 11% and 14%, 11% and 15%, 11% and 16%, 11% and 17%, 11% and 18%, 11% and 19%, 11% and 20%, 11% and 25%, 11% and 30%, 11% and 35%, 11% and 40%, 12% and 13%, 12% and 14%, 12% and 15%, 12% and 16%, 12% and 17%, 12% and 18%, 12% and 19%, 12% and 20%, 12% and 25%, 12% and 30%, 12% and 35%, 12% and 40%, 13% and 14%, 13% and 15%, 13% and 16%, 13% and 17%, 13% and 18%, 13% and 19%, 13% and 20%, 13% and 25%, 13% and 30%, 13% and 35%, 13% and 40%, 14% and 15%, 14% and 16%, 14% and 17%, 14% and 18%, 14% and 19%, 14% and 20%, 14% and 25%, 14% and 30%, 14% and 35%, 14% and 40%, 15% and 16%, 15% and 17%, 15% and 18%, 15% and 19%, 15% and 20%, 15% and 25%, 15% and 30%, 15% and 35%, 15% and 40%, 16% and 17%, 16% and 18%, 16% and 19%, 16% and 20%, 16% and 25%, 16% and 30%, 16% and 35%, 16% and 40%, 17% and 18%, 17% and 19%, 17% and 20%, 17% and 25%, 17% and 30%, 17% and 35%, 17% and 40%, 18% and 19%, 18% and 20%, 18% and 25%, 18% and 30%, 18% and 35%, 18% and 40%, 19% and 20%, 19% and 25%, 19% and 30%, 19% and 35%, 19% and 40%, 20% and 25%, 20% and 30%, 20% and 35%, 20% and 40%, 25% and 30%, 25% and 35%, 25% and 40%, 30% and 35%, 30% and 40%, or 35% and 40%. The carbon-based material may be present in the electrode at a concentration (e.g., by weight on a dry basis, without solvent) of greater than or equal to about 0.01%, 0.05%, 0.1%, 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, 20%, 21%, 22%, 23%, 24%, 25%, 26%, 27%, 28%, 29%, 30%, 31%, 32%, 33%, 34%, 35%, 36%, 37%, 38%, 39%, or 40%. In addition, or as an alternative, the carbon-based material may be present in the electrode at a concentration (e.g., by weight on a dry basis, without solvent) of less than or equal to about 40%, 39%, 38%, 37%, 36%, 35%, 34%, 33%, 32%, 31%, 30%, 29%, 28%, 27%, 26%, 25%, 24%, 23%, 22%, 21%, 20%, 19.5%, 19%, 18.5%, 18%, 17.5%, 17%, 16.5%, 16%, 15.5%, 15%, 14.5%, 14%, 13.5%, 13%, 12.5%, 12%, 11.5%, 11%, 10.5%, 10%, 9.5%, 9%, 8.5%, 8%, 7.5%, 7%, 6.5%, 6%, 5.5%, 5%, 4.5%, 4%, 3.5%, 3%, 2.5%, 2%, 1.5%, 1%, 0.5%, 0.1%, 0.05%, or 0.01%. The carbon-based material may be present in the electrode at such concentrations in combination with one or more other materials (e.g., one or more other electrode materials and concentrations thereof described herein).

In certain embodiments, the carbon-based material of the present disclosure (e.g., PCS) may be present in an electrode (e.g., an electrode of a supercapacitor) at a concentration (e.g., by weight) of greater than or equal to about 0.01%, 0.05%, 0.1%, 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, 20%, 25%, 30%, 35%, 40%, 45%, 50%, 60%, 65%, 70%, 75%, 80%, 85%, 90%, or 95%.

Methods of Forming Energy Storage Devices

An energy storage device of the present disclosure may comprise electrodes, separator(s), electrolyte, and packaging. Such components may be fabricated and assembled in different ways. In certain embodiments, individual components may be fabricated and later assembled. In some embodiments, the components may be assembled through winding or rolling (e.g., see FIG. 9 and FIG. 20). For example, a method of making a battery cell may comprise providing a first sheet of a separator, placing a positive electrode sheet (e.g., comprising a carbon-based material of the present disclosure) on the first sheet of separator, placing a second sheet of the separator on the positive electrode sheet, placing a negative electrode sheet (e.g., comprising graphite) on the second sheet of the separator, and rolling the sheets to form the battery cell (a rolled cell). In some embodiments, the components may be assembled through stacking (e.g., see FIG. 18 and FIG. 19).

Figure 2:
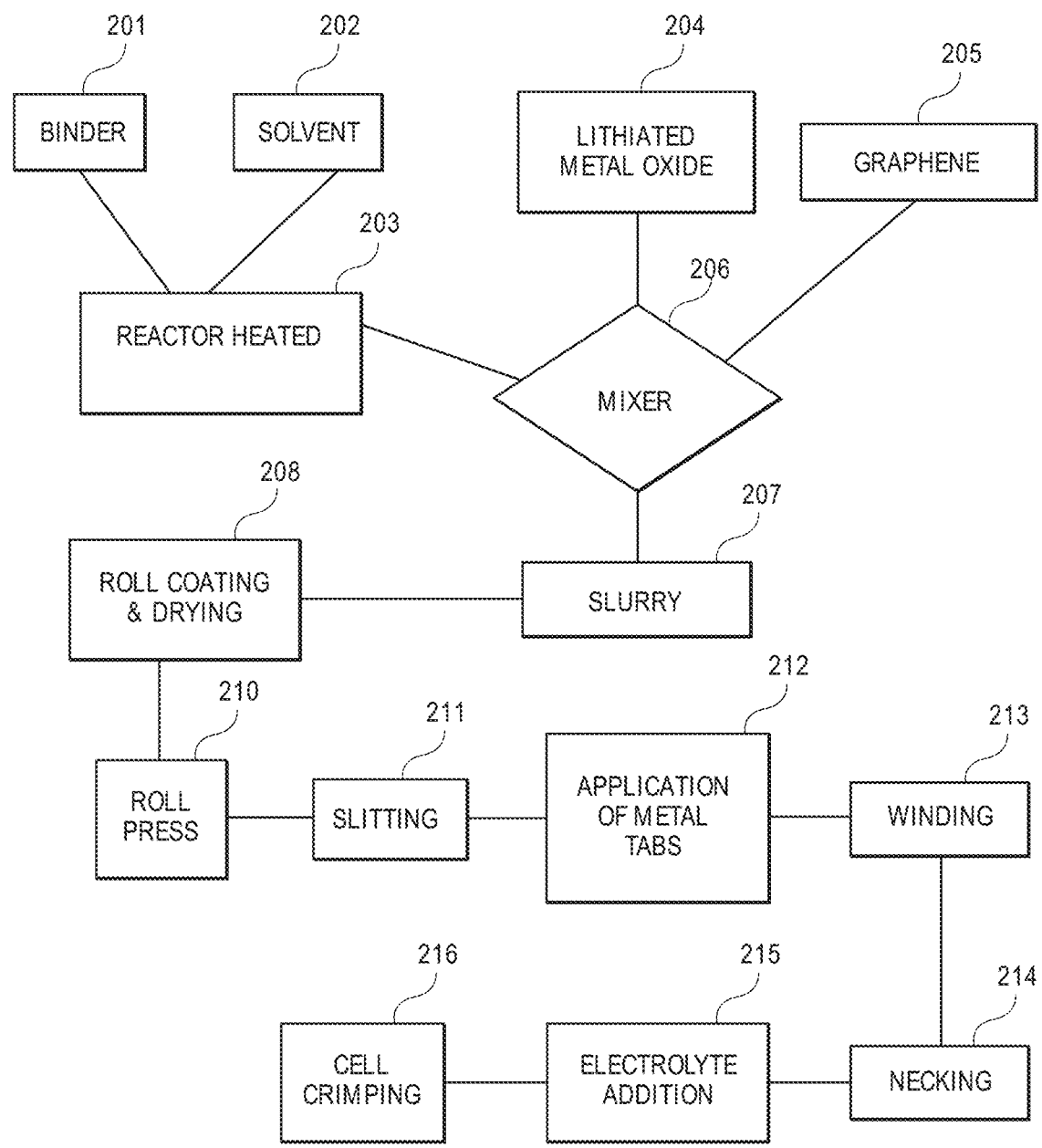
FIG. 2 schematically illustrates an example of a fabrication process for manufacturing a battery comprising a carbon-based material in accordance with the present disclosure.

FIG. 2 schematically illustrates an example of a process of getting a formula and processing of a battery comprising a carbon-based material of the present disclosure. The formula may include at least a portion of an electrode mixture (e.g., a cathode mixture). In certain embodiments, a formula may include all components of an electrode mixture (e.g., the whole cathode mixture). In certain embodiments, the formula may be or may form a slurry. The process may include providing a binder 201 and a solvent 202. The binder 201 and the solvent 202 may be combined in a reactor 203. The reactor 203 may be heated to a given temperature (e.g., at least about 90° C.). The process may include providing a lithiated metal compound (e.g., lithiated metal oxide or phosphate) 204 and the carbon-based material (e.g., PCS) 205. A mixer 206 may receive at least a portion of the material from the reactor 203 (e.g., heated binder and heated solvent), the lithiated metal compound (e.g., lithiated metal oxide or phosphate) 204 and the carbon-based material (e.g., PCS) 205. The mixer 206 may output a slurry 207 (e.g., comprising a mixture of the components in the mixer). The slurry 207 may be processed through roll coating and drying 208, followed by a roll press 210. Then, the process may comprise slitting 211 and application of metal tabs 212. The process may further comprise winding 213, followed by necking 214. The process may further include electrolyte addition 215. Finally, the process may include cell crimping 216.

Alternatively, in some embodiments, at least a portion of the binder 201, solvent 202, lithiated metal compound 204, carbon-based material 205, and/or any other electrode components may be otherwise combined. For example, these components or a subset thereof may all be provided directly to the mixer 206 (e.g., which may be heated).

Figure 25:
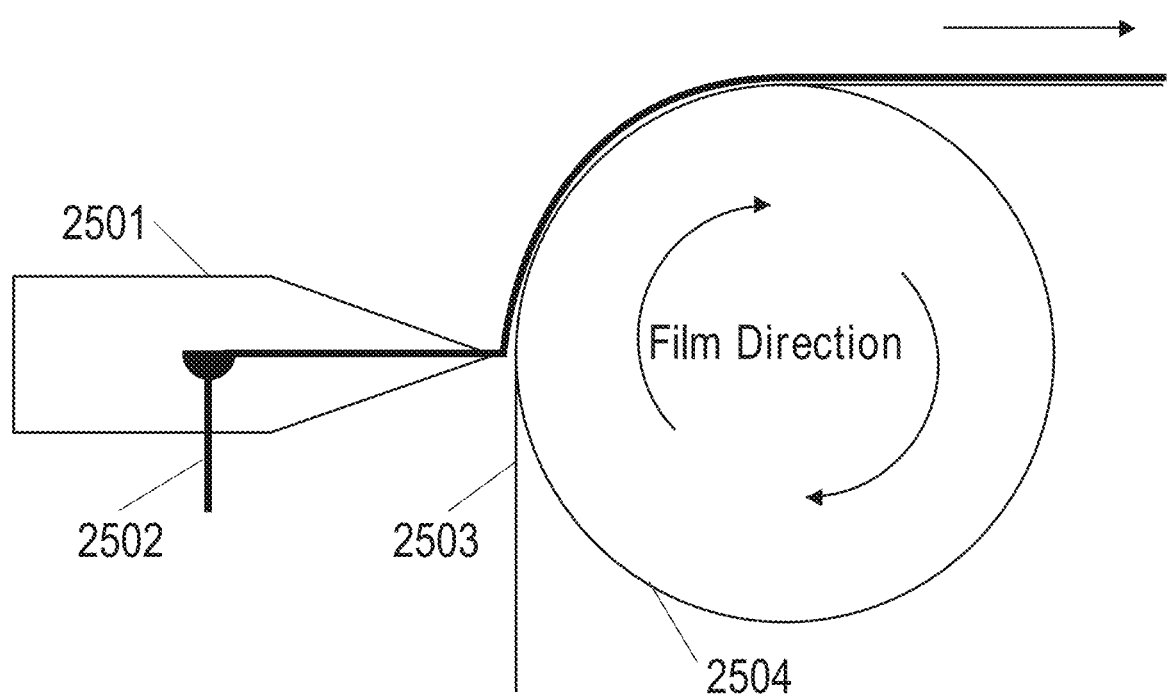
FIG. 25 shows an exemplary method for coating a film with slurry.

FIG. 25 illustratively depicts an exemplary apparatus for roll coating, wherein a slot die 2501 deposits a slurry 2502 on a film 2503, as the film 2503 passes over a roller 2504.

Figure 3:
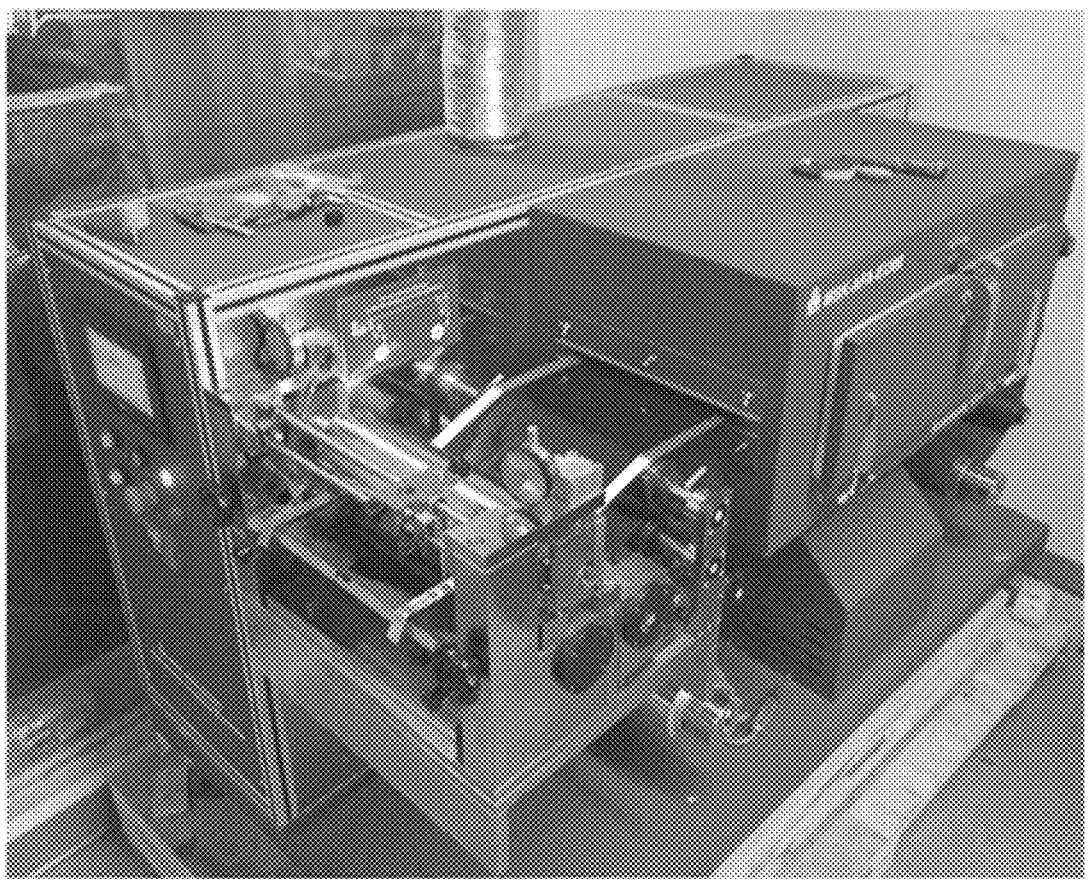
FIG. 3 shows an example of coating of a slurry using large scale roll-to-roll processing.

FIGS. 3-7 show examples of processing of battery electrode(s). Such processing may include one or more process (ing) steps (e.g., step 208 in FIG. 2). The process(ing) may include coating of a substrate with a slurry (e.g., a slurry comprising the carbon-based material, for example, PCS) using large scale roll-to-roll processing as shown in FIG. 3. The substrate (e.g., if conductive) may serve as an electrode current collector. In some embodiments, the process(ing) may include using an aluminum foil as a substrate. The aluminum foil may form a current collector.

In some embodiments, the active material is present in the slurry at a concentration of about 20% to about 75%. In some embodiments, the active material is present in the slurry at a concentration of at least about 20%. In some embodiments, the active material is present in the slurry at a concentration of at most about 75%. In some embodiments, the active material is present in the slurry at a concentration of about 20% to about 25%, about 20% to about 30%, about 20% to about 35%, about 20% to about 40%, about 20% to about 45%, about 20% to about 50%, about 20% to about 55%, about 20% to about 60%, about 20% to about 65%, about 20% to about 70%, about 20% to about 75%, about 25% to about 30%, about 25% to about 35%, about 25% to about 40%, about 25% to about 45%, about 25% to about 50%, about 25% to about 55%, about 25% to about 60%, about 25% to about 65%, about 25% to about 70%, about 25% to about 75%, about 30% to about 35%, about 30% to about 40%, about 30% to about 45%, about 30% to about 50%, about 30% to about 55%, about 30% to about 60%, about 30% to about 65%, about 30% to about 70%, about 30% to about 75%, about 35% to about 40%, about 35% to about 45%, about 35% to about 50%, about 35% to about 55%, about 35% to about 60%, about 35% to about 65%, about 35% to about 70%, about 35% to about 75%, about 40% to about 45%, about 40% to about 50%, about 40% to about 55%, about 40% to about 60%, about 40% to about 65%, about 40% to about 70%, about 40% to about 75%, about 45% to about 50%, about 45% to about 55%, about 45% to about 60%, about 45% to about 65%, about 45% to about 70%, about 45% to about 75%, about 50% to about 55%, about 50% to about 60%, about 50% to about 65%, about 50% to about 70%, about 50% to about 75%, about 55% to about 60%, about 55% to about 65%, about 55% to about 70%, about 55% to about 75%, about 60% to about 65%, about 60% to about 70%, about 60% to about 75%, about 65% to about 70%, about 65% to about 75%, or about 70% to about 75%. In some embodiments, the active material is present in the slurry at a concentration of about 20%, about 25%, about 30%, about 35%, about 40%, about 45%, about 50%, about 55%, about 60%, about 65%, about 70%, or about 75%.

In some embodiments, the binder is present in the slurry at a concentration of about 0.2% to about 10%. In some embodiments, the binder is present in the slurry at a concentration of at least about 0.2%. In some embodiments, the binder is present in the slurry at a concentration of at most about 10%. In some embodiments, the binder is present in the slurry at a concentration of about 0.2% to about 0.5%, about 0.2% to about 0.75%, about 0.2% to about 1%, about 0.2% to about 2%, about 0.2% to about 3%, about 0.2% to about 4%, about 0.2% to about 5%, about 0.2% to about 6%, about 0.2% to about 7%, about 0.2% to about 8%, about 0.2% to about 10%, about 0.5% to about 0.75%, about 0.5% to about 1%, about 0.5% to about 2%, about 0.5% to about 3%, about 0.5% to about 4%, about 0.5% to about 5%, about 0.5% to about 6%, about 0.5% to about 7%, about 0.5% to about 8%, about 0.5% to about 10%, about 0.75% to about 1%, about 0.75% to about 2%, about 0.75% to about 3%, about 0.75% to about 4%, about 0.75% to about 5%, about 0.75% to about 6%, about 0.75% to about 7%, about 0.75% to about 8%, about 0.75% to about 10%, about 1% to about 2%, about 1% to about 3%, about 1% to about 4%, about 1% to about 5%, about 1% to about 6%, about 1% to about 7%, about 1% to about 8%, about 1% to about 10%, about 2% to about 3%, about 2% to about 4%, about 2% to about 5%, about 2% to about 6%, about 2% to about 7%, about 2% to about 8%, about 2% to about 10%, about 3% to about 4%, about 3% to about 5%, about 3% to about 6%, about 3% to about 7%, about 3% to about 8%, about 3% to about 10%, about 4% to about 5%, about 4% to about 6%, about 4% to about 7%, about 4% to about 8%, about 4% to about 10%, about 5% to about 6%, about 5% to about 7%, about 5% to about 8%, about 5% to about 10%, about 6% to about 7%, about 6% to about 8%, about 6% to about 10%, about 7% to about 8%, about 7% to about 10%, or about 8% to about 10%. In some embodiments, the binder is present in the slurry at a concentration of about 0.2%, about 0.5%, about 0.75%, about 1%, about 2%, about 3%, about 4%, about 5%, about 6%, about 7%, about 8%, or about 10%.

In some embodiments, the solvent is present in the slurry at a concentration of about 5% to about 80%. In some embodiments, the solvent is present in the slurry at a concentration of at least about 5%. In some embodiments, the solvent is present in the slurry at a concentration of at most about 80%. In some embodiments, the solvent is present in the slurry at a concentration of about 5% to about 10%, about 5% to about 15%, about 5% to about 20%, about 5% to about 25%, about 5% to about 30%, about 5% to about 35%, about 5% to about 40%, about 5% to about 50%, about 5% to about 60%, about 5% to about 70%, about 5% to about 80%, about 10% to about 15%, about 10% to about 20%, about 10% to about 25%, about 10% to about 30%, about 10% to about 35%, about 10% to about 40%, about 10% to about 50%, about 10% to about 60%, about 10% to about 70%, about 10% to about 80%, about 15% to about 20%, about 15% to about 25%, about 15% to about 30%, about 15% to about 35%, about 15% to about 40%, about 15% to about 50%, about 15% to about 60%, about 15% to about 70%, about 15% to about 80%, about 20% to about 25%, about 20% to about 30%, about 20% to about 35%, about 20% to about 40%, about 20% to about 50%, about 20% to about 60%, about 20% to about 70%, about 20% to about 80%, about 25% to about 30%, about 25% to about 35%, about 25% to about 40%, about 25% to about 50%, about 25% to about 60%, about 25% to about 70%, about 25% to about 80%, about 30% to about 35%, about 30% to about 40%, about 30% to about 50%, about 30% to about 60%, about 30% to about 70%, about 30% to about 80%, about 35% to about 40%, about 35% to about 50%, about 35% to about 60%, about 35% to about 70%, about 35% to about 80%, about 40% to about 50%, about 40% to about 60%, about 40% to about 70%, about 40% to about 80%, about 50% to about 60%, about 50% to about 70%, about 50% to about 80%, about 60% to about 70%, about 60% to about 80%, or about 70% to about 80%. In some embodiments, the solvent is present in the slurry at a concentration of about 5%, about 10%, about 15%, about 20%, about 25%, about 30%, about 35%, about 40%, about 50%, about 60%, about 70%, or about 80%.

Figure 4:
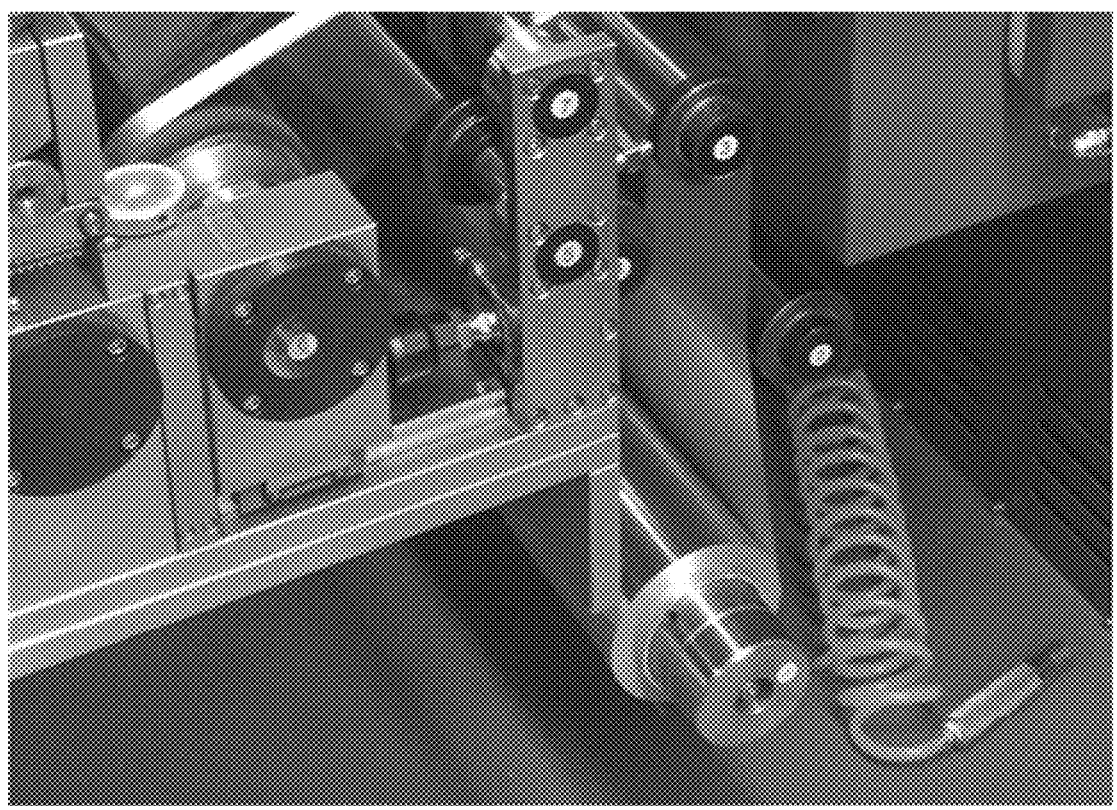
FIG. 4 shows an example of a process in which an aluminum foil is used as a substrate and the process starts with unwinding the aluminum foil for coating a slurry.
Figure 5:
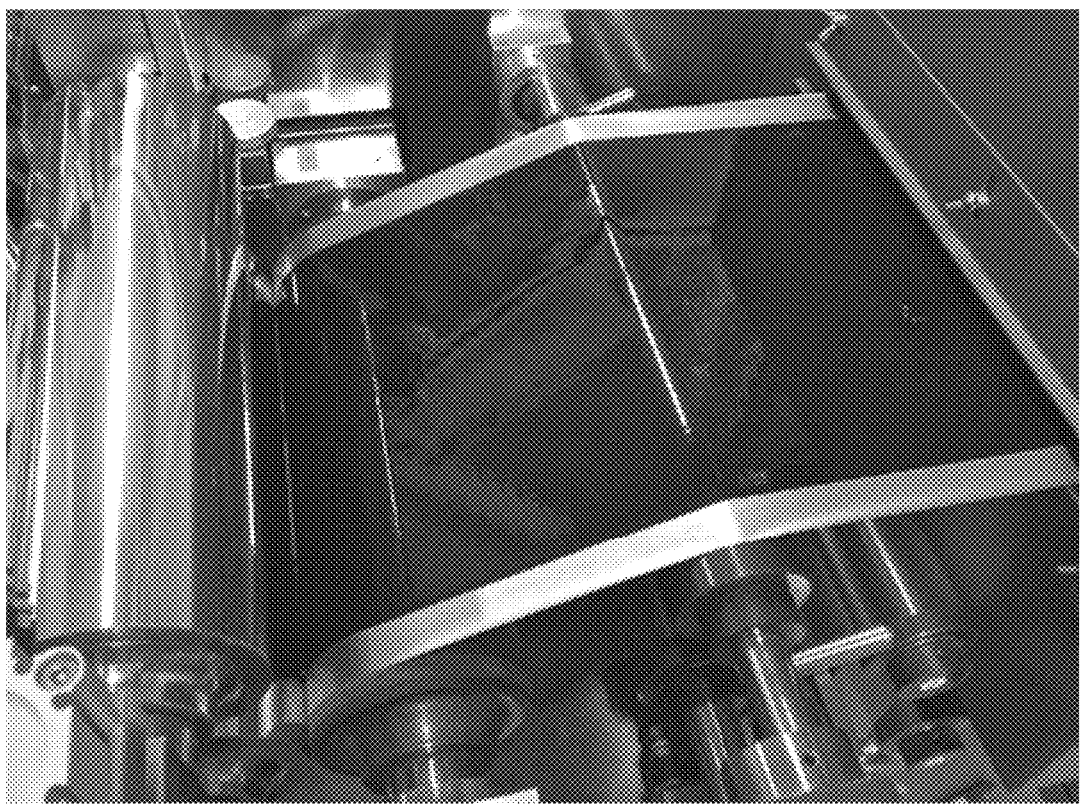
FIG. 5 shows an example of a close-up view of a slurry as it is being coated onto an aluminum foil/current collector (slurry is black).
Figure 6:
FIG. 6 shows an example of an electrode/coated film after drying at 120° C. using an in-line heating oven.
Figure 7:
FIG. 7 shows an example of rewinding an aluminum foil after it has been coated.

The process(ing) may start with un-winding an aluminum foil for coating a slurry (e.g., of a formula) as shown in FIG. 4. FIG. 5 shows an example of a close-up view of a slurry as it is being coated onto an aluminum foil (slurry is black in color). The coated slurry may form a film. The process (ing) may include drying of the coated film. FIG. 6 shows an example of a coated film (e.g., a film comprising a carbon-based material, for example, PCS) of an electrode after drying at 120° C. using an in-line heating oven. The process (ing) may include rewinding the aluminum foil after it has been coated. FIG. 7 shows an example of rewinding an aluminum foil after it has been coated with the carbon-based material (e.g., PCS).

Figure 10:
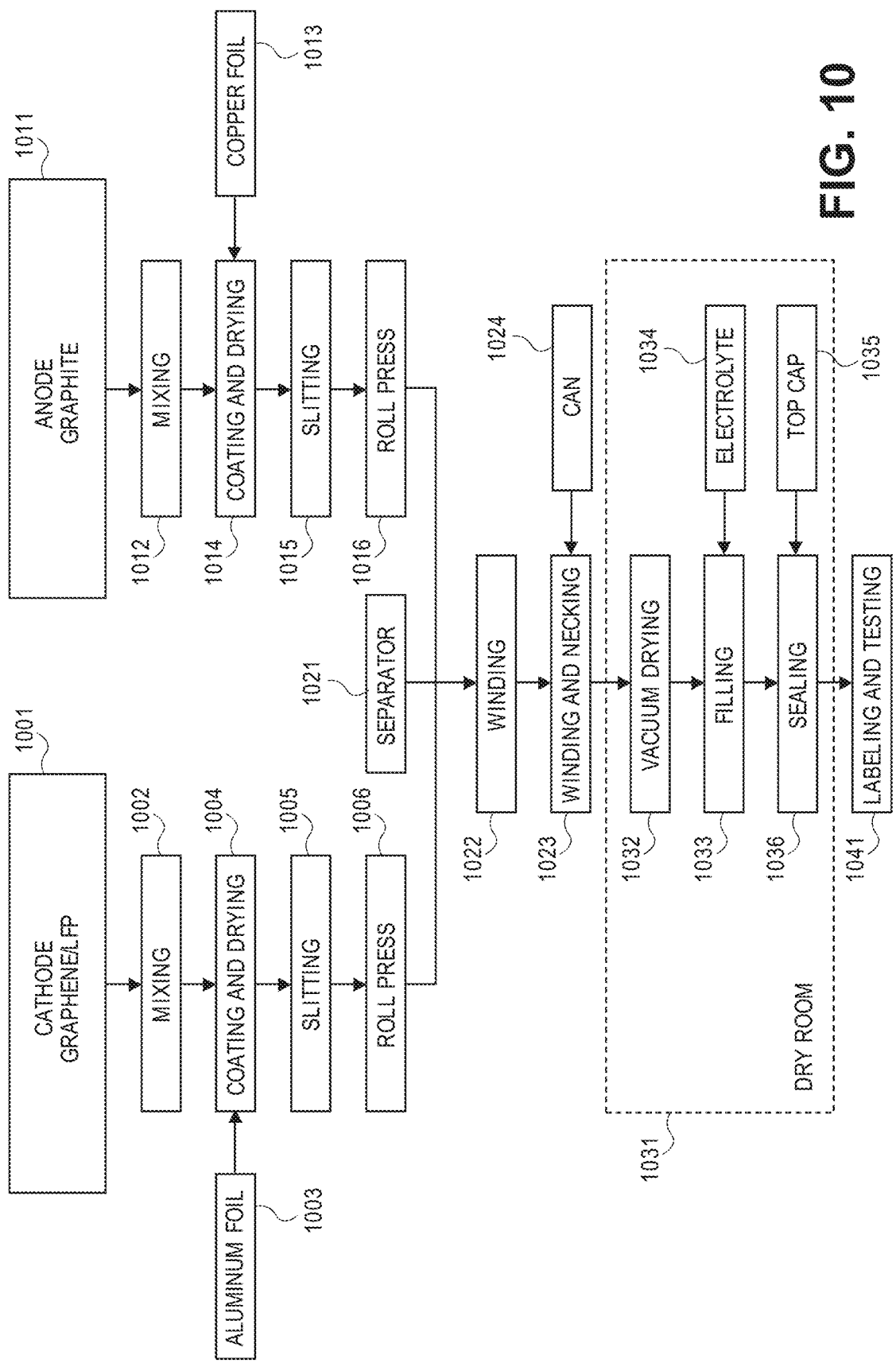
FIG. 10 shows an example of a fabrication process of a cell.

A manufacturing process of a battery (e.g., an LFP-based cell) may be as illustrated in FIG. 10. A positive electrode (cathode during discharge) may be prepared from cathode material 1001 comprising PCS/LFP. Mixing 1002 of the cathode material 1001 may be followed by coating and drying 1004 on an aluminum foil 1003. The coated foil may be processed by slitting 1005 and in a roll press 1006. A negative electrode (anode during discharge) may be prepared from anode material 1011 comprising graphite. Mixing 1012 of the anode material 1011 may be followed by coating and drying 1014 on a copper foil 1013. The coated foil may be processed by slitting 1015 and in a roll press 1016.

A separator 1021 may then be integrated with (e.g., disposed between) the positive and negative electrodes. Next, the process may include winding 1022 of the positive electrode, negative electrode, and separator. The wound roll may be placed in a can 1024, followed by winding and necking 1023. Next, vacuum drying 1032 may be performed, followed by filling 1033 with an electrolyte 1034. A top can 1035 may be used for sealing 1036. The steps 1032, 1033, and 1036 may be performed in a dry room 1031. In some embodiments, the electrolyte 1034 and the top cap 1035 may be prepared or stored in the dry room environment. Finally, the battery may be sent to labeling and testing 1041.

Figure 14:
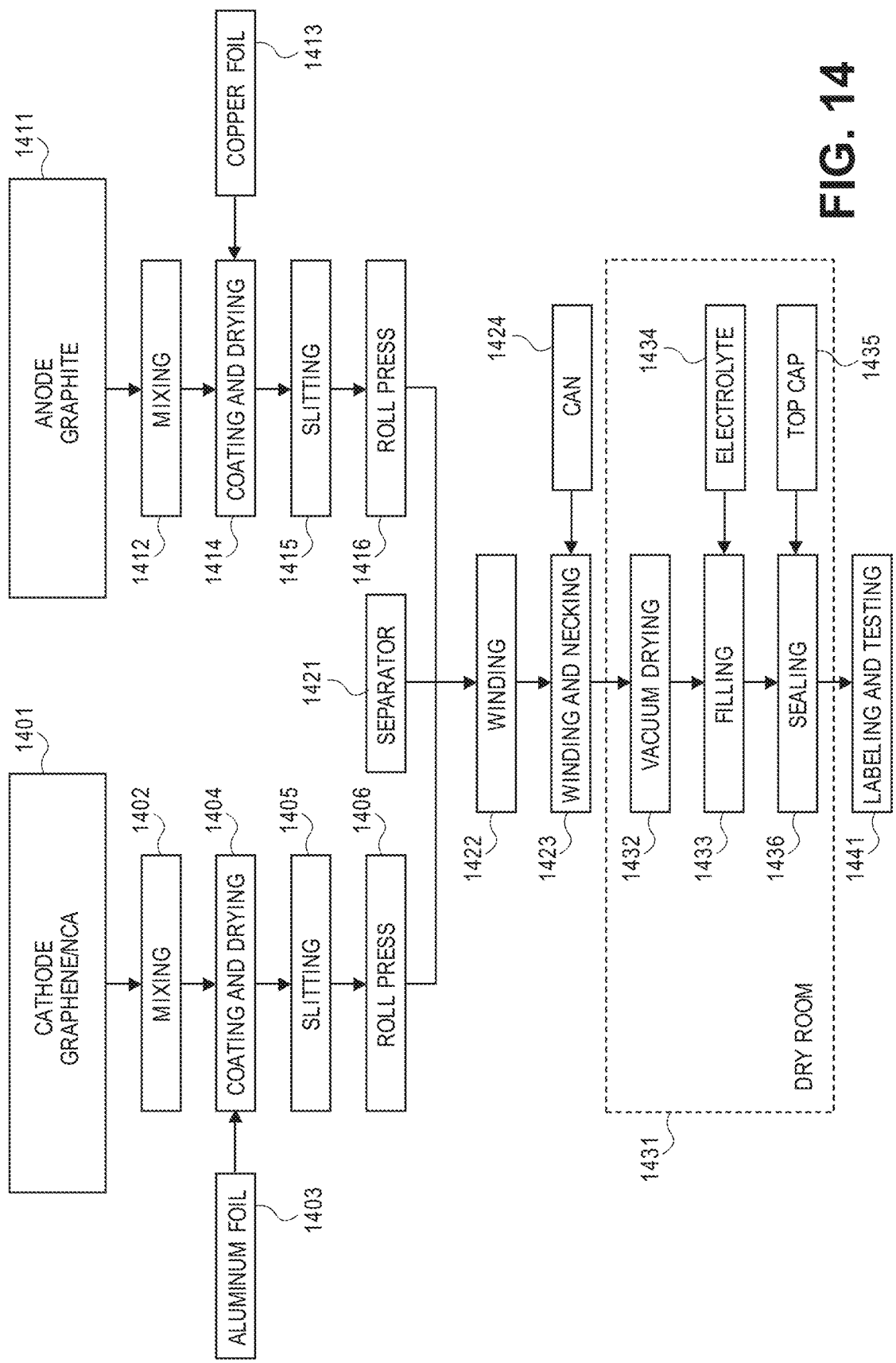
FIG. 14 shows an example of a fabrication process of a cell.

A manufacturing process of a battery (e.g., an NCA-based cell) may be as illustrated in FIG. 14. A positive electrode (cathode during discharge) may be prepared from cathode material 1401 comprising PCS/NCA. Mixing 1402 of the positive electrode material may be followed by coating and drying 1404 on an aluminum foil 1403. The coated foil may be processed by slitting 1405 and in a roll press 1406. A negative electrode (anode during discharge) may be prepared from anode material 1411 comprising graphite. Mixing 1412 of the anode material 1411 may be followed by coating and drying 1414 on a copper foil 1413. The coated foil may be processed by slitting 1415 and in a roll press 1416.

A separator 1421 may then be integrated with (e.g., disposed between) the positive and negative electrodes. Next, the process may include winding 1422 of the positive electrode, negative electrode, and separator. The wound roll may be placed in a can 1424, followed by winding and necking 1423. Next, vacuum drying 1432 may be performed, followed by filling 1433 with an electrolyte 1434. A top can 1435 may be used for sealing 1436. The steps 1432, 1433, and 1436 may be performed in a dry room 1431. In some embodiments, the electrolyte 1434 and the top cap 1435 may be prepared or stored in the dry room environment. Finally, the battery may be sent to labeling and testing 1441.

Figure 18:
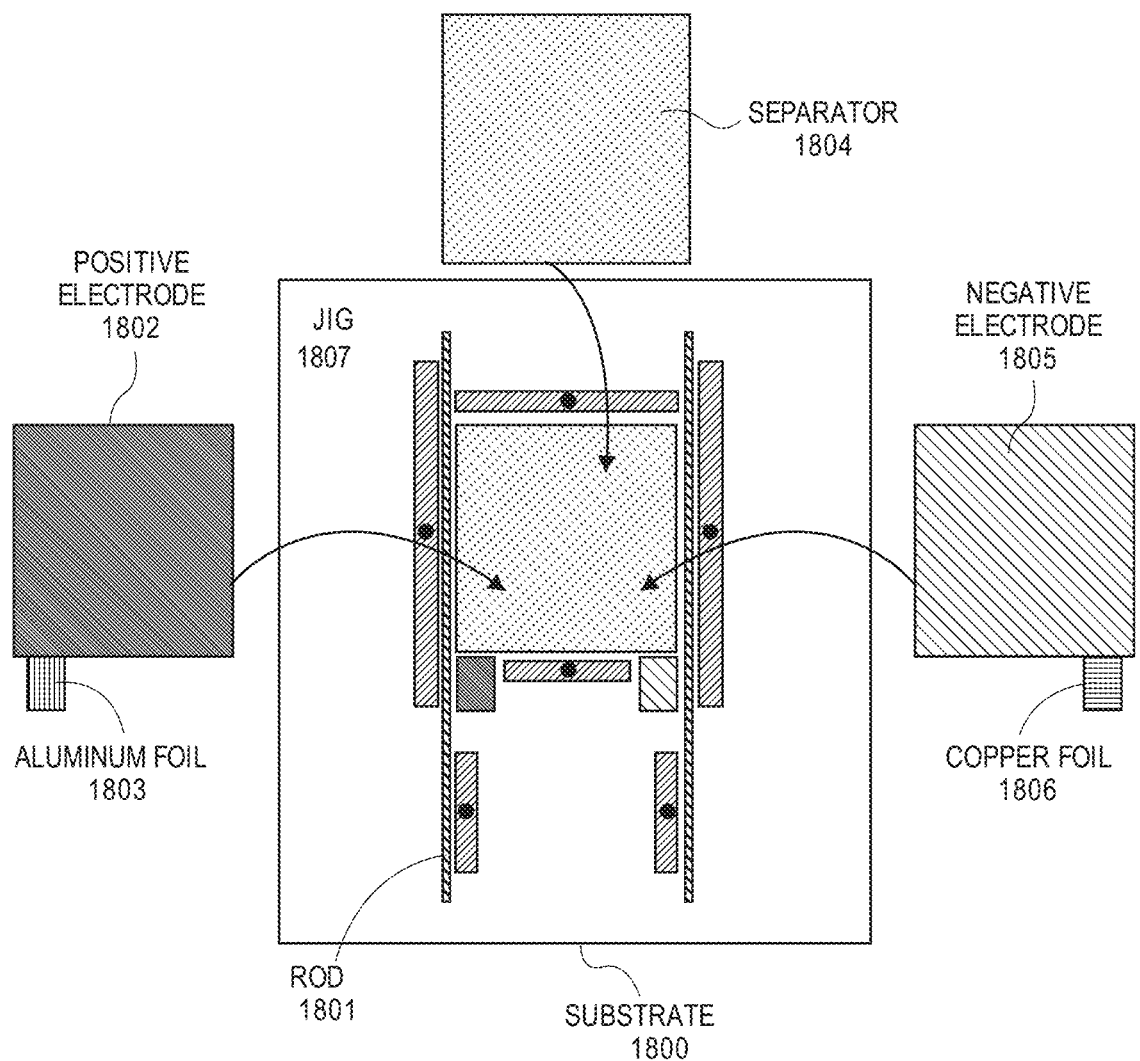
FIG. 18 is a bird's eye view of an example of an assembly process of a cell.
Figure 19:
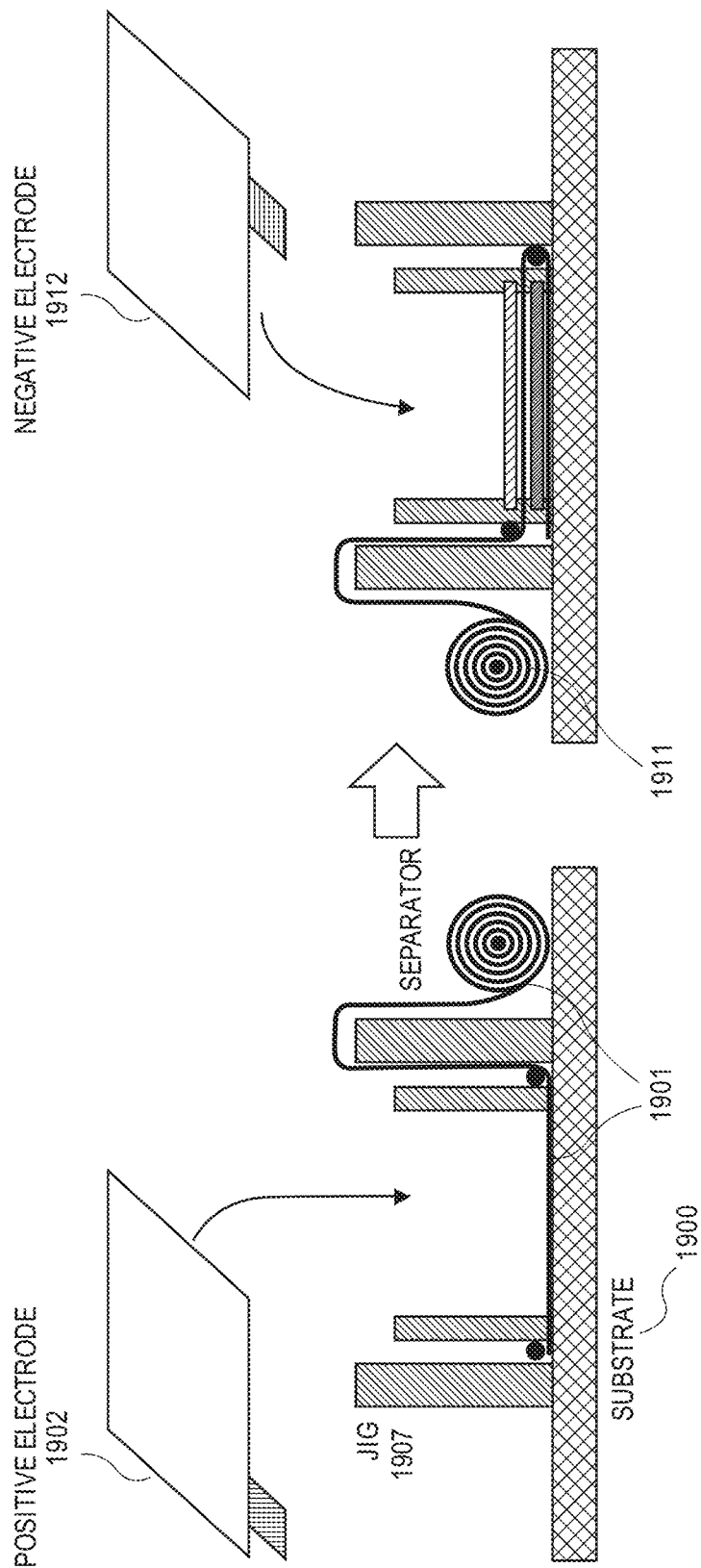
FIG. 19 is a cross-sectional view of an example of an assembly process of a cell.
Figure 20:
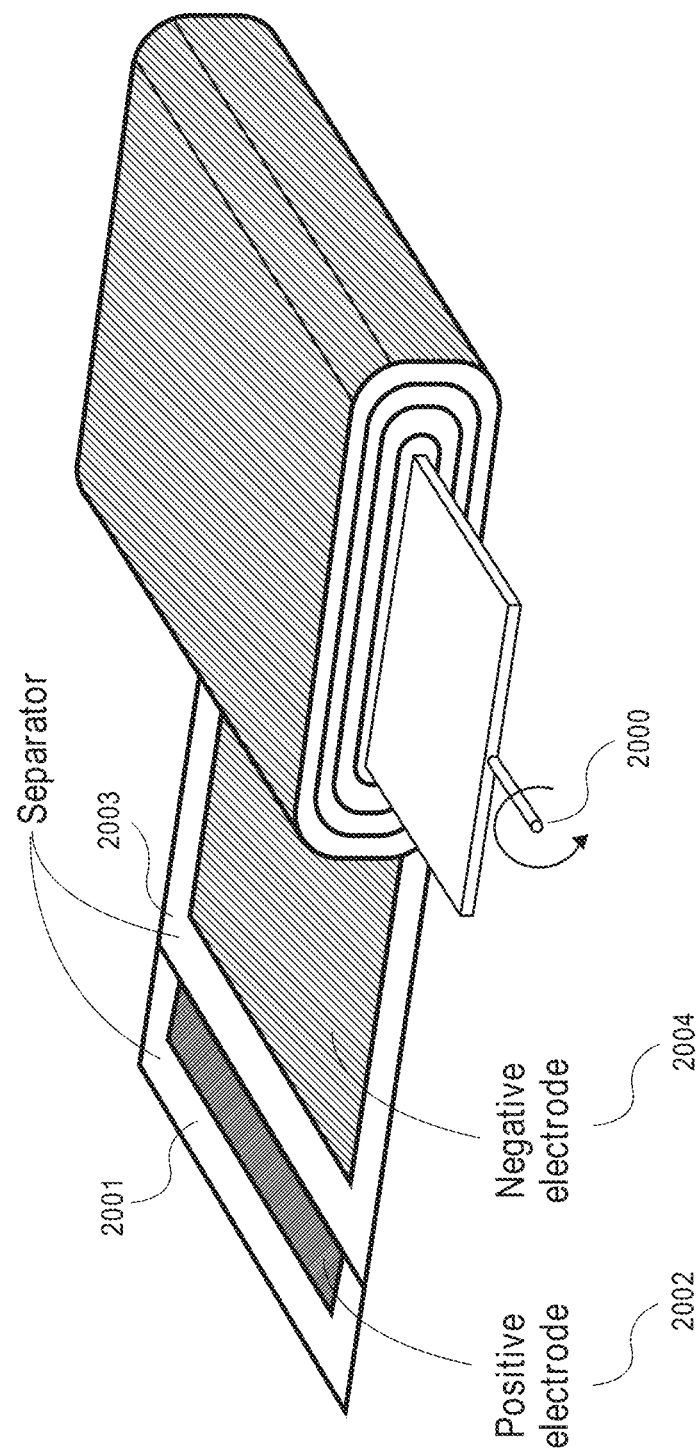
FIG. 20 shows an example of an assembly process of a cell.

In some embodiments, an assembly process of a battery (e.g., an NMC-based cell) may be as illustrated in FIGS. 18-20. The process may include stacking (FIGS. 18-19), and/or winding or rolling (FIG. 20). For example, the battery may be assembled through stacking or winding.

FIG. 18 is a bird's eye view of stacking of a cell (e.g., an NMC-based cell). Assembly may be performed on a jig 1807. The assembly may be performed on a substrate 1800 (e.g., a wooden substrate). A metal rod 1801 may confine the assembly of a positive electrode 1802 with an aluminum foil current collector 1803, a separator 1804, and negative electrode 1805 with a copper foil current collector 1806. The positive electrode 1802 and aluminum foil current collector 1803 may be formed (at least in part) as described elsewhere herein (e.g., in relation to FIGS. 2-7, FIG. 10 and FIG. 14). The negative electrode 1805 and copper foil current collector 1806 may be formed (at least in part) as described elsewhere herein (e.g., in relation to FIGS. 2-7, FIG. 10 and FIG. 14).

FIG. 19 is a cross-sectional view of the stacking of a cell (e.g., an NMC-based cell). Assembly may be performed on a jig 1907. Assembly may be performed on a substrate 1900 (e.g., a wooden substrate). A separator 1901 may be laid first, thereby creating a first layer of the separator. The separator may be unwound as shown in FIG. 19 and held in place by the jig. A positive electrode (e.g., positive electrode comprising or coupled to an aluminum foil serving as a positive current collector) 1902 may be placed on top of the first layer of the separator 1901 (left). Next, the separator may be folded over the positive electrode 1902 to create a second layer of the separator, and a negative electrode (e.g., negative electrode comprising or coupled to a copper foil serving as a negative current collector) 1912 may be placed on top of the second layer of the separator 1911 (right). The negative and positive electrodes (e.g., including current collectors) may be formed (at least in part) as described elsewhere herein (e.g., in relation to FIGS. 2-7, FIG. 10, and FIG. 14).

FIG. 20 is an example of the winding of a cell (e.g., an NMC-based cell). Layered sheets including a first sheet of a separator 2001, a positive electrode 2002, a second sheet of the separator 2003, and a negative electrode 2004 may be rotated along an axis 2000 to form the cell. The negative and positive electrodes (e.g., including current collectors) may be formed (at least in part) as described elsewhere herein (e.g., in relation to FIGS. 2-7, FIG. 10 and FIG. 14).

One or more steps of the fabrication process in FIG. 2 and/or one or more of the processing steps in FIGS. 3-7 may be used to produce finished products (batteries) such as shown in FIG. 11, FIG. 15, and FIG. 21.

Performance of Energy Storage Devices

Energy storage devices available in the market may provide around 1000 mAh of charge storage capacity, power density of 500-1500 watts per kilogram (W/kg), and cycling stability of 500 cycles. However, further improvements of these figures are necessary for the wide adoption of this technology, especially for large scale applications such as electric vehicles and grid scale energy storage (e.g., to reduce the price of electric vehicles and contribute to a clean and green environment).

In contrast, the energy storage devices (e.g., batteries) provided herein may in some embodiments provide a capacity (e.g., charge storage capacity) of more than 2200 or 3400 mAh and a power density of around 3000 W/kg and be used for more than 1000 cycles. Such features may be enabled, for example, by outstanding electrical and mechanical properties of the carbon-based materials described herein, extraordinarily high surface area of the carbon-based materials described herein, or a combination thereof. The carbon-based materials described herein may make the energy storage devices (e.g., batteries) lighter, more powerful, more efficient, or any combination thereof.

Figure 12:
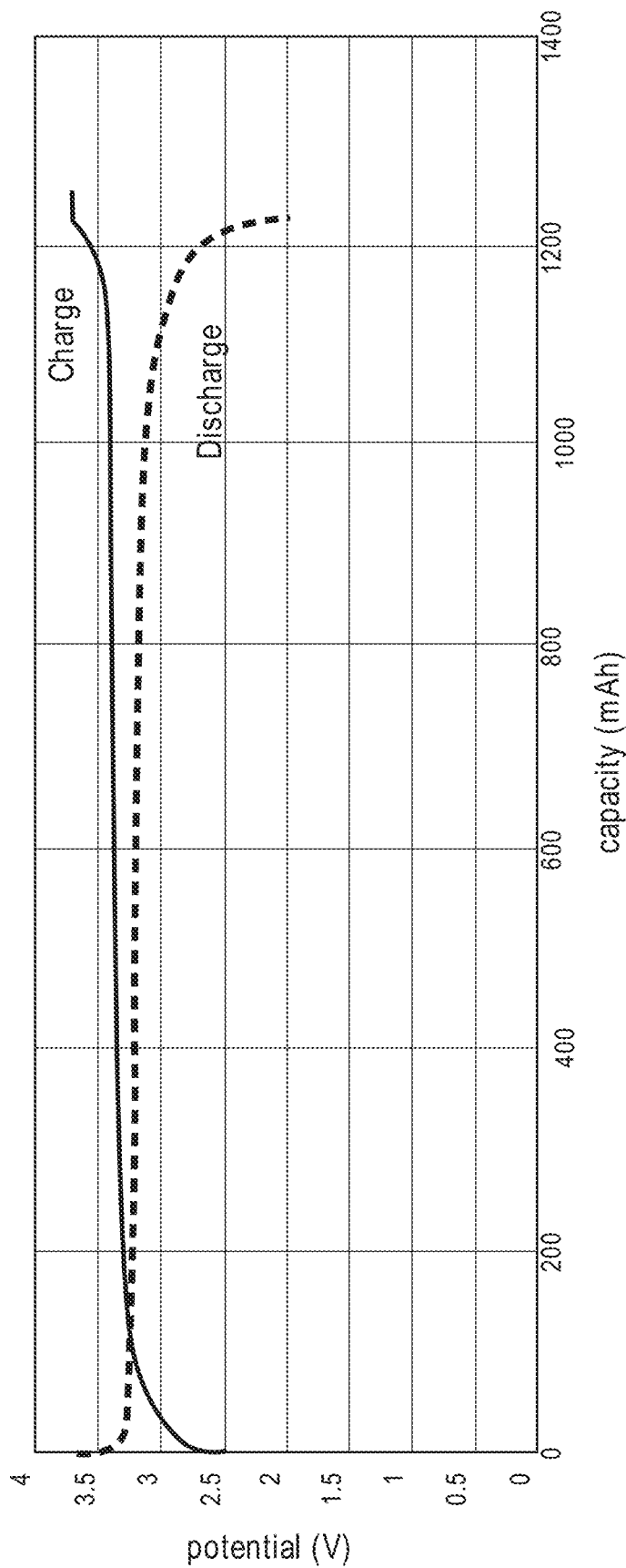
FIG. 12 shows an example of performance of an lithium iron phosphate (LFP)-based cell.
Figure 22:
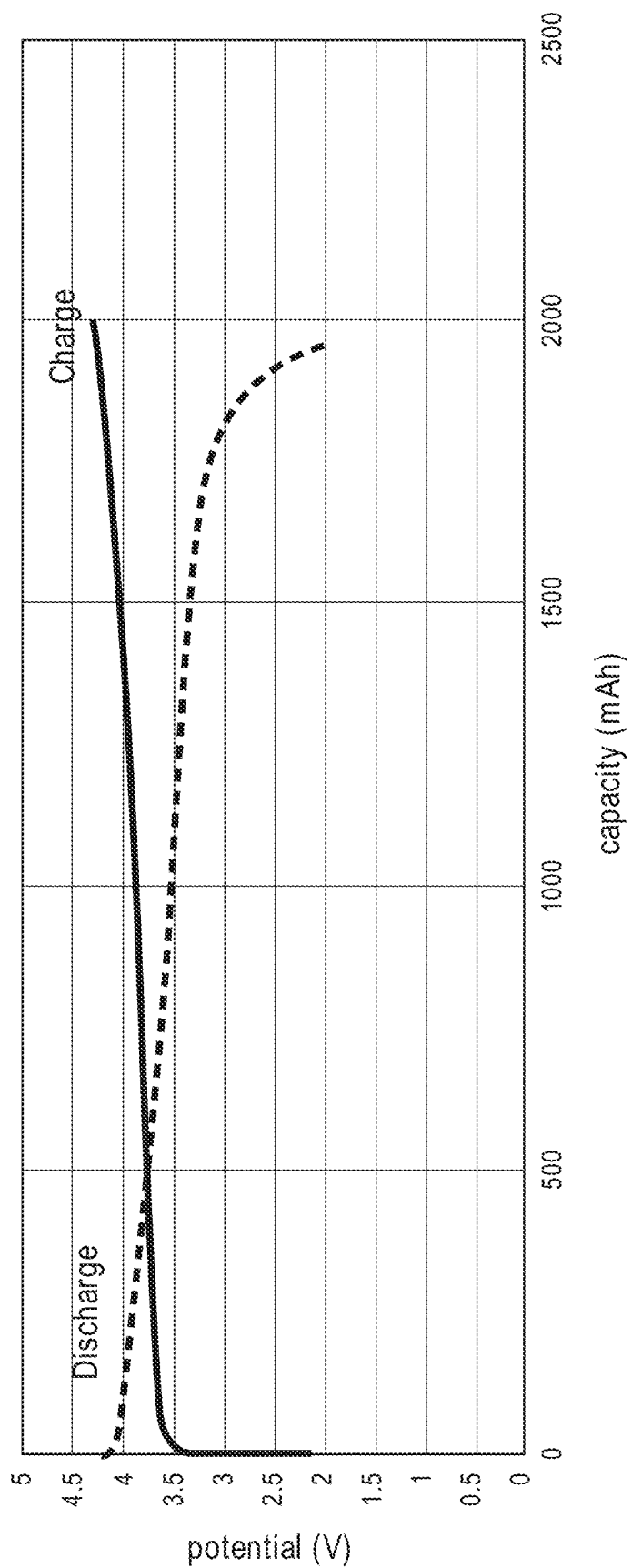
FIG. 22 shows an example of performance of a lithium nickel manganese cobalt oxide (NMC)-based cell.

FIG. 12 shows example performance of an LFP-based battery. FIG. 22 shows example performance of an NMC-based battery.

Figure 26:
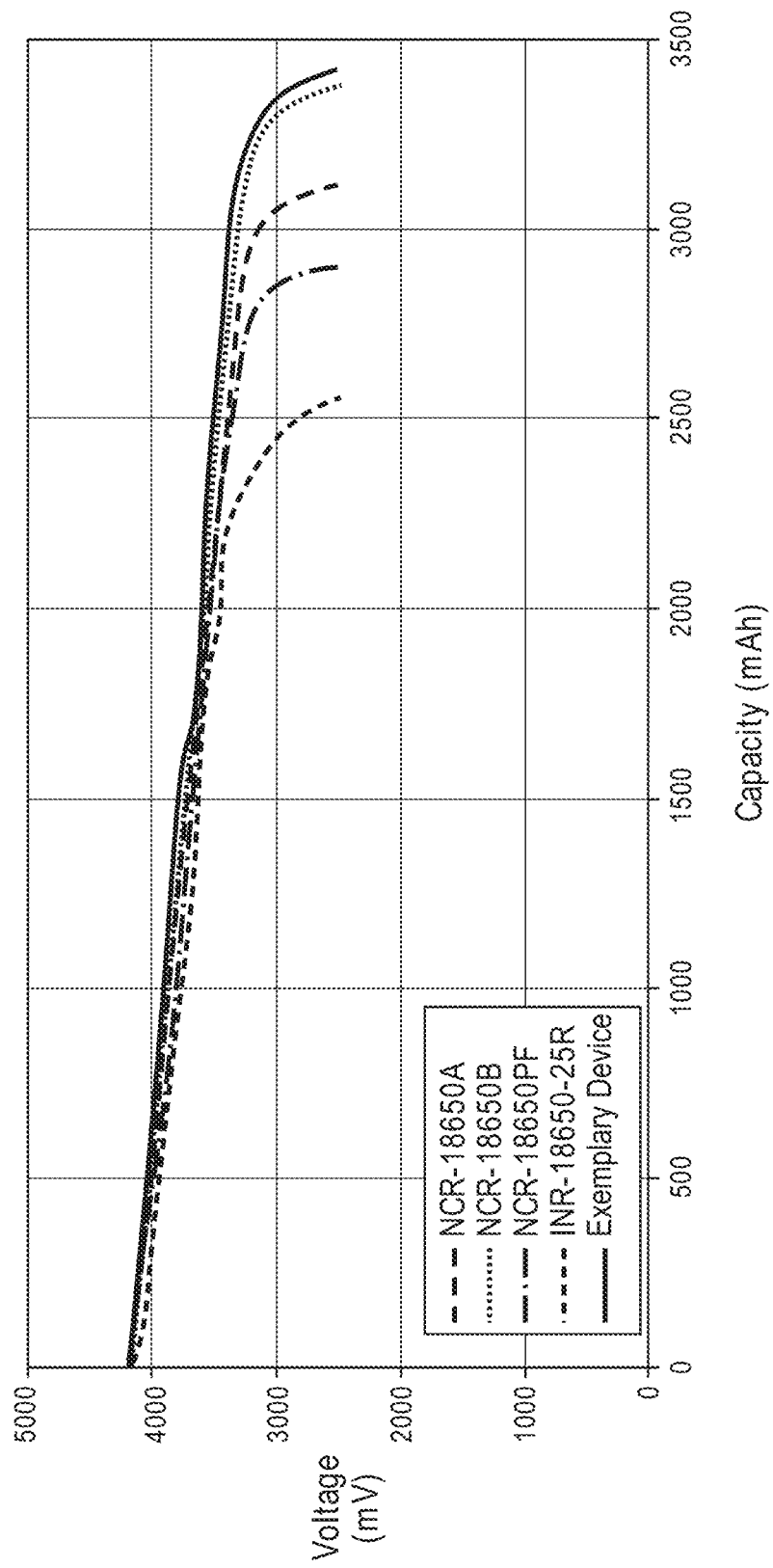
FIG. 26 shows capacity measurements of exemplary energy storage devices.

Per FIG. 26, an energy storage device (e.g., battery or battery cell) of the present disclosure may have a charge storage capacity of at least about 1.5, 2, 2.1, 2.2, 2.3, 2.4, 2.5, 2.6, 2.7, 2.8, 2.9, or 3 times greater than an LIB available in the market (e.g., an LIB with a charge storage capacity of 1000 or 3400 mAh). Exemplary LIB s currently available in the market, per FIG. 26, comprise the NCR-18650A, the NCR-18650B, and the NCR-18650PF LIB s made by Panasonic, as well as the INR-18650-25R LIB made by Samsung. An energy storage device (e.g., battery or battery cell) of the present disclosure may have a power density at least about 1.5, 2, 2.5, 3, 3.5, 4, 4.5, 5, 5.5, 6, 6.5, 7, 7.5, or 8 times greater than an LIB available in the market (e.g., an LIB with a power density of 500-1500 W/kg). An energy storage device (e.g., battery or battery cell) of the present disclosure may have cycling stability or cycle life at least about 1.5, 2, or 2.5 times greater than an LIB available in the market (e.g., an LIB with a cycling stability or cycle life of 500 or 1000 cycles). For example, an energy storage device (e.g., battery or battery cell) of the present disclosure may run electronic device(s) for twice as long and may be used for more than 1000 cycles compared with only 500 cycles for competitive technologies. In some embodiments, a battery of the present disclosure not only may have a much higher capacity than commercial cells but also may provide high power and last longer. An energy storage device (e.g., battery or battery cell) of the present disclosure may have an energy density at least about 1.5, 2, or 2.5 times greater than an LIB available in the market (e.g., an LIB with an energy density of 90-150 watt-hour per kilogram (Wh/kg)). An energy storage device (e.g., battery or battery cell) of the present disclosure may be at least about 2 times more powerful (e.g., at least 2 times greater charge storage capacity, at least 2 times greater power density, and/or at least 2 times greater cycling stability/cycle life) than commercial (e.g., LIB) cells.

An energy storage device (e.g., battery or battery cell) of the present disclosure may have a charge storage capacity of greater than or equal to about 750 mAh, 800 mAh, 850 mAh, 950 mAh, 1000 mAh, 1100 mAh, 1200 mAh, 1300 mAh, 1400 mAh, 1500 mAh, 1600 mAh, 1700 mAh, 1800 mAh, 1900 mAh, 2000 mAh, 2100 mAh, 2200 mAh, 2300 mAh, 2400 mAh, 2500 mAh, 2600 mAh, 2700 mAh, 2800 mAh, 2900 mAh, 3000 mAh, 3100 mAh, 3200 mAh, 3300 mAh, 3400 mAh, 3500 mAh, 3600 mAh, 3700 mAh, 3800 mAh, 3900 mAh, 4000 mAh, 4200 mAh, 4600 mAh, 4800 mAh, 5000 mAh. An energy storage device (e.g., battery or battery cell) of the present disclosure may have a charge storage capacity between about 1000 mAh and 2500 mAh, 1000 mAh and 3000 mAh, 1000 mAh and 3500 mAh, 1000 mAh and 4000 mAh, 1100 mAh and 2500 mAh, 1100 mAh and 3000 mAh, 1100 mAh and 3500 mAh, 1100 mAh and 4000 mAh, 1200 mAh and 2500 mAh, 1200 mAh and 3000 mAh, 1200 mAh and 3500 mAh, 1200 mAh and 4000 mAh, 1300 mAh and 2500 mAh, 1300 mAh and 3000 mAh, 1300 mAh and 3500 mAh, 1300 mAh and 4000 mAh, 1400 mAh and 2500 mAh, 1400 mAh and 3000 mAh, 1400 mAh and 3500 mAh, 1400 mAh and 4000 mAh, 1500 mAh and 2500 mAh, 1500 mAh and 3000 mAh, 1500 mAh and 3500 mAh, 1500 mAh and 4000 mAh, 1600 mAh and 2500 mAh, 1600 mAh and 3000 mAh, 1600 mAh and 3500 mAh, 1600 mAh and 4000 mAh, 1700 mAh and 2500 mAh, 1700 mAh and 3000 mAh, 1700 mAh and 3500 mAh, 1700 mAh and 4000 mAh, 1800 mAh and 2500 mAh, 1800 mAh and 3000 mAh, 1800 mAh and 3500 mAh, 1800 mAh and 4000 mAh, 1900 mAh and 2500 mAh, 1900 mAh and 3000 mAh, 1900 mAh and 3500 mAh, 1900 mAh and 4000 mAh, 2000 mAh and 2500 mAh, 2000 mAh and 3000 mAh, 2000 mAh and 3500 mAh, 2000 mAh and 4000 mAh, 2500 mAh and 3000 mAh, 2500 mAh and 3500 mAh, 2500 mAh and 4000 mAh, 3000 mAh and 3500 mAh, 3000 mAh and 4000 mAh, or 3500 mAh and 4000 mAh. An energy storage device (e.g., battery or battery cell) of the present disclosure may have such charge storage capacities in combination with one or more power densities, energy densities, and/or cycling stabilities/cycle lives described herein. In some embodiments, an energy storage device (e.g., battery or battery cell) of the present disclosure has a storage capacity of about 800 mAh to about 4,000 mAh. In some embodiments, an energy storage device (e.g., battery or battery cell) of the present disclosure has a storage capacity of at least about 1,000 mAh.

An energy storage device (e.g., battery or battery cell) of the present disclosure may have a charge storage capacity of about 80 mAh/g to about 800 mAh/g. An energy storage device (e.g., battery or battery cell) of the present disclosure may have a charge storage capacity of at least about 80 mAh/g. An energy storage device (e.g., battery or battery cell) of the present disclosure may have a charge storage capacity of at most about 800 mAh/g. An energy storage device (e.g., battery or battery cell) of the present disclosure may have a charge storage capacity of about 80 mAh/g to about 100 mAh/g, about 80 mAh/g to about 150 mAh/g, about 80 mAh/g to about 200 mAh/g, about 80 mAh/g to about 300 mAh/g, about 80 mAh/g to about 400 mAh/g, about 80 mAh/g to about 500 mAh/g, about 80 mAh/g to about 600 mAh/g, about 80 mAh/g to about 700 mAh/g, about 80 mAh/g to about 800 mAh/g, about 100 mAh/g to about 150 mAh/g, about 100 mAh/g to about 200 mAh/g, about 100 mAh/g to about 300 mAh/g, about 100 mAh/g to about 400 mAh/g, about 100 mAh/g to about 500 mAh/g, about 100 mAh/g to about 600 mAh/g, about 100 mAh/g to about 700 mAh/g, about 100 mAh/g to about 800 mAh/g, about 150 mAh/g to about 200 mAh/g, about 150 mAh/g to about 300 mAh/g, about 150 mAh/g to about 400 mAh/g, about 150 mAh/g to about 500 mAh/g, about 150 mAh/g to about 600 mAh/g, about 150 mAh/g to about 700 mAh/g, about 150 mAh/g to about 800 mAh/g, about 200 mAh/g to about 300 mAh/g, about 200 mAh/g to about 400 mAh/g, about 200 mAh/g to about 500 mAh/g, about 200 mAh/g to about 600 mAh/g, about 200 mAh/g to about 700 mAh/g, about 200 mAh/g to about 800 mAh/g, about 300 mAh/g to about 400 mAh/g, about 300 mAh/g to about 500 mAh/g, about 300 mAh/g to about 600 mAh/g, about 300 mAh/g to about 700 mAh/g, about 300 mAh/g to about 800 mAh/g, about 400 mAh/g to about 500 mAh/g, about 400 mAh/g to about 600 mAh/g, about 400 mAh/g to about 700 mAh/g, about 400 mAh/g to about 800 mAh/g, about 500 mAh/g to about 600 mAh/g, about 500 mAh/g to about 700 mAh/g, about 500 mAh/g to about 800 mAh/g, about 600 mAh/g to about 700 mAh/g, about 600 mAh/g to about 800 mAh/g, or about 700 mAh/g to about 800 mAh/g. An energy storage device (e.g., battery or battery cell) of the present disclosure may have a charge storage capacity of about 80 mAh/g, about 100 mAh/g, about 150 mAh/g, about 200 mAh/g, about 300 mAh/g, about 400 mAh/g, about 500 mAh/g, about 600 mAh/g, about 700 mAh/g, about 800 mAh/g, or about 80 mAh/g.

An energy storage device (e.g., battery or battery cell) of the present disclosure may have such charge storage capacities in combination with one or more power densities, energy densities, and/or cycling stabilities/cycle lives described herein. In some embodiments, an energy storage device (e.g., battery or battery cell) of the present disclosure has a storage capacity of about 80 mAh/g to about 800 mAh/g. In some embodiments, an energy storage device (e.g., battery or battery cell) of the present disclosure has a storage capacity of at least about 1,000 mAh/g.

An energy storage device (e.g., battery or battery cell) of the present disclosure may have a power density of greater than or equal to about 500 W/kg, 600 W/kg, 700 W/kg, 800 W/kg, 900 W/kg, 1000 W/kg, 1100 W/kg, 1200 W/kg, 1300 W/kg, 1400 W/kg, 1500 W/kg, 1600 W/kg, 1700 W/kg, 1800 W/kg, 1900 W/kg, 2000 W/kg, 2100 W/kg, 2200 W/kg, 2300 W/kg, 2400 W/kg, 2500 W/kg, 2600 W/kg, 2700 W/kg, 2800 W/kg, 2900 W/kg, 3000 W/kg, 3100 W/kg, 3200 W/kg, 3300 W/kg, 3400 W/kg, or 3500 W/kg. An energy storage device (e.g., battery or battery cell) of the present disclosure may have a power density between about 500 W/kg and 3000 W/kg, 500 W/kg and 3500 W/kg, 1000 W/kg and 3000 W/kg, 1000 W/kg and 3500 W/kg, 1500 W/kg and 3000 W/kg, 1500 W/kg and 3500 W/kg, 1600 W/kg and 3000 W/kg, 1600 W/kg and 3500 W/kg, 1700 W/kg and 3000 W/kg, 1700 W/kg and 3500 W/kg, 1800 W/kg and 3000 W/kg, 1800 W/kg and 3500 W/kg, 1900 W/kg and 3000 W/kg, 1900 W/kg and 3500 W/kg, 2000 W/kg and 3000 W/kg, 2000 W/kg and 3500 W/kg, 2100 W/kg and 3000 W/kg, 2100 W/kg and 3500 W/kg, 2200 W/kg and 3000 W/kg, 2200 W/kg and 3500 W/kg, 2300 W/kg and 3000 W/kg, 2300 W/kg and 3500 W/kg, 2400 W/kg and 3000 W/kg, 2400 W/kg and 3500 W/kg, 2500 W/kg and 3000 W/kg, 2500 W/kg and 3500 W/kg, 2600 W/kg and 3000 W/kg, 2600 W/kg and 3500 W/kg, 2700 W/kg and 3000 W/kg, 2700 W/kg and 3500 W/kg, 2800 W/kg and 3000 W/kg, 2800 W/kg and 3500 W/kg, 2900 W/kg and 3000 W/kg, 2900 W/kg and 3500 W/kg, or 3000 W/kg and 3500 W/kg. An energy storage device (e.g., battery or battery cell) of the present disclosure may have such power densities in combination with one or more charge storage capacities, energy densities, and/or cycling stabilities/cycle lives described herein.

An energy storage device (e.g., battery or battery cell) of the present disclosure may have a cycling stability or cycle life of greater than or equal to about 500 cycles, 600 cycles, 700 cycles, 800 cycles, 900 cycles, 1000 cycles, 1100 cycles, 1200 cycles, 1300 cycles, 1400 cycles, 1500 cycles, or 2000 cycles. An energy storage device (e.g., battery or battery cell) of the present disclosure may have a cycling stability or cycle life between about 500 cycles and 1000 cycles, 500 cycles and 1500 cycles, 600 cycles and 1000 cycles, 600 cycles and 1500 cycles, 700 cycles and 1000 cycles, 700 cycles and 1500 cycles, 800 cycles and 1000 cycles, 800 cycles and 1500 cycles, 800 cycles and 1000 cycles, 800 cycles and 1500 cycles, 900 cycles and 1000 cycles, 900 cycles and 1500 cycles, 1000 cycles and 1500 cycles, or 1500 cycles and 2000 cycles. An energy storage device (e.g., battery or battery cell) of the present disclosure may have such cycling stabilities/cycle lives in combination with one or more charge storage capacities, power densities and/or energy densities described herein.

An energy storage device (e.g., battery or battery cell) of the present disclosure may have an energy density of greater than or equal to about 50 Wh/kg, 75 Wh/kg, 90 Wh/kg, 100 Wh/kg, 110 Wh/kg, 120 Wh/kg, 130 Wh/kg, 140 Wh/kg, 150 Wh/kg, 160 Wh/kg, 170 Wh/kg, 180 Wh/kg, 190 Wh/kg, 200 Wh/kg, 210 Wh/kg, 220 Wh/kg, 230 Wh/kg, 240 Wh/kg, 250 Wh/kg, 260 Wh/kg, 270 Wh/kg, 280 Wh/kg, 290 Wh/kg, 300 Wh/kg, 310 Wh/kg, 320 Wh/kg, 330 Wh/kg, 340 Wh/kg, 350 Wh/kg, 360 Wh/kg, 370 Wh/kg, 380 Wh/kg, 390 Wh/kg or 400 Wh/kg. An energy storage device (e.g., battery or battery cell) of the present disclosure may have an energy density between about 90 Wh/kg and 250 Wh/kg, 90 Wh/kg and 300 Wh/kg, 90 Wh/kg and 350 Wh/kg, 90 Wh/kg and 400 Wh/kg, 150 Wh/kg and 250 Wh/kg, 150 Wh/kg and 300 Wh/kg, 150 Wh/kg and 350 Wh/kg, 150 Wh/kg and 400 Wh/kg, 200 Wh/kg and 250 Wh/kg, 200 Wh/kg and 300 Wh/kg, 200 Wh/kg and 350 Wh/kg, 200 Wh/kg and 400 Wh/kg, 250 Wh/kg and 300 Wh/kg, 250 Wh/kg and 350 Wh/kg, 250 Wh/kg and 400 Wh/kg, 300 Wh/kg and 350 Wh/kg, 300 Wh/kg and 400 Wh/kg, or 350 Wh/kg and 400 Wh/kg. An energy storage device (e.g., battery or battery cell) of the present disclosure may have such energy densities in combination with one or more charge storage capacities, power densities, and/or cycling stabilities/cycle lives described herein.

An energy storage device (e.g., battery or battery cell) of the present disclosure may have a charge voltage of greater than or equal to about 2 V, 2.1 V, 2.2 V, 2.3 V, 2.4 V, 2.5 V, 2.6 V, 2.7 V, 2.8 V, 2.9 V, 3 V, 3.1 V, 3.2 V, 3.3 V, 3.4 V, 3.5 V, 3.6 V, 3.7 V, 3.8 V, 3.9 V, 4 V, 4.1 V, 4.2 V, 4.3 V, 4.4 V, or 4.5 V. An energy storage device (e.g., battery or battery cell) of the present disclosure may have a charge voltage between about 2 V and 2.5 V, 2 V and 3 V, 2 V and 3.5 V, 2 V and 4 V, 2 V and 4.5 V, 2.5 V and 3 V, 2.5 V and 3.5 V, 2.5 V and 4 V, 2.5 V and 4.5 V, 3 V and 3.5 V, 3 V and 4 V, 3 V and 4.5 V, 3.5 V and 4 V, 3.5 V and 4.5 V, or 4 V and 4.5 V. An energy storage device (e.g., battery or battery cell) of the present disclosure may have a discharge voltage of greater than or equal to about 2 V, 2.5 V, 3 V, 3.5 V, 4 V, or 4.5 V. An energy storage device (e.g., battery or battery cell) of the present disclosure may a discharge voltage between about 2 V and 2.5 V, 2 V and 3 V, 2 V and 3.5 V, 2 V and 4 V, 2 V and 4.5 V, 2.5 V and 3 V, 2.5 V and 3.5 V, 2.5 V and 4 V, 2.5 V and 4.5 V, 3 V and 3.5 V, 3 V and 4 V, 3 V and 4.5 V, 3.5 V and 4 V, 3.5 V and 4.5 V, or 4 V and 4.5 V. In some embodiments, the charge and discharge voltage may differ by less than or equal to about 25%, 20%, 15%, 10% or 5% (e.g., see FIG. 12). The charge and discharge voltage may have such similarities over a given capacity range (e.g., up to about 1000 mAh, 1100 mAh, 1200 mAh, 1300 mAh, 1400 mAh, 1600 mAh, 1700 mAh, 1800 mAh, 1900 mAh, 2000 mAh, 2200 mAh, 2400 mAh, 2600 mAh, 2800 mAh, 3000 mAh, 3200 mAh, 3400 mAh, 3600 mAh, 3800 mAh or 4000 mAh).

Figure 27:
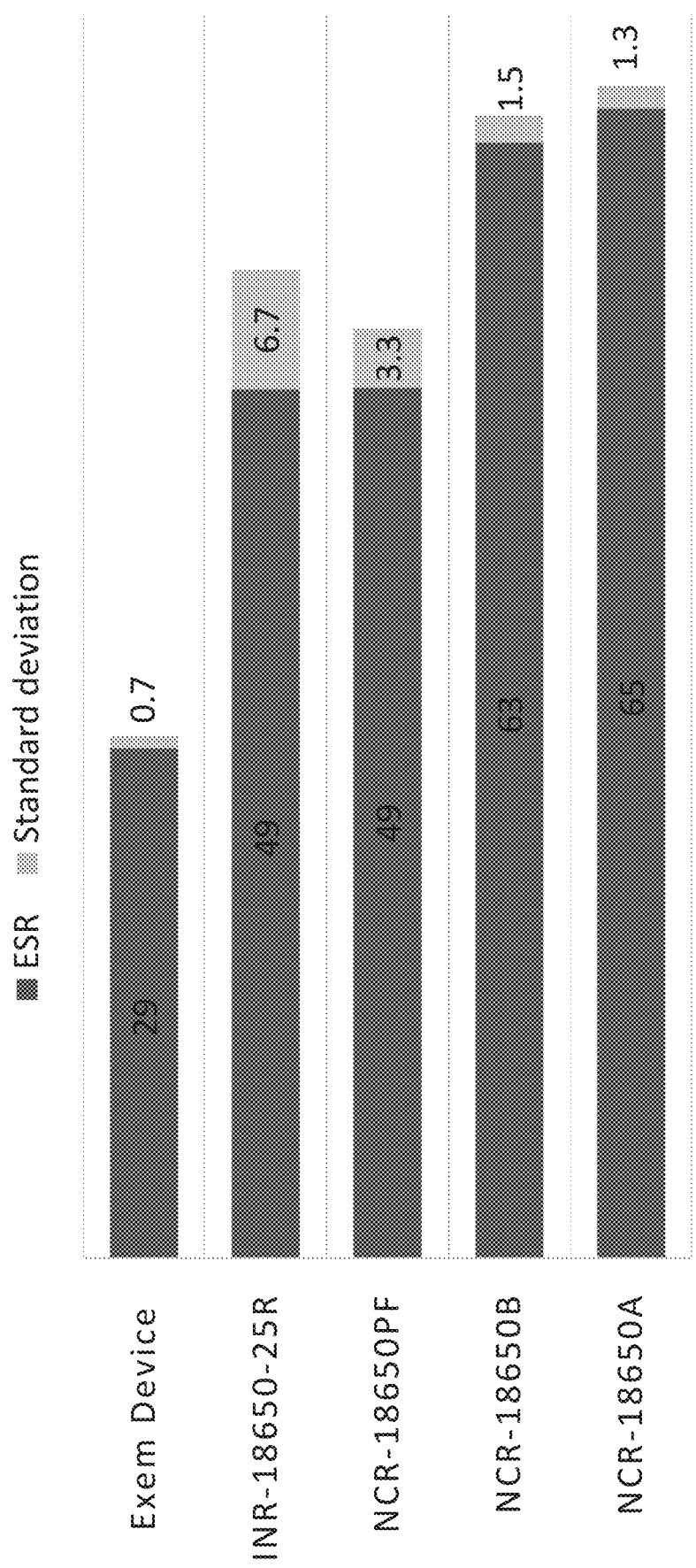
FIG. 27 shows equivalent series resistance (ESR) measurements of exemplary energy storage devices.

Per FIG. 27, energy storage devices available in the market exhibit an equivalent series resistance (ESR) of about 40Ω to about 70Ω. However, further improvements of these figures are necessary for the wide adoption of this technology, especially for large scale applications such as electric vehicles and grid scale energy storage (e.g., to reduce the price of electric vehicles and contribute to a clean and green environment).

Figure 28:
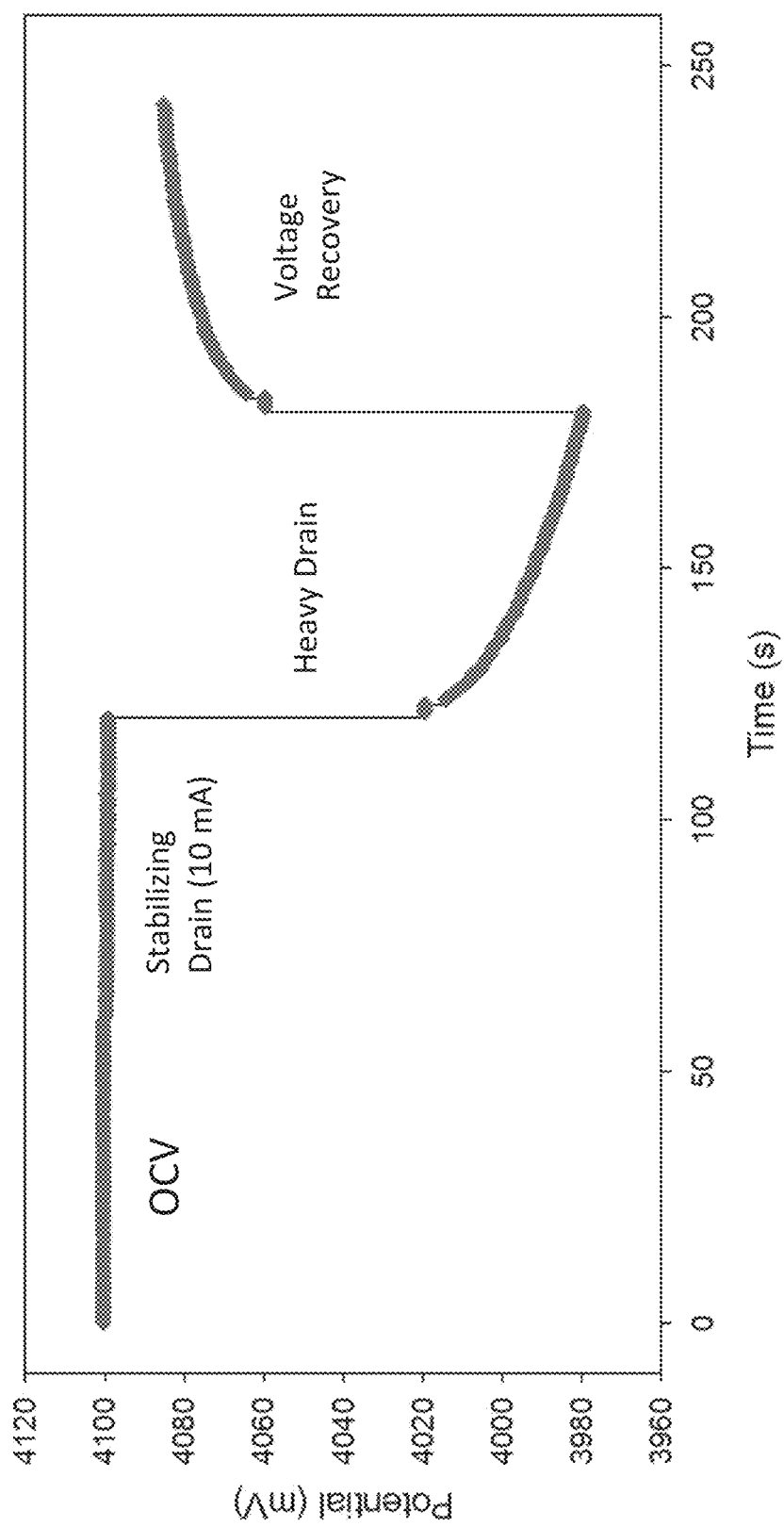
FIG. 28 shows exemplary dynamic ESR measurements of an exemplary energy storage device.

In contrast, the energy storage devices (e.g., batteries) provided herein may in some embodiments exhibit an ESR of less than 30Ω, as calculated by the potential-time graph in FIG. 28. Such features may be enabled, for example, by outstanding electrical and mechanical properties of the carbon-based materials described herein, extraordinarily high surface area of the carbon-based materials described herein, or a combination thereof.

An energy storage device (e.g., battery or battery cell) of the present disclosure may have an ESR at 1 kilohertz (kHz) of 14 milliohms to 80 milliohms. An energy storage device (e.g., battery or battery cell) of the present disclosure may have an ESR at 1 kHz of at least 14 milliohms. An energy storage device (e.g., battery or battery cell) of the present disclosure may have an ESR at 1 kHz of at most 80 milliohms. An energy storage device (e.g., battery or battery cell) of the present disclosure may have an ESR at 1 kHz of 14 milliohms to 20 milliohms, 14 milliohms to 25 milliohms, 14 milliohms to 30 milliohms, 14 milliohms to 35 milliohms, 14 milliohms to 40 milliohms, 14 milliohms to 45 milliohms, 14 milliohms to 50 milliohms, 14 milliohms to 55 milliohms, 14 milliohms to 60 milliohms, 14 milliohms to 70 milliohms, 14 milliohms to 80 milliohms, 20 milliohms to 25 milliohms, 20 milliohms to 30 milliohms, 20 milliohms to 35 milliohms, 20 milliohms to 40 milliohms, 20 milliohms to 45 milliohms, 20 milliohms to 50 milliohms, 20 milliohms to 55 milliohms, 20 milliohms to 60 milliohms, 20 milliohms to 70 milliohms, 20 milliohms to 80 milliohms, 25 milliohms to 30 milliohms, 25 milliohms to 35 milliohms, 25 milliohms to 40 milliohms, 25 milliohms to 45 milliohms, 25 milliohms to 50 milliohms, 25 milliohms to 55 milliohms, 25 milliohms to 60 milliohms, 25 milliohms to 70 milliohms, 25 milliohms to 80 milliohms, 30 milliohms to 35 milliohms, 30 milliohms to 40 milliohms, 30 milliohms to 45 milliohms, 30 milliohms to 50 milliohms, 30 milliohms to 55 milliohms, 30 milliohms to 60 milliohms, 30 milliohms to 70 milliohms, 30 milliohms to 80 milliohms, 35 milliohms to 40 milliohms, 35 milliohms to 45 milliohms, 35 milliohms to 50 milliohms, 35 milliohms to 55 milliohms, 35 milliohms to 60 milliohms, 35 milliohms to 70 milliohms, 35 milliohms to 80 milliohms, 40 milliohms to 45 milliohms, 40 milliohms to 50 milliohms, 40 milliohms to 55 milliohms, 40 milliohms to 60 milliohms, 40 milliohms to 70 milliohms, 40 milliohms to 80 milliohms, 45 milliohms to 50 milliohms, 45 milliohms to 55 milliohms, 45 milliohms to 60 milliohms, 45 milliohms to 70 milliohms, 45 milliohms to 80 milliohms, 50 milliohms to 55 milliohms, 50 milliohms to 60 milliohms, 50 milliohms to 70 milliohms, 50 milliohms to 80 milliohms, 55 milliohms to 60 milliohms, 55 milliohms to 70 milliohms, 55 milliohms to 80 milliohms, 60 milliohms to 70 milliohms, 60 milliohms to 80 milliohms, or 70 milliohms to 80 milliohms. An energy storage device (e.g., battery or battery cell) of the present disclosure may have an ESR at 1 kHz of 14 milliohms, 20 milliohms, 25 milliohms, 30 milliohms, 35 milliohms, 40 milliohms, 45 milliohms, 50 milliohms, 55 milliohms, 60 milliohms, 70 milliohms, or 80 milliohms. An energy storage device (e.g., battery or battery cell) of the present disclosure may have an ESR at 1 kHz of about 5 milliohms to about 100 milliohms. An energy storage device (e.g., battery or battery cell) of the present disclosure may have an ESR at 1 kHz of at least about 5 milliohms. An energy storage device (e.g., battery or battery cell) of the present disclosure may have an ESR at 1 kHz of at most about 100 milliohms. An energy storage device (e.g., battery or battery cell) of the present disclosure may have an ESR at 1 kHz of about 5 milliohms to about 10 milliohms, about 5 milliohms to about 20 milliohms, about 5 milliohms to about 30 milliohms, about 5 milliohms to about 40 milliohms, about 5 milliohms to about 50 milliohms, about 5 milliohms to about 60 milliohms, about 5 milliohms to about 70 milliohms, about 5 milliohms to about 80 milliohms, about 5 milliohms to about 90 milliohms, about 5 milliohms to about 100 milliohms, about 10 milliohms to about 20 milliohms, about 10 milliohms to about 30 milliohms, about 10 milliohms to about 40 milliohms, about 10 milliohms to about 50 milliohms, about 10 milliohms to about 60 milliohms, about 10 milliohms to about 70 milliohms, about 10 milliohms to about 80 milliohms, about 10 milliohms to about 90 milliohms, about 10 milliohms to about 100 milliohms, about 20 milliohms to about 30 milliohms, about 20 milliohms to about 40 milliohms, about 20 milliohms to about 50 milliohms, about 20 milliohms to about 60 milliohms, about 20 milliohms to about 70 milliohms, about 20 milliohms to about 80 milliohms, about 20 milliohms to about 90 milliohms, about 20 milliohms to about 100 milliohms, about 30 milliohms to about 40 milliohms, about 30 milliohms to about 50 milliohms, about 30 milliohms to about 60 milliohms, about 30 milliohms to about 70 milliohms, about 30 milliohms to about 80 milliohms, about 30 milliohms to about 90 milliohms, about 30 milliohms to about 100 milliohms, about 40 milliohms to about 50 milliohms, about 40 milliohms to about 60 milliohms, about 40 milliohms to about 70 milliohms, about 40 milliohms to about 80 milliohms, about 40 milliohms to about 90 milliohms, about 40 milliohms to about 100 milliohms, about 50 milliohms to about 60 milliohms, about 50 milliohms to about 70 milliohms, about 50 milliohms to about 80 milliohms, about 50 milliohms to about 90 milliohms, about 50 milliohms to about 100 milliohms, about 60 milliohms to about 70 milliohms, about 60 milliohms to about 80 milliohms, about 60 milliohms to about 90 milliohms, about 60 milliohms to about 100 milliohms, about 70 milliohms to about 80 milliohms, about 70 milliohms to about 90 milliohms, about 70 milliohms to about 100 milliohms, about 80 milliohms to about 90 milliohms, about 80 milliohms to about 100 milliohms, or about 90 milliohms to about 100 milliohms. An energy storage device (e.g., battery or battery cell) of the present disclosure may have an ESR at 1 kHz of about 5 milliohms, about 10 milliohms, about 20 milliohms, about 30 milliohms, about 40 milliohms, about 50 milliohms, about 60 milliohms, about 70 milliohms, about 80 milliohms, about 90 milliohms, or about 100 milliohms.

Terms and Definitions

Unless otherwise defined, all technical terms used herein have the same meaning as commonly understood by one of ordinary skill in the art to which the present disclosure belongs. As used in this specification and the appended claims, the singular forms "a," "an," and "the" include plural references unless the context clearly dictates otherwise. Any reference to "or" herein is intended to encompass "and/or" unless otherwise stated.

While preferable embodiments of the present disclosure have been shown and described herein, it will be obvious to those skilled in the art that such embodiments are provided by way of example only. Numerous variations, changes, and substitutions will now occur to those skilled in the art without departing from the present disclosure. It should be understood that various alternatives to the embodiments of the device of the present disclosure described herein may be employed in practicing the present disclosure. It is intended that the following claims define the scope of the present disclosure and that methods and structures within the scope of these claims and their equivalents be covered thereby.

Throughout the present disclosure, numerical features are presented in a range format. It should be understood that the description in range format is merely for convenience and brevity and should not be construed as an inflexible limitation on the scope of any embodiments. Accordingly, the description of a range should be considered to have specifically disclosed all the possible subranges as well as individual numerical values within that range to the tenth of the unit of the lower limit unless the context clearly dictates otherwise. For example, description of a range such as from 1 to 6 should be considered to have specifically disclosed subranges such as from 1 to 3, from 1 to 4, from 1 to 5, from 2 to 4, from 2 to 6, and from 3 to 6, as well as individual values within that range, for example, 1.1, 2, 2.3, 5, and 5.9. This applies regardless of the breadth of the range. The upper and lower limits of these intervening ranges may independently be included in the smaller ranges, and are also encompassed within the present disclosure, subject to any specifically excluded limit in the stated range. Where the stated range includes one or both of the limits, ranges excluding either or both of those included limits are also included in the present disclosure, unless the context clearly dictates otherwise.

Unless specifically stated or obvious from context, as used herein, the term "about" in reference to a number or range of numbers is understood to mean the stated number and numbers±10% thereof, or 10% below the lower listed limit and 10% above the higher listed limit for the values listed for a range.

EXAMPLES

Example 1—NCA Cell

An exemplary battery comprises at least one cell comprising a negative electrode (anode during discharge) comprising graphite and a positive electrode (cathode during discharge) comprising PCS/lithium nickel cobalt aluminum oxide (NCA), as shown in Table 1.

TABLE 1

| NCA Cell | | | | |
|---|---|---|---|---|
| Electrode | Component | Material | Wet Slurry Composition | Dry Electrode Composition |
| Positive Electrode | Active electrode material | Graphene | 0.3%-0.6% | 0.5%-1% |
| | | Lithium nickel cobalt aluminum oxide | 58%-59% | 96%-97% |
| | Binder | Polyvinylidene fluoride | 1.5% | 2.5% |
| | Solvent | N-methyl-2-pyrrolidone | 39% | 0% |
| Negative Electrode | Active material | Natural graphite | 49% | 95% |
| | Conductive additive | Carbon Black Super-P | 0.5% | 1% |
| | Binder | Polyvinylidene fluoride | 2% | 5% |
| | Solvent | N-methyl-2-pyrrolidone | 48% | 0% |

Example 2—NMC Cell

An exemplary battery comprises at least one cell comprising a negative electrode (anode during discharge) comprising graphite and a positive electrode (cathode during discharge) comprising PCS/lithium nickel manganese cobalt oxide (NMC), as shown in Table 2.

TABLE 2

| NMC Cell | | | | |
|---|---|---|---|---|
| Electrode | Component | Material | Wet Slurry Composition | Dry Electrode Composition |
| Positive Electrode | Active electrode material | Graphene | 0.3%-0.6% | 0.5%-1% |
| | | Lithium nickel manganese cobalt oxide | 58%-59% | 96%-97% |
| | Binder | Polyvinylidene fluoride | 1.5% | 2.5% |
| | Solvent | N-methyl-2-pyrrolidone | 39% | 0% |
| Negative Electrode | Active material | Natural graphite | 49% | 95% |
| | Conductive additive | Carbon Black Super-P | 0.5% | 1% |
| | Binder | Polyvinylidene fluoride | 2% | 5% |
| | Solvent | N-methyl-2-pyrrolidone | 48% | 0% |

Example 3—LFP Cell

An exemplary battery comprises at least one cell comprising a negative electrode (anode during discharge) comprising graphite and a positive electrode (cathode during discharge) comprising PCS/lithium iron phosphate (LFP), as shown in Table 3.

TABLE 3

| LFP Cell | | | | |
|---|---|---|---|---|
| Electrode | Component | Material | Wet Slurry Composition | Dry Electrode Composition |
| Positive Electrode | Active electrode | Graphene | 0.3%-0.6% | 0.5%-1% |
| | | Lithium iron | 58%-59% | 96%-97% |

TABLE 3-continued

LFP Cell

| Electrode | Component | Material | Wet Slurry Composition | Dry Electrode Composition |
|---|---|---|---|---|
| | material | phosphate | | |
| | Binder | Polyvinylidene fluoride | 1.5% | 2.5% |
| | Solvent | N-methyl-2-pyrrolidone | 39% | 0% |
| Negative Electrode | Active material | Natural graphite | 49% | 95% |
| | Conductive additive | Carbon Black Super-P | 0.5% | 1% |
| | Binder | Polyvinylidene fluoride | 2% | 5% |
| | Solvent | N-methyl-2-pyrrolidone | 48% | 0% |

What is claimed is:

1. A method of fabricating an electrode comprising:
   a) combining a binder and a solvent;
   b) heating the binder and the solvent;
   c) mixing an active material into the binder and the solvent to form a slurry, wherein the active material comprises porous graphene sheets, the porous graphene sheets comprising one or more carboxylic functional groups that are bonded solely to the edges of the porous graphene sheets;
   d) roll coating the slurry onto a foil;
   e) drying the slurry on the foil;
   f) roll pressing the slurry on the foil;
   g) slitting the slurry on the foil to form the electrode.

2. The method of claim 1, wherein the binder comprises polyvinyl fluoride, polyvinylidene fluoride, polytetrafluoroethylene, polychlorotrifluoroethylene, perfluoroalkoxy polymer, fluorinated ethylene-propylene, polyethylenetetrafluoroethylene, polyethylenechlorotrifluoroethylene, perfluorinated plastomer, a fluorocarbon, chlorotrifluoroethylenevinylidene fluoride, a fluoroelastomer, tetrafluoroethylene-propylene, perfluoropolyether, perfluorosulfonic acid, perfluoropolyoxetane, P(VDF-trifluoroethylene), P(VDF-tetrafluoroethylene), or any combination thereof.

3. The method of claim 1, wherein the solvent comprises 2-pyrrolidone, n-vinylpyrrolidone, n-methyl-2-pyrrolidone, methyl ethyl ketone, or any combination thereof.

4. The method of claim 1, wherein the active material further comprises a lithiated metal compound.

5. The method of claim 4, wherein the lithiated metal compound comprises lithium nickel cobalt aluminum oxide, lithium nickel manganese cobalt oxide, lithium iron phosphate, or any combination thereof.

6. The method of claim 1, wherein a plurality of the porous graphene sheets has a pore diameter of less than about 10 nanometers.

7. The method of claim 1, wherein a plurality of the porous graphene sheets has an oxygen content of less than about 10%.

8. The method of claim 1, wherein a plurality of the porous graphene sheets is a single layer of graphene.

9. The method of claim 1, wherein the active material is present in the slurry at a concentration of 40% to 60%.

10. The method of claim 1, wherein the active material is present in the electrode at a concentration of 50% to 90%.

11. The method of claim 1, wherein the binder is present in the slurry at a concentration of about 0.5% to about 10%.

12. The method of claim 1, wherein the binder is present in the electrode at a concentration of about 1% to about 15%.

13. The method of claim 1, wherein the solvent is present in the slurry at a concentration of about 10% to 60%.

14. The method of claim 1, further comprising applying a metal tab to the electrode.

15. The method of claim 1, further comprising forming the porous graphene sheets using a non-Hummer's method.

16. The method of claim 15, wherein the non-Hummer's method comprises:
   a) chemically oxidizing graphite to form graphene oxide;
   b) exfoliating the graphene oxide;
   c) purifying the graphene oxide; and
   d) chemically reducing the graphene oxide to form the porous graphene sheets.

17. The method of claim 16, further comprising purifying the porous graphene sheets.

18. The method of claim 17, wherein purifying the graphene oxide, purifying the porous graphene sheets, or both are performed without using hydrochloric acid.

19. The method of claim 16, wherein chemically oxidizing the graphite comprises agitating a mixture of the graphite and an oxidizing agent.

20. The method of claim 16, wherein steps (a) to (c) of the non-Hummers method are performed at a temperature of less than about 45° C.

* * * * *